(12) United States Patent
Mizuno et al.

(10) Patent No.: US 7,590,312 B2
(45) Date of Patent: Sep. 15, 2009

(54) INTERFEROMETER OPTICAL SWITCH AND VARIABLE OPTICAL ATTENUATOR

(75) Inventors: Takayuki Mizuno, Yamato (JP); Hiroshi Takahashi, Atsugi (JP); Tsutomu Kitoh, Atsugi (JP); Manabu Oguma, Yamato (JP); Shunichi Souma, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 34 days.

(21) Appl. No.: 10/536,649

(22) PCT Filed: Jul. 2, 2004

(86) PCT No.: PCT/JP2004/009773

§ 371 (c)(1),
(2), (4) Date: May 27, 2005

(87) PCT Pub. No.: WO2005/003852

PCT Pub. Date: Jan. 13, 2005

(65) Prior Publication Data

US 2006/0072866 A1    Apr. 6, 2006

(30) Foreign Application Priority Data

Jul. 4, 2003 (JP) .............................. 2003-191797

(51) Int. Cl.
- G02F 1/01 (2006.01)
- G02F 1/035 (2006.01)
- G02B 6/26 (2006.01)
- G02B 6/42 (2006.01)

(52) U.S. Cl. ...................... 385/1; 385/2; 385/3; 385/15; 385/16; 385/20; 385/42; 385/140

(58) Field of Classification Search .................. 385/1, 385/2, 3, 15, 16, 20, 24, 39, 42
See application file for complete search history.

(56) References Cited

U.S. PATENT DOCUMENTS 4,978,188 A * 12/1990 Kawachi et al. ............. 385/130

(Continued)

FOREIGN PATENT DOCUMENTS

EP    0 382 461 A2    8/1990

(Continued)

OTHER PUBLICATIONS

Tsutomu Kitoh et al: "Novel Broad-Band Optical Switch Using Silica-Based Planar Lightwave Circuit" IEEE Photonics Technology Letters, IEEE Service Center, Piscataway, NJ, US, vol. 4, No. 7, Jul. 1, 1992, pp. 735-737, XP000289298 ISSN: 1041-1135.*

(Continued)

*Primary Examiner*—Frank G Font
*Assistant Examiner*—Michael P Mooney
(74) *Attorney, Agent, or Firm*—Workman Nydegger

(57) ABSTRACT

The present invention discloses an interferometer optical switch that can carry out switching over a broad band and has a high extinction ratio and large fabrication tolerance. The interferometer optical switch employs a phase generating coupler, the phase difference of the output of which has wavelength dependence, as at least one of the optical multi/demultiplexing device included in the interferometer optical switch. A wavelength insensitive interferometer optical switch is implemented by making the sum $2\pi\{\phi_1(\lambda)+\phi\Delta_L(\lambda)+\phi_2(\lambda)\}$ constant regardless of the wavelength, where $\phi_1(\lambda)$ is the phase produced by the first optical multi/demultiplexing device, $2\pi\phi\Delta_L(\lambda)$ is the phase difference of the optical delay line with an optical path length difference of $\Delta L$, and $2\pi\phi_2(\lambda)$ is the phase produced by the second optical multi/demultiplexing device.

98 Claims, 42 Drawing Sheets

U.S. PATENT DOCUMENTS

2004/0071390 A1* 4/2004 Horst .................. 385/17
2005/0169630 A1* 8/2005 Takiguchi et al. ............ 398/53

FOREIGN PATENT DOCUMENTS

| JP | 64-077002 | | 3/1989 |
|---|---|---|---|
| JP | 01-158413 | | 6/1989 |
| JP | 05-061077 | | 3/1993 |
| JP | 05061077 A | * | 3/1993 |
| JP | 06-051354 | | 2/1994 |
| JP | 08-122545 | | 5/1996 |
| JP | 08122545 A | * | 5/1996 |
| WO | WO 02/075978 A1 | | 9/2002 |

OTHER PUBLICATIONS

Masayuki Okuno et al., *Low-Loss and High Extinction Ratio Silica-Based 1×N Thermo-Optic Switches*, OECC/IOOC 2001 Conference Incorporating ACOPT, Jul. 5, 2001, pp. 39-41.

Takashi Goh et al., *High-Extinction Ratio and Low-Loss Silica-Based 8×8 Thermooptic Matrix Switch*, IEEE Photonics Technology Letters, vol. 10. No. 3, Mar. 1998, pp. 358-360.

S. Sohma et al., *Low Switching Power Silica-Based Super High Delta Thermo-Optic Switch with Heat Insulating Grooves*, Electronics Letters, vol. 38, No. 3, Jan. 31, 2002, pp. 127-128.

Takashi Goh, *Low-Loss and High-Extinction-Ratio Silica-Based Strictly Nonblocking 16×16 Thermooptic Matrix Switch*, IEEE Photonics Technology Letters, vol. 10, No. 6, Jun. 1998, pp. 810-812.

Toshio Watanabe et al., *Silica-based PLC 1×128 Thermo-Optic Switch*, 27$^{th}$ European Conference on Optical Communication 2001, ECOC '01, vol. 2, pp. 134-135.

Kaname Jinguji et al., *Two-Port Optical Wavelength Circuits Composed of Cascaded Mach-Zehnder Interferometers with Point-Symmetrical Configurations*, Journal of Lightwave Technology, vol. 14, No. 10, Oct. 1996, pp. 2301-2310.

Masayuki Okuno et al., *Birefringence Control of Silica Waveguides on Si and Its Application to a Polarization-Beam Splitter/Switch*, Journal of Lightwave Technology, vol. 12, No. 4, Apr. 1994, pp. 625-633.

Takayuki Mizuno et al., *Mach-Zehnder Interferometer with a Uniform Wavelength Period*, Optics Letters, vol. 29, No. 5, Mar. 2004, pp. 454-456.

Tsutomu Kitoh et al., *Novel Broad-Band Optical Switch Using Silica-Based Planar Lightwave Circuit*, IEEE Photonics Technology letters, vol. 4, No. 7, Jul. 1992, pp. 735-737.

Takashi Goh et al., *Low Loss and High Extinction Ratio Strictly Nonblocking 16×16 Thermooptic Matrix Switch on 6-in Wafer Using Silica-Based Planar Lightwave Circuit Technology*, Journal of Lightwave Technology, vol. 19, No. 3, Mar. 2001, pp. 371-379.

* cited by examiner

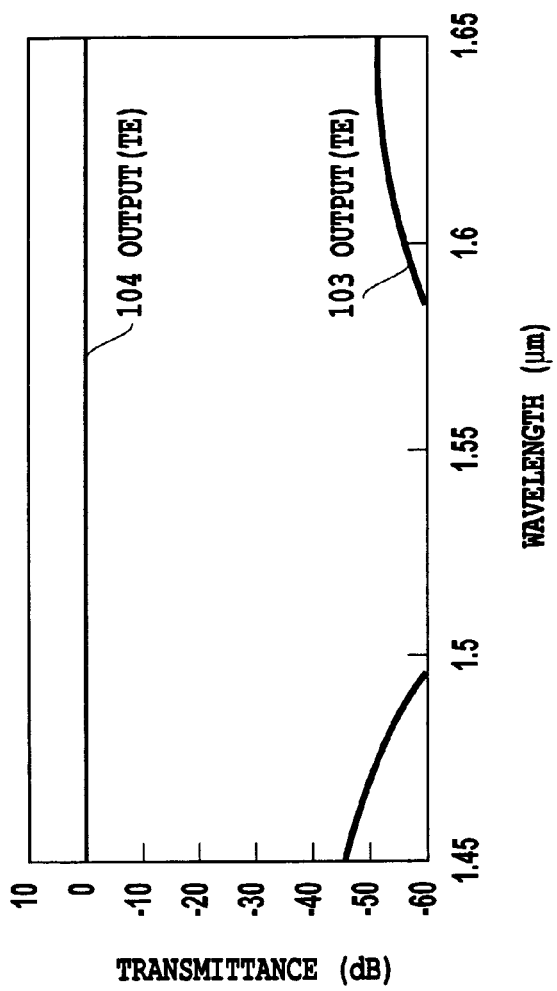
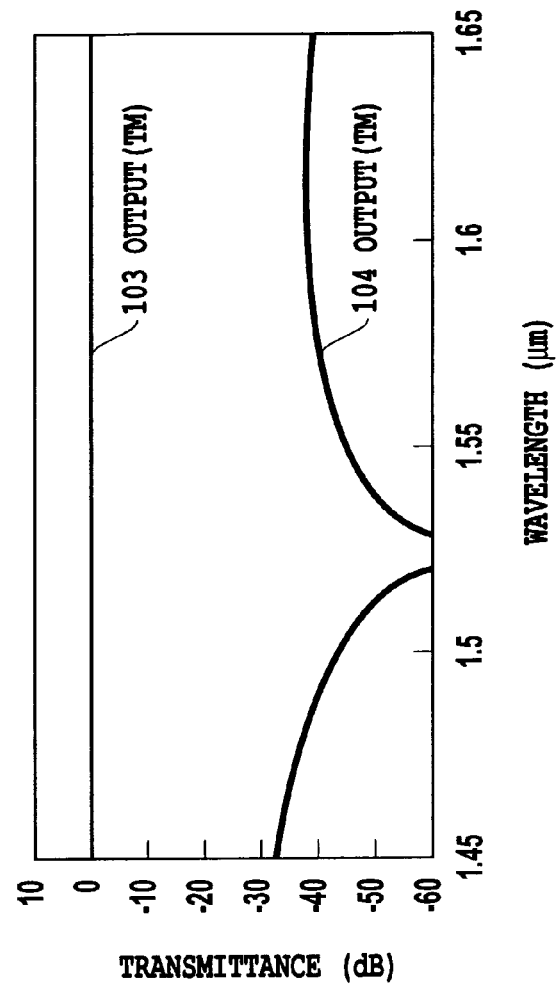
FIG.32A
FIG.32B

INTERFEROMETER OPTICAL SWITCH AND VARIABLE OPTICAL ATTENUATOR

TECHNICAL FIELD

The present invention relates to an interferometer optical switch and a variable optical attenuator used for optical communication systems and optical signal processing, and more particularly to an optical waveguide circuit capable of switching in a broad wavelength band.

BACKGROUND ART

According to the explosive proliferation of the Internet, increases in the transmission capacity of optical communication systems are proceeding rapidly with the United States playing a central role. The key technique for increasing the transmission capacity is the wavelength division multiplexing (WDM) system. The WDM system has the capability of transmitting plurality of optical signals with different wavelengths over a single optical fiber, thereby increasing the communication capacity markedly. Although optical communication systems now installed are point to point systems that interconnect nodes individually, optical cross connect systems and optical add/drop multiplexing (OADM) systems with higher functions are now being developed. The optical cross connect system is a system that carries out switching of transmission lines at a node such as a telephone office. On the other hand, the optical add/drop multiplexing system is a system that extracts a specified wavelength from multiplexed signals to distribute it to another transmission line, or adds a new signal to the specified wavelength to be sent. Besides the ability to multi/demultiplex the optical signals, these systems must have spatial division optical switches that can switch the optical paths without converting the optical signals into electrical signals. Thus, the space division optical switch is one of the important components of a future optical communication network.

The optical switches used for these commercial communication systems must have such characteristics as small size, low cost, low power consumption and fast controllability. In addition, optical switches are required which have transmittance with small wavelength dependence and polarization dependence, and is switchable over a broad wavelength band.

While research and development of a variety of optical components have been conducted, waveguide-type optical components based on optical waveguides formed on a substrate is receiving attention as optical components superior in mass-producibility, integratability and reliability. The waveguide-type optical switches are mass-produced at high accuracy and at high reproducibility less than or equal to the order of wavelength by photolithography and microprocessing, and are suitable for very large systems because basic elements constituting the switches are small in size. Thus, they are considered to be most promising optical switches. In particular, silica-based optical waveguides formed on a silicon substrate are low in loss, and have high reliability and extensibility. Thus, they are expected as a component of future optical communication systems.

As a basic constituent of the conventional waveguide-type optical switches, a Mach-Zehnder interferometer is used. The Mach-Zehnder interferometer has two couplers and arm waveguides connecting the two couplers. Driving a thin film heater on the arm waveguides enables switching.

FIRST EXAMPLE OF CONVENTIONAL TECHNIQUE

An optical switch based on conventional waveguide-type optical components is an interferometer optical switch including optical multi/demultiplexing devices and an optical delay line. A typical interferometer optical switch is a two-input, two-output Mach-Zehnder interferometer which is used frequently as a basic element of optical switches (Reference Document 1: M. Okuno et al., "Low-loss and high extinction ratio silica-based 1×N thermo-optic switches", 0ECC/I00C 2001 Conference Incorporating ACOFT, pp. 39-41, 5 Jul. 2001).

FIG. 37 is a plan view showing a conventional Mach-Zehnder interferometer optical switch. The Mach-Zehnder interferometer optical switch comprises two directional couplers 151 and 152, an optical delay line 131 between the two directional couplers 151 and 152, a phase shifter 141 formed in the optical delay line, input waveguides 101 and 102 and output waveguides 103 and 104. For example, 3 dB-directional couplers with the power coupling ratio r=0.5 are used as the directional couplers 151 and 152, and a thin film heater is used as the phase shifter 141. As for the optical path length difference $\Delta L$ between two optical waveguides (optical delay line) connecting the two directional couplers 151 and 152, it is set in such a manner that $\Delta L=0.5\ \lambda s$ (=0.75 µm) or $\Delta L=0 \cdot \lambda s=0$, where $\lambda s$ (=1.5 µm) is the signal wavelength. In the optical delay line of FIG. 37, $\Delta L$ is a relative optical path length difference of the upper side waveguide with respect to the lower side waveguide, which includes the effective refractive index of the waveguides. Generally, the element having $\Delta L$ set at 0.5 $\lambda s$ at the initial state is called an asymmetric Mach-Zehnder interferometer optical switch which is used as a tap switch or gate switch. On the other hand, the element having $\Delta L$ set a zero is called a symmetric Mach-Zehnder interferometer optical switch which is used as a bifurcation switch.

FIG. 38 is a cross-sectional view taken along a line XXXVIII-XXXVIII of the Mach-Zehnder interferometer optical switch as shown in FIG. 37. On a silicon substrate 161, cladding glass layers 164 and 167 of silica-based glass are formed. In a mid layer of the cladding glass layers 164 and 167, a core glass section 165 of silica-based glass is formed, which constitutes optical waveguides. In addition, the phase shifter (thin film heater) 141 is formed on a surface of the overcladding glass layer 167. In other words, the waveguide-type optical components are formed by the optical waveguides, thin film heater and so on.

Next, the switching operation of the Mach-Zehnder interferometer optical switch as shown in FIG. 37 will be described.

First, the operation of the asymmetric switch will be described. When the phase shifter (thin film heater) 141 is in the OFF state, the switch is in the bar state. Accordingly, the optical signal input via the input waveguide 101 is output from the output waveguide 103, and the optical signal input via the input waveguide 102 is output from the output waveguide 104. By supplying power to the thin film heater 141 to vary the optical path length by a half wavelength (0.5 $\lambda s \cdot k$, where k is an integer other than zero) using the thermooptic effect, the path length difference becomes $\Delta L+\delta \Delta L=0.5\ \lambda s-0.5\ \lambda s=0$. When the phase shifter (thin film heater) 141 is in the ON state, the switch is in the cross state. Thus, the optical signal input via the input waveguide 101 is output from the output waveguide 104, and the optical signal input via the input waveguide 102 is output from the output waveguide 103. By thus turning on the thin film heater or not, the optical path length of the optical delay line 131 is varied, thereby being able to carry out the switching.

Next, the operation of the symmetric switch will be described. When the phase shifter (thin film heater) 141 is in the OFF state, the switch is in the cross state. Thus, the optical signal is output from the cross port (101⇒104 or 102⇒103). In the ON state in which the thin film heater 141 is activated, and the optical path length difference is placed at $\Delta L + \delta \Delta L = 0.5 \lambda s$, the switch is changed to the bar state so that the optical signal is output from the through port (101⇒103 or 102⇒104)

In the bifurcation switch using the symmetric type, when the light is input to the input waveguide 101, the signal is output from the cross port (output waveguide 104) in the OFF state, but not output from the through port (output waveguide 103). On the contrary, in the ON state, the signal is output from the through port (output waveguide 103), but not output from the cross port (output waveguide 104). In this way, the bifurcation switch is configured such that the light is output from the cross port in the initial OFF state, and is switched to the through port by turning on the thin film heater.

In contrast, a tap switch using the asymmetric type carries out the switching operation opposite to the bifurcation switch. Thus, it outputs the light from the through port in the initial OFF state, and switches the output to the cross port by turning on the thin film heater. A gate switch using the asymmetric switch uses only the cross port of the tap switch. Accordingly, the optical signal is not output from the cross port in the initial OFF state, but is output from the cross port in the ON state which is brought about by turning on the thin film heater. Both the symmetric and asymmetric types are used as a basic element of the optical switch. In particular, the asymmetric type has an advantage that it is resistant to fabrication error of optical couplers because it can maintain a high extinction ratio as long as the power coupling ratios of the first and second directional couplers 151 and 152 are equal.

These interferometer optical switches are used as a 1×1 type switch, or as a 1×2 type optical switch used for switching from the power system to a standby system when a failure takes place in the optical communication system. In addition, they are not only used alone, but a configuration is also reported in which a Mach-Zehnder interferometer optical switch has one of its outputs connected in series to another Mach-Zehnder interferometer optical switch with the same configuration to increase the extinction ratio (Reference Document 2: T. Goh et al., "High-extinction ratio and low-loss silica-based 8×8 thermooptic matrix switch," IEEE Photonics technology Letters 1998, Vol. 10, pp. 358-360).

Furthermore, to reduce the power consumption during the ON state of the thin film heater, a configuration is reported which has adiabatic grooves at both ends of the phase shifter (Reference Document 3: S. Sohma et al., "Low switching power silica-based super high delta thermo-optics switch with heat insulating grooves, "Electronics Letters 2002, Vol. 38, No. 3, pp. 127-128).

Moreover, combining the foregoing Mach-Zehnder interferometer optical switches as the basic components makes it possible to configure M×N large scale optical switches such as an N×N matrix optical switch (Reference Document 4: T. Goh et al., "Low-loss and high-extinction-ratio silica-based strictly nonblocking 16×16 thermooptic matrix switch," IEEE Photonics Technology Letters 1998, Vol. 10, No. 6, pp. 810-812), a 1×N tap type optical switch (Reference Document 1), a 1×N tree type optical switch (Reference Document 5: T. Watanabe et al., "Silica-based PLC 1×128 thermo-optic switch," 27th European Conference on Optical Communication 2001, ECOC '01., Vol. 2, pp. 134-135), and an ROADM (Reconfigurable OADM) switch.

SECOND EXAMPLE OF CONVENTIONAL TECHNIQUE

FIG. 39 shows a conventional wavelength insensitive switch (WINS). The WINS has a configuration in which a first basic circuit 190 is connected to a second basic circuit that has point symmetry with the first basic circuit 190. Here, the first basic circuit 190 is a wavelength insensitive coupler (WINC) including two directional couplers 151 and 152, and an optical delay line 134 between the two directional couplers 151 and 152.

The power coupling ratio of the directional coupler 151 (154) is $r_1 = 0.8$, the power coupling ratio of the directional coupler 152 (153) is $r_2 = 0.3$, and the optical path length difference of the optical delay line 134 is $\Delta L_1 (= -\Delta L_3) = 0.32 \mu m$. The two waveguides between the first basic circuit 190 and the second basic circuit having point symmetry with the first basic circuit 190 form an optical delay line 135 whose optical path length difference is set at $\Delta L_2 = 0$. Here, the path length difference represents a relative path length difference of a first optical waveguide (the lower side optical path in FIG. 39) with respect to a second optical waveguide. On the optical waveguide of the optical delay line 135, a phase shifter (thin film heater) 142 is formed, and the switching operation is carried out by supplying power to the thin film heater.

This circuit can be considered as a circuit configured by replacing the directional couplers 151 and 152 of the conventional symmetric Mach-Zehnder interferometer optical switch (FIG. 37) with WINCs. Since the power coupling ratio of the conventional directional coupler has wavelength dependence, the wavelength range is limited in which it functions as a 3 dB coupler, that is, a coupler with the power coupling ratio of 0.5. The symmetric Mach-Zehnder interferometer optical switch has a high extinction ratio when the sum of the directional couplers 151 and 152 becomes a perfect coupling length. Accordingly, the extinction ratio is deteriorated when the power coupling ratios of the directional couplers 151 and 152 are unequal to 0.5. In contrast, since the circuit of FIG. 39 uses the WINCs, it can set the power coupling ratios at approximately 0.5 regardless of the wavelength. Since the WINS uses the WINCs whose power coupling ratios have small wavelength dependence, it can carry out switching in a broader wavelength band than that of the conventional symmetric Mach-Zehnder interferometer optical switch. In practice, however, it is difficult to maintain the power coupling ratios of the WINCs at 0.5 over a broad wavelength band because of the fabrication error and the like. Thus, the wavelength characteristics are deteriorated by deviation of the power coupling ratios.

In view of this, to adjust the power coupling ratios of the two WINCs constituting the WINS, fine tuning phase shifters (thin film heaters) 141 and 143 are formed on the optical delay lines 134 and 136 of the WINCs (FIG. 40). Since the WINS is a symmetric type, it is in the cross state in the initial state in which the thin film heaters are not driven, and the signal input via the input waveguide 101 is output from the output waveguide 104. In contrast, when the thin film heaters 141, 142 and 143 of the optical delay lines are supplied with heating powers to vary the optical path lengths by $\delta \Delta L_1$, $\delta \Delta L_2$ and $\delta \Delta L_3$ using the thermooptic effect, the WINS is switched into the bar state, so the optical signal input via the input waveguide 101 is output from the output waveguide 103 while preventing output from the output waveguide 104. Measuring the wavelength dependence of the transmittance results in an extinction ratio higher than 20 dB over a broad wavelength region of 1.2-1.7 μm.

THIRD EXAMPLE OF CONVENTIONAL TECHNIQUE

The interferometer optical switch carries out the switching operation by setting the output intensity at 0 or 1. However, setting the output intensity at an intermediate value between 0 and 1 makes it possible to use it as a variable optical attenuator for attenuating the intensity of the optical signal. As an example, differences between the interferometer type optical switch and variable optical attenuator will be described by showing wavelength characteristics of a conventional asymmetric Mach-Zehnder interferometer. FIG. 41A illustrates the wavelength dependence of the transmittance of the asymmetric Mach-Zehnder interferometer optical switch described as the first example of the conventional technique. The ON state corresponds to the output intensity 1, and the OFF state corresponds to the output intensity 0. The extinction ratio increases as the transmittance in the OFF state decreases. The optical path length difference of the optical delay line 131 (FIG. 37) is $\Delta L=0.5\, \lambda s$ in the initial OFF state, and is $\Delta L+\delta \Delta L=0.5\, \lambda s-0.5\, \lambda s=0$ in the ON state.

FIG. 41B illustrates the wavelength dependence of the transmittance when the optical transmittance of the conventional variable optical attenuator at the center wavelength $\lambda c$ is set at −30 dB, −20 dB, and −10 dB. The light intensity can be attenuated to a desired value by setting the transmittance at an appropriate value by varying the optical path length difference of the optical delay line 131 with the phase shifter (thin film heater)

(Problems of Conventional Technique)

The conventional interferometer optical switches or variable optical attenuators, however, have the following problems.

As for the conventional symmetric Mach-Zehnder interferometer optical switch described as the first example of the conventional technique, since its extinction ratio becomes high when the sum of the two directional couplers equals the complete coupling length, the high extinction ratio is achieved when the power coupling ratios of the two directional couplers are 0.5. However, if the power coupling ratio of the directional couplers becomes r1=r2=0.4 because of the fabrication error, for example, the conditions for the high extinction ratio are not satisfied, thereby deteriorating the extinction ratio markedly. In addition, although the power coupling ratio is set precisely at 0.5, it changes at different wavelength because there is wavelength dependence in the coupling ratio of the directional couplers. Thus, because of the fabrication error and wavelength dependence of the optical couplers, the conventional symmetric Mach-Zehnder interferometer optical switch cannot be used in a broad band.

As for the asymmetric Mach-Zehnder interferometer optical switch, on the other hand, since its extinction ratio becomes high when the power coupling ratios of the two directional couplers are equal, high extinction ratio can be maintained even if the power coupling ratio is r1=r2=0.4 because of the fabrication error, for example. Likewise, even if the power coupling ratios vary in accordance with the wavelength because of the wavelength dependence, it can maintain high extinction ratio. However, to make the Mach-Zehnder interferometer optical switch asymmetric, it is necessary to set the optical path length difference of the optical delay line at 0.5 $\lambda c$. Setting the path length difference at a finite value brings about the wavelength dependence in principle, and the transmittance varies depending on the wavelength. Although the asymmetric type has the advantage of being more tolerant as regards the fabrication error and wavelength dependence of the optical couplers, it is impossible for the conventional technique to set the path length difference at a finite value without causing wavelength dependence.

Accordingly, conventional Mach-Zehnder interferometer optical switches have the wavelength dependence illustrated in FIG. 41A. FIG. 41A illustrates the wavelength band of 1.45-1.65 μm when the signal wavelength $\lambda s$ is set at 1.5 μm. Although the extinction ratio is good at $\lambda s$, the extinction ratio, which is defined as the difference between the transmittances in the ON state and OFF state, deteriorates as the wavelength is away from the signal wavelength. If the target value of the extinction ratio is equal to or greater than 30 dB, the range in which the conventional Mach-Zehnder interferometer optical switch can achieve the target value is about 60 nm around the signal wavelength $\lambda s$. Accordingly, at the center wavelength 1.55 μm, for example, the extinction ratio deteriorates to about 25 dB. Consequently, the conventional Mach-Zehnder interferometer optical switch is operational in a limited wavelength range. Hence, it is not suitable for wavelength division multiplexing transmission systems or the like, which requires operation over a broad wavelength band.

As for the WINS described as the second example of the conventional technique, since it can reduce the wavelength dependence of the power coupling ratios of the optical couplers, it can make the wavelength dependence less than the optical switch of the first example of the conventional technique. However, since the WINS is based on the symmetric Mach-Zehnder interferometer optical switch, it is necessary to place the power coupling ratios of the two WINC at 0.5 to obtain a high extinction ratio. Although using the WINCs enables the reduction of the wavelength dependence, it is impossible to maintain the power coupling ratios at 0.5 throughout the wavelength band. Accordingly, if the power coupling ratios become r1=r2=0.45 at a particular wavelength, for example, the extinction ratio deteriorates greatly. The wavelength dependence can be improved by forming phase shifters in the optical delay line of the WINCs as shown in FIG. 40, to fine tune the path length difference. However, it is necessary in this case to drive the three phase shifters simultaneously. Consequently, several problems are posed: (1) the power consumption for switching becomes several times greater than that of the conventional case; (2) the control time increases because of an increase in the number of the locations to be adjusted; (3) the control algorithm of the switching operation becomes complicated; and (4) the amount of electrical wiring becomes several times greater than that of the conventional case because of an increase in the number of the phase shifters. As a result, the characteristics necessary for a commercial system such as the low power consumption and fast controllability cannot be satisfied.

As for the variable optical attenuator described as the third example of the conventional technique, it can take a desired attenuation only at the center wavelength.

Although Reference Documents 1-5 are enumerated above as the Reference Documents relevant to the present invention, the following documents are introduced here as other Reference Documents which describe similar conventional techniques.

Reference Document 6: K. Jinguji et al., "Two-port optical wavelength circuits composed of cascaded Mach-Zehnder interferometers with point-symmetrical configurations.", Journal of Lightwave Technology 1996, Vol. 14, No. 10, pp. 2301-2310.

Reference Document 7: M. Okuno et al., "Birefringence control of silica waveguides on Si and its application to a polarization-beam splitter/switch.", Journal of Lightwave Technology 1994, Vol. 12, No. 4, pp. 625-633.

Reference Document 8: T. Mizuno et al., "Mach-Zehnder interferometer with a uniform wavelength period," Optics Letters 2004, Vol. 29, No. 5, pp. 454-456.

Reference Document 9: EP0382461.

Reference Document 10: Japanese patent publication No. 3175499.

Reference Document 11: Japanese patent publication No. 3041825.

DISCLOSURE OF THE INVENTION

The present invention is implemented to solve the foregoing problems of the above-described conventional techniques. Therefore it is an object of the present invention to provide an interferometer optical switch and a variable optical attenuator capable of switching over a broad band and having a high extinction ratio and large fabrication tolerance.

To accomplish the object, the present invention utilizes a phase generating coupler, the phase difference of the output of which has wavelength dependence, as at least one of the coupler (optical multi/demultiplexing device) constituting a Mach-Zehnder interferometer. Then, the present invention is characterized by setting the sum of phases produced by the phase generating coupler and arm waveguides at constant regardless of the wavelength, thereby making the output intensity of the Mach-Zehnder interferometer insensitive to wavelength.

Here, the phase difference of the output of the optical multi/demultiplexing device refers to a phase difference produced by the light launched from two output ports when a light is input into at least one of the input ports of an optical multi/demultiplexing device, and when light are output from at least two output ports of the multi/demultiplexing device. In addition, when light are launched into at least two of the input ports of an optical multi/demultiplexing device, and when a light is output from at least one of the output ports of the optical multi/demultiplexing device, an optical phase difference occurs between the two paths with different input ports. In this case, it is possible to consider that light was launched into one of the output ports, and were launched from two of the input ports of the multi/demultiplexing device, so the phase difference of the light launched from the two ports of the multi/demultiplexing device can similarly be defined. Thus, a phase generating couler is an optical coupler that has the ability to produce a wavelength-dependent phase difference when light is launched into different input/output ports and is launched from different output/input ports.

More specifically, the interferometer optical switch and variable optical attenuator in accordance with the present invention can provide an interferometer optical switch and a variable optical attenuator having a new function that cannot be achieved by the conventional interferometer optical switches by comprising: a first optical multi/demultiplexing device; an optical delay line including two optical waveguides connected to the first optical multi/demultiplexing device; a second optical multi/demultiplexing device connected to the optical delay line; one or more input waveguides connected to the first optical multi/demultiplexing device; one or more output waveguides connected to the second optical multi/demultiplexing device; and a phase shifter installed on the optical delay line, wherein at least one of the first optical multi/demultiplexing device and the second optical multi/demultiplexing device is a phase generating coupler having a phase difference of an output of which has wavelength dependence.

In addition, an optical multi/demultiplexing device, the phase difference of the output of which has wavelength dependence, can be implemented by providing a characteristic of configuring the phase generating coupler by interconnecting optical couplers with an optical delay line. Furthermore, any desired phase difference can be produced by appropriately setting the power coupling ratios of the optical couplers and the optical path length difference of the optical delay line.

In addition, the phase generating coupler having a phase generating function without a principle loss can be implemented by providing a characteristic of configuring the phase generating coupler with N+1 optical couplers (N is a natural number) and N optical delay lines sandwiched between the adjacent optical couplers. Furthermore, the flexibility of parameter setting increases with an increase of N, which makes it possible to increase the degree of approximation between the phase difference of the output of the phase generating coupler and an appropriate phase, and the degree of approximation between the power coupling ratio of the phase generating coupler and an appropriate power coupling ratio. Thus, it is possible to provide a phase generating coupler capable of generating the accurate phase with ease.

Furthermore, the optical path length difference of the optical delay line can be set at any desired value independent of the wavelength by setting the sum $$2\pi\{\phi_1(\lambda)+\phi\Delta_L(\lambda)+\phi_2(\lambda)\} \quad (1).$$

of the three phase differences at an appropriate value, where $\lambda$ is optical wavelength, $2\pi_1(\lambda)$ is a phase difference between light output from the first optical multi/demultiplexing device, $2\pi\phi\Delta_L(\lambda)$ is a phase difference caused by an optical path length difference $\Delta L$ of the optical delay line, and $2\pi\phi_2(\lambda)$ is a phase difference of the light output from the second optical multi/demultiplexing device. Thus, it is possible to make the transmission characteristics of the output, wavelength insensitive thereby being able to provide optical components such as an interferometer optical switch and a variable optical attenuator that can be used in a broad band.

In addition, the sum $2\pi\{\phi_1(\lambda)+\phi\Delta_L(\lambda)+\phi_2(\lambda)\}$ of the three phase differences can be set at $(2m'+1)\cdot\pi$ (m' is an integer), and the power coupling ratios of the first optical multi/demultiplexing device and of the second optical multi/demultiplexing device can made substantially equal throughout an entire wavelength region. Thus, it can implement a wavelength insensitive asymmetric Mach-Zehnder interferometer optical switch that cannot be achieved with conventional technology. For example, it is possible to provide a broad band gate switch and tap switch which have a high extinction ratio over a broad wavelength band, and is resistant to fabrication deviations. Furthermore, it can be used as a wavelength insensitive variable optical attenuator.

In addition, the sum $2\pi\{\phi_1(\lambda)+\phi\Delta_L(\lambda)+\phi_2(\lambda)\}$ of the three phase differences can be set at $2m'\pi$ (m' is an integer), and the sum of the power coupling ratios of the first optical multi/demultiplexing device and of the second optical multi/demultiplexing device can be made substantially unity. Thus, it can be operated as a wavelength insensitive symmetric Mach-Zehnder interferometer optical switch, for example.

In addition, the sum of the phase difference of the output of the first optical multi/demultiplexing device and the phase difference of the output of the second optical multi/demultiplexing device can be equal to $\Delta L/\lambda + m/2$ (m is an integer).

Furthermore, the sum $2\pi\{\phi_1(\lambda)+\phi\Delta_L(\lambda)+\phi_2(\lambda)\}$ of the three phase differences is set such that output intensity of the optical waveguide circuit becomes constant for the wavelength $\lambda$, where $2\pi\phi_1(\lambda)$ is a phase difference between light output from the first optical multi/demultiplexing device, $2\pi\phi\Delta_L(\lambda)$ is a phase difference caused by the optical path length difference $\Delta L$ of the optical delay line, and $2\pi\phi_2(\lambda)$ is a phase difference between light output from the second optical multi/demultiplexing device. Thus, it can provide an interferometer optical switch and a variable optical attenuator having constant output intensity over a broad band.

In addition, it can provide an interferometer optical switch capable of carrying out switching over a broad wavelength band by providing characteristics in which, one of the first optical multi/demultiplexing device and the second optical multi/demultiplexing device is an optical coupler with a phase difference $2\pi\phi_c$ (constant), and the other is a phase generating coupler that is composed of two optical couplers and an optical delay line sandwiched between the two optical couplers, and power coupling ratios of the two optical couplers constituting the phase generating coupler, and an optical path length difference of the optical delay line are set to satisfy $$\phi(\lambda)=\Delta L/\lambda+m/2-\phi_c \quad (2).$$

Furthermore, it can provide an interferometer optical switch capable of carrying out switching over a broad wavelength band by providing characteristics in which, the first optical multi/demultiplexing device and the second optical multi/demultiplexing device are each a phase generating coupler comprising two optical couplers and a single optical delay line sandwiched between the two optical couplers, and that the power coupling ratios of the two optical couplers and an optical path length difference of the single optical delay line constituting each of the first optical multi/demultiplexing device and the second optical multi/demultiplexing device are set such that the sum of a phase difference of the output of the first optical multi/demultiplexing device and a phase difference of the output of the second optical multi/demultiplexing device satisfies $$\phi_1(\lambda)+\phi_2(\lambda)=\Delta L/\lambda+m/2 \quad (3).$$

In addition, it is possible to generate a phase effectively with the phase generating coupler by configuring such that the first optical multi/demultiplexing device and the second optical multi/demultiplexing device each consists of a phase generating coupler comprising N+1 optical couplers (N is a natural number), and N optical delay lines, each of which includes two, first and second, optical waveguides (delay lines) sandwiched between adjacent optical couplers of the N+1 optical couplers, and wherein assuming that the sum of optical path lengths of the first optical waveguide constituting the N optical delay lines of the first optical multi/demultiplexing device is $\Sigma l_{1,1}$, the sum of optical path lengths of the second optical waveguide is $\Sigma l_{2,1}$, the sum of optical path lengths of the first optical waveguide constituting the N optical delay lines of the second optical multi/demultiplexing device is $\Sigma l_{1,2}$, and the sum of optical path lengths of the second optical waveguide is $\Sigma l_{2,2}$, the sum of the optical path lengths satisfy either ($\Sigma l_{1,1} > \Sigma l_{2,1}$ and $\Sigma l_{1,2} > \Sigma l_{2,2}$), or ($\Sigma l_{2,1} > \Sigma l_{1,1}$ and $\Sigma l_{2,2} > \Sigma l_{1,2}$).

Furthermore, it can be characterized in that the first optical multi/demultiplexing device and the second optical multi/demultiplexing device each consist of a phase generating coupler including N+1 optical couplers (N is a natural number), and N optical delay lines sandwiched between adjacent optical couplers of the N+1 optical couplers, and that the power coupling ratios of the N+1 optical couplers of the first optical multi/demultiplexing device and of the second optical multi/demultiplexing device are made equal. This makes it easier to fabricate the optical couplers, and thus, improves the processing yield.

In addition, using a directional coupler consisting of two optical waveguides placed side by side in close proximity as the optical coupler makes it possible to set the power coupling ratio of the optical coupler at any desired value by appropriately setting the coupling length of the two optical waveguides and the spacing between the waveguides.

Furthermore, using a thin film heater formed on the optical waveguide as the phase shifter makes it possible to operate the switch with high accuracy.

In addition, forming adiabatic grooves near the phase shifter enables the suppression of the power consumption required for switching.

Furthermore, a low loss optical waveguide circuit superior in integratability, reliability and stability can be offered by providing a characteristic of configuring the optical waveguide circuit with silica-based glass optical waveguides.

In addition, a plurality of interferometer optical switches may be connected to improve the extinction ratio and to provide an interferometer optical switch with higher functions. Furthermore, large scale interferometer optical switches such as an N×N matrix switch, a 1×N tree type switch, a 1×N tap type switch, an M×N DC switch and an ROADM switch can be configured by connecting a plurality of interferometer optical switches.

In addition, a 1×2 interferometer optical switch with constant power consumption can be implemented by providing the characteristic that a first interferometer optical switch has a first output waveguide of its two output waveguides connected to an input waveguide of a second interferometer optical switch, and has its input waveguide used as an input port of the interferometer optical switch; the second interferometer optical switch has its output waveguide used as a first output port of the interferometer optical switch; and the first interferometer optical switch has a second output waveguide of its two output waveguides used as a second output port of the interferometer optical switch.

Furthermore, a PI-LOSS (path independent loss) 1×2 interferometer optical switch can be implemented by providing the characteristic that a first interferometer optical switch has a first output waveguide of its two output waveguides connected to an input waveguide of a second interferometer optical switch, has a second output waveguide of its two output waveguides connected to an input waveguide of a third interferometer optical switch, and has its input waveguide used as an input port of the interferometer optical switch; the second interferometer optical switch has its output waveguide used as a first output port of the interferometer optical switch; and the third interferometer optical switch has its output waveguide used as a second output port of the interferometer optical switch.

In addition, a large scale interferometer optical switch such as an N×N matrix switch, a 1×N tree switch, a 1×N tap switch, an M×N DC switch and an ROADM switch can be offered by providing a characteristic of configuring an M input (M: natural number), N output (N: natural number) optical switch by using at least one interferometer optical switch.

Furthermore, a polarization insensitive or polarization-dependent interferometer optical switch such as a polarization beam switch can be offered by providing a characteristic of including a birefringent index adjustment means on the optical waveguide of the interferometer optical switch, or of being subjected to the adjustment of a birefringent index.

In addition, the interferometer optical switch, which carries out switching between the states in which the optical waveguide circuit has the maximum and minimum output intensity, can be functioned as a variable optical attenuator by making the output intensity variable and by setting it at any desired value between the maximum and the minimum. In this case, a broad band variable optical attenuator can be provided which has constant output intensity over a broad wavelength band.

Furthermore, an optical module of an optical waveguide circuit can be offered by providing a characteristic of having a module including the optical waveguide circuit, and optical fibers that are held in the module and carry out the input and output of a signal to and from the optical waveguide circuit. The optical module is applicable to optical communication systems such as an optical cross connect (OXC) system or optical add/drop multiplexing (OADM) system.

According to the present invention, the Mach-Zehnder interferometer employs as at least one of the first optical multi/demultiplexing device and second optical multi/demultiplexing device a phase generating coupler, the phase difference of the output of which has wavelength dependence. This makes it possible to implement an interferometer optical switch and a variable optical attenuator with new functions that cannot be implemented by the conventional technique.

In the Mach-Zehnder interferometer optical switch in accordance with the present invention including the phase generating coupler, the light intensity Pc of the cross port ($101 \Rightarrow 104$) is given by the following expression.

$$P_C = 2R(\lambda) \cdot [1 - R(\lambda)] \cdot [1 + \cos\{2\pi\{\phi_{\Delta L}(\lambda) + \Phi(\lambda)\}\}] \quad (4).$$

Where $\phi_{\Delta L}(\lambda)$ is a phase difference caused by the optical path length differences of the optical delay line of the Mach-Zehnder interferometer, and $\Phi(\lambda)$ is a phase difference produced by the phase generating coupler. For the sake of simplicity, it is assumed that the power coupling ratios of the first and second optical multi/demultiplexing devices are equal, and denoted by $R(\lambda)$. The light intensity can be made zero by placing $2\pi\{\phi_{\Delta L}(\lambda) + \Phi(\lambda)\}$ at an odd multiple of $\pi$. However, for conventional Mach-Zehnder interferometers, it is impossible to set $2\pi\{\phi_{\Delta L}(\lambda)\}$ at a constant value regardless of the wavelength because $\phi_{\Delta L}(\lambda)$ will be wavelength-dependent whenever $\Delta L$ is set at a finite value. In contrast, the present invention makes it possible for the first time to set the phase difference $2\pi\{\phi_{\Delta L}(\lambda) + \Phi(\lambda)\}$ at any desired constant value regardless of the wavelength by generating an appropriate phase difference using the phase generating coupler. The preset invention can offer an interferometer optical switch and a variable optical attenuator capable of operating over a broad wavelength band by appropriately setting the phase difference $\Phi(\lambda)$ of the output of the phase generating coupler in accordance with the application of interferometer circuits applied.

In addition, since the present invention can implement an interferometer optical switch circuit capable of switching over a broad wavelength band, introducing the circuit as a basic element of an optical switch can implement a switch for an optical cross connect system or optical add/drop multiplexing system operating in any desired wavelength band. This makes it possible to use the components in common and to construct the system at low cost.

Using the phase generating coupler, the phase difference of the output of which has wavelength dependence, as at least one of the optical multi/demultiplexing devices constituting the interferometer makes it possible to set the optical path length differences of the optical delay line at a finite value without bringing about the wavelength dependence. Thus, the present invention provides an interferometer optical switch that has a high extinction ratio in a broad band and has large tolerance for the fabrication error, and a variable optical attenuator operational in a broad band, which cannot be implemented by the conventional technique.

BRIEF DESCRIPTION OF THE DRAWINGS

FIG. 32A is a graph illustrating the wavelength dependence of the transmittance of the TE mode in the OFF state of the interferometer optical switch of the ninth embodiment in accordance with the present invention;

FIG. 32B is a graph illustrating the wavelength dependence of the transmittance of the TM mode in the OFF state of the interferometer optical switch of the ninth embodiment in accordance with the present invention;

BEST MODE FOR CARRYING OUT THE INVENTION

Figure 1:
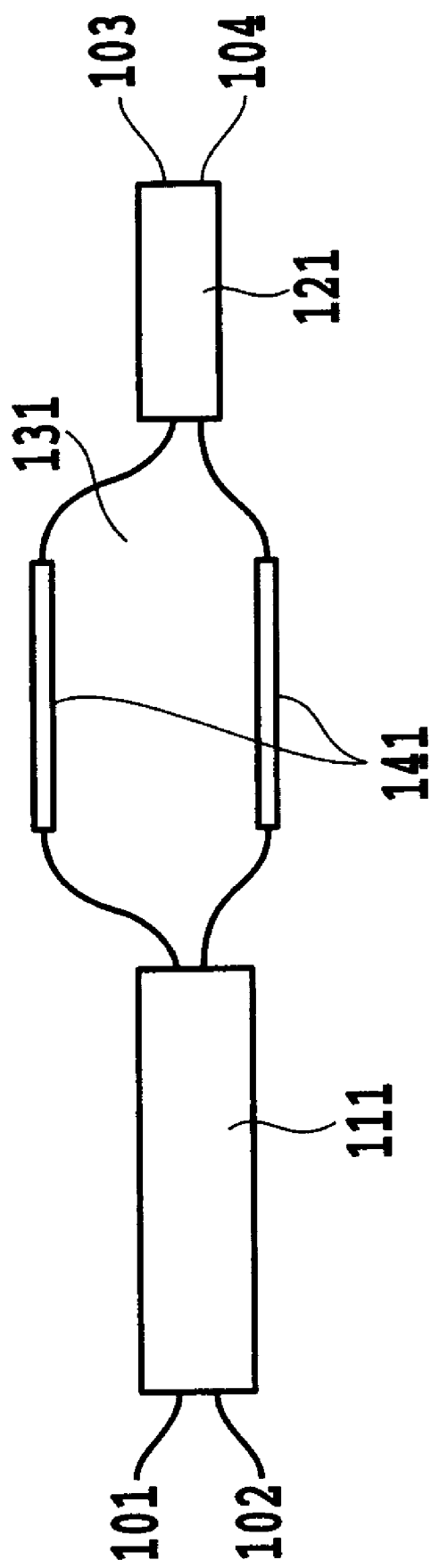
FIG. 1 is a schematic diagram showing a configuration of an interferometer optical switch of a first embodiment in accordance with the present invention.

The best mode for carrying out the invention will now be described with reference to the accompanying drawings.

Throughout the drawings for describing the embodiments in accordance with the present invention, portions having the same functions are designated by the same reference numerals, and their duplicate description will be omitted. In the following embodiments, planar optical waveguides are used, and an interferometer optical switch and a variable optical attenuator will be described which use silica-based optical waveguides formed on a silicon substrate as the optical waveguides. This is because the planar optical waveguides are superior not only in the integratability, but also in increasing the switch scale and reducing the fabrication cost. In addition, this is because the optical waveguides with this combination are low loss and stable, and are superior in matching with silica-based optical fibers. However, the present invention is not limited to these combinations. Furthermore, the waveguide-type optical switch will be described by way of example of a Mach-Zehnder interferometer type 2×2 basic component which is generally used. However, the present invention is not limited to these, and is applicable to other switches alike.

FIRST EMBODIMENT

FIG. 1 shows a configuration of the interferometer optical switch of a first embodiment in accordance with the present invention.

The interferometer optical switch of the present embodiment includes an optical multi/demultiplexing device (phase generating coupler) 111, the phase difference of the output of which has wavelength dependence; an optical multi/demultiplexing device 121; an optical delay line 131 between the optical multi/demultiplexing devices 111 and 121; phase shifters 141 formed in the optical delay line 131; input waveguides 101 and 102; and output waveguides 103 and 104.

Figure 41A:
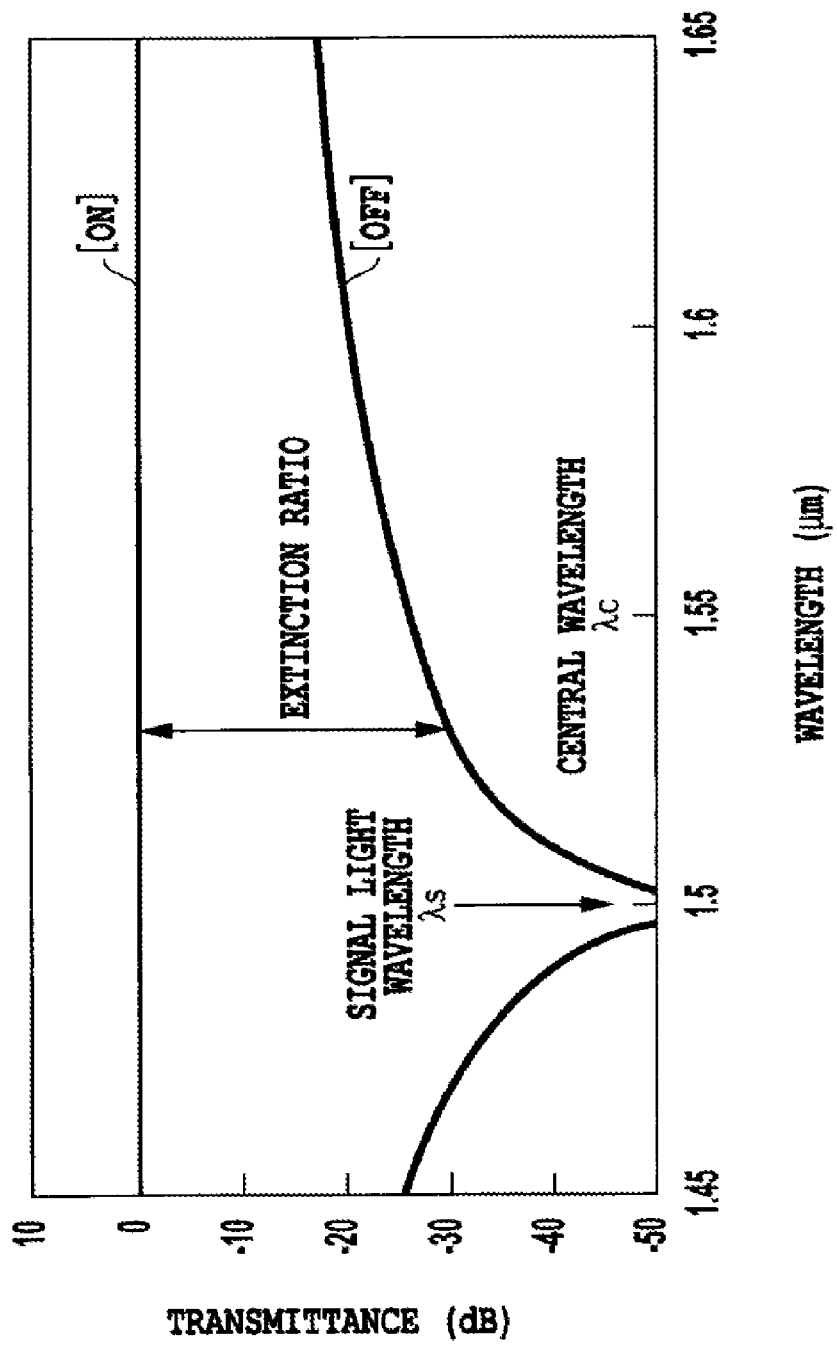
FIG. 41A is a graph illustrating the wavelength dependence of the transmittance of an asymmetric Mach-Zehnder interferometer optical switch of a first example of the conventional technique.

The transmission characteristics of the Mach-Zehnder interferometer is illustrated in FIG. 41A. it has a high extinction ratio at the signal wavelength λs, but the extinction ratio deteriorates as the wavelength departs from the signal wavelength. It will be possible to maintain a high extinction ratio throughout the wavelength region if the entire wavelength region can be made the signal wavelength. The signal wavelength is determined by the phase difference corresponding to the optical path length difference of the optical delay line. Therefore, if the optical delay line can be provided with an appropriate wavelength-dependent phase such that the phase difference is kept constant regardless of wavelength, it will be possible to make the entire wavelength region the signal wavelength.

This principle will be described in a more detail using mathematical expressions. When an optical signal is input via the input waveguide 101 of the Mach-Zehnder interferometer (see FIG. 37), the light intensity Pc output from the output waveguide 104 is given by the following expression.

$$P_C = 0.5 \cdot [1 + \cos\{2\pi\phi_{\Delta L}(\lambda)\}] \quad (5).$$

Where $\phi_{\Delta L}(\lambda)$ is the phase difference caused by the optical path length difference ΔL of the optical delay line 131, and λ is the wavelength. Here, assume that the following embodiments in accordance with the present invention use the phase difference represented in values normalized by 2π. In addition, it is assumed that the power coupling ratios of the two optical multi/demultiplexing devices constituting the Mach-Zehnder interferometer are a constant value of 0.5. It is obvious from the foregoing expression (5) that the output intensity of the conventional Mach-Zehnder interferometer has wavelength dependence in principle because the phase difference due to the path length difference of the optical delay line 131 varies with the wavelength.

If the phase difference due to the optical delay line 131 can be set constant for any wavelength, the Mach-Zehnder interferometer can be made wavelength insensitive. In view of this, the phase compensation is carried out by utilizing the phase difference of the light output from the optical multi/demultiplexing device 111. Assume that light are launched into the first optical multi/demultiplexing device 111 of the Mach-Zehnder interferometer; that the phase difference between the light output from the two optical waveguides of the optical multi/demultiplexing device 111 is $\phi_1(\lambda)$; that the light are launched into the two optical waveguides of the second optical multi/demultiplexing device 121 of the Mach-Zehnder interferometer; and that the phase difference between the light output from one of the output ports of the optical multi/demultiplexing device 121 is $\phi_2(\lambda)$, then the foregoing expression (5) can be changed as follows.

$$P_C = 0.5 \cdot [1 + \cos\{2\pi\{\phi_1(\lambda) + \phi_{\Delta L}(\lambda) + \phi_2(\lambda)\}\}] \quad (6).$$

Here, placing the sum of the phase differences $2\pi\{\phi_1(\lambda) + \phi_{\Delta L}(\lambda) + \phi_2(\lambda)\}$ at constant value regardless of wavelength, the output intensity can be made wavelength insensitive. This is the operation principle of the wavelength independent optical switch disclosed in the present invention.

More specifically, a case will now be described in which the principle of implementing the wavelength insensitiveness in accordance with the present invention is applied to the Mach-Zehnder interferometer optical switch. To operate as the optical switch, the output intensity must be zero in the OFF state, and one in the ON state. Accordingly, setting the sum $2\pi\{\phi_1(\lambda) + \phi_{\Delta L}(\lambda) + \phi_2(\lambda)\}$ of the phase difference at m·π (m is an integer) enables the switching operation because odd m corresponds to the OFF state, and even m corresponds to the ON state.

Next, the amount of phase difference that needs to be created by the optical multi/demultiplexing device 111 to make the sum of the phase difference at constant value will be derived. Since $\phi_{\Delta L}(\lambda)$ is given by $-\phi L/\lambda$, the required phase $\Psi(\lambda)$ is given by the following expression.

$$\Psi(\lambda) - \Delta L/\lambda = m/2 \; (m \text{ is an integer}) \quad (7).$$

Figure 2:
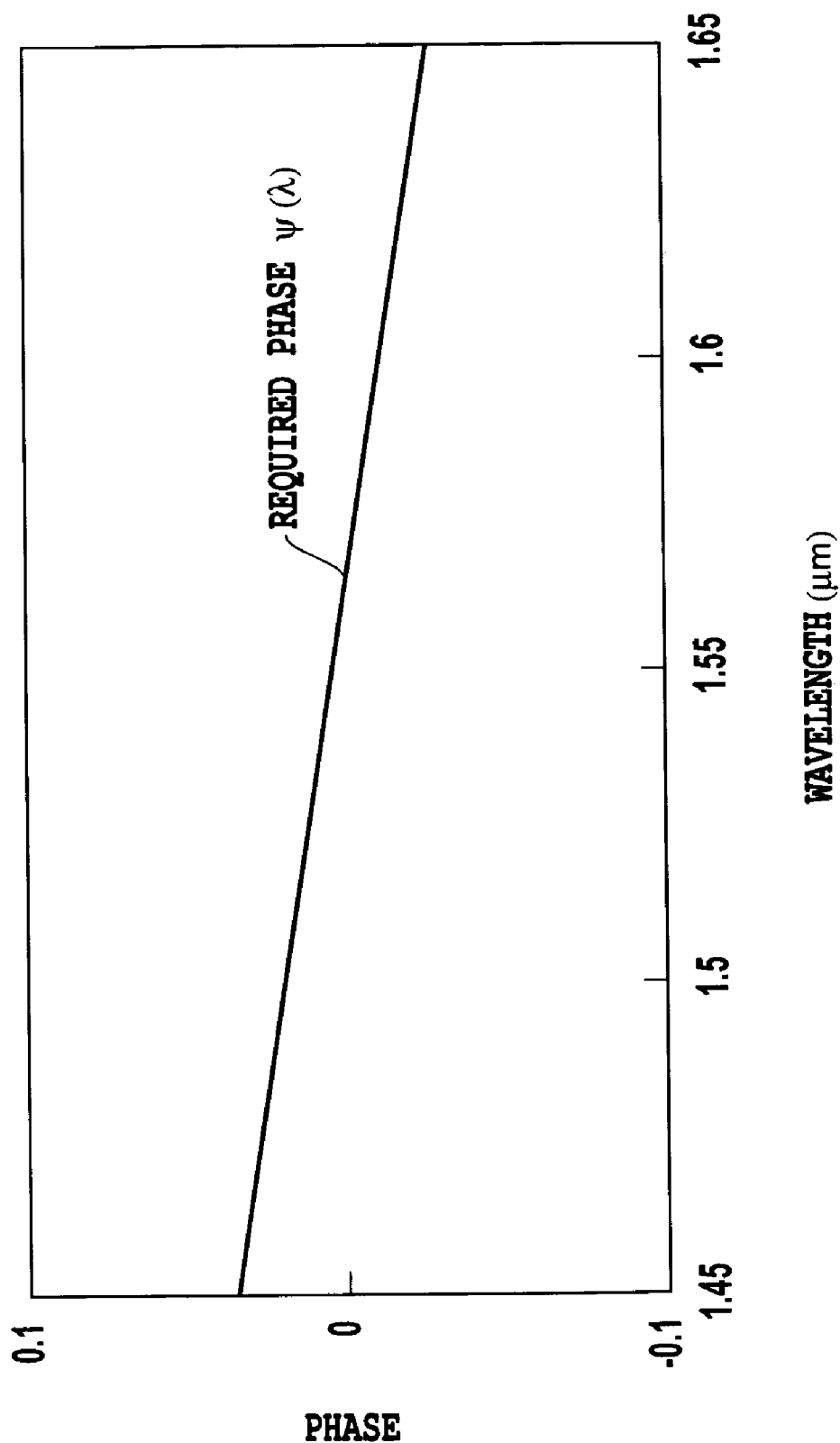
FIG. 2 is a graph illustrating the wavelength dependence of the phase required in the first embodiment in accordance with the present invention.
Figure 3:
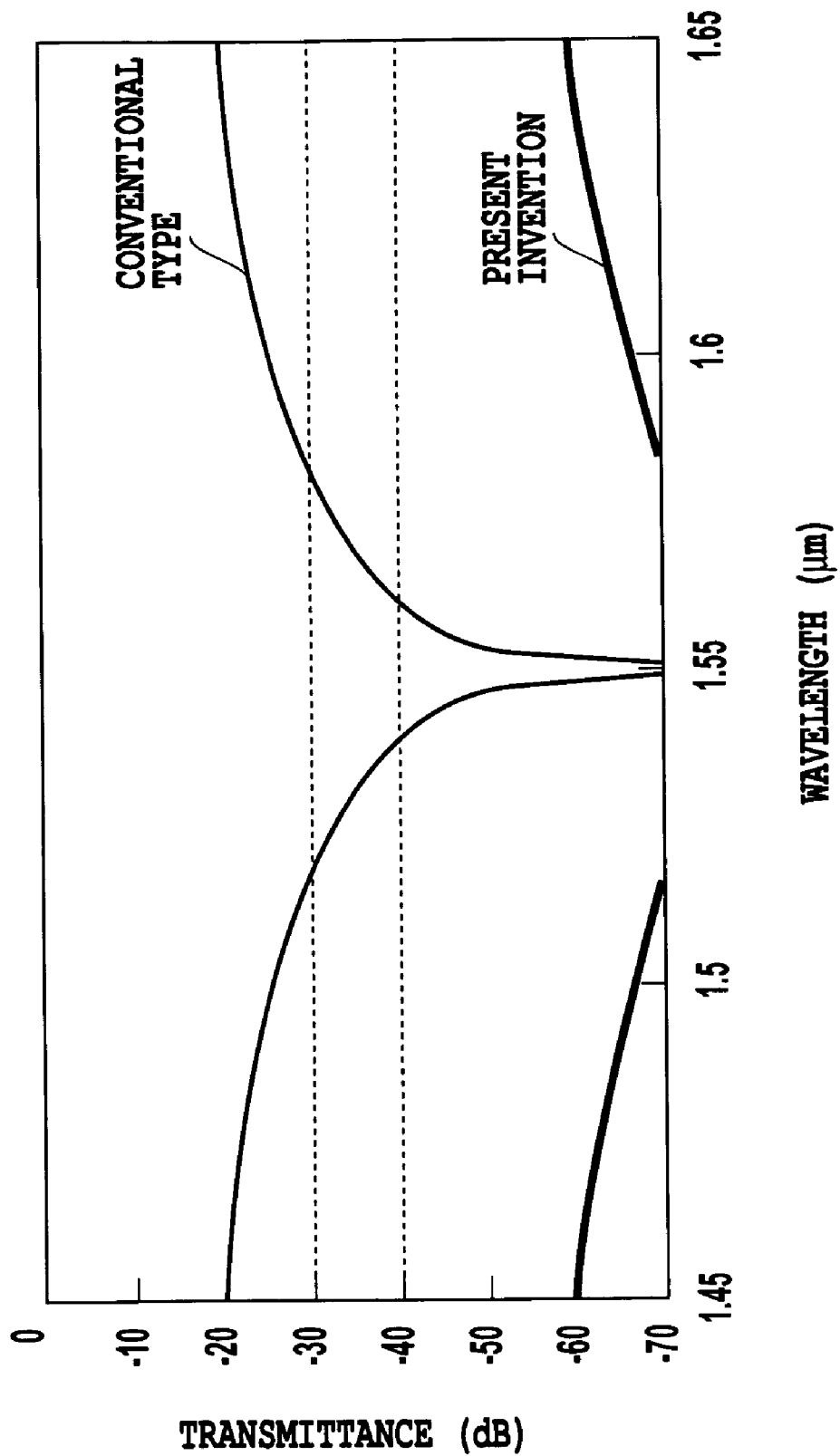
FIG. 3 is a graph illustrating the wavelength dependence of the transmittance in the OFF state of an interferometer optical switch of the first embodiment in accordance with the present invention.

Here, FIG. 2 illustrates the wavelength dependence of the required phase $\Psi(\lambda)$ when m=−1 and ΔL=λc/2 (λc is the center wavelength of the wavelength band equal to 1.55 μm), for example. FIG. 3 illustrates the wavelength dependence of the transmission characteristics of the Mach-Zehnder interferometer optical switch when the optical delay line 131 is provided with a phase given by equation (7). It is seen that the wavelength-dependent phase difference due to the path length difference of the optical delay line 131 is compensated for, and that the high extinction ratio is obtained over a broad wavelength region.

As a method of providing the actual Mach-Zehnder interferometer with the required phase as illustrated in FIG. 2, a case of using an optical multi/demultiplexing device, the phase difference of the output of which has wavelength dependence, will be described. From now on, such an optical multi/demultiplexing device is called a phase generating coupler (PGC). As a method of implementing the optical multi/demultiplexing device, the phase difference of the output of which has wavelength dependence, a variety of means are conceivable. For example, a phase generating coupler can be constructed by optical couplers and optical delay lines. In the present embodiment, the phase generating coupler is realized by an optical multi/demultiplexing device composed of N+1 optical couplers (N is a natural number) and N optical delay lines that connects adjacent optical couplers. The advantage of using this type of an optical multi/demultiplexing device for the phase generating coupler is that both the power coupling ratio and the phase difference produced by this optical multi/demultiplexing device can be set at arbitrary values, by setting the power coupling ratios of the N+1 optical couplers and the optial path length differences of the N optical delay lines at appropriate values. In addition, the flexibility of parameter setting increases with an increase of N, thereby being able to improve the degree of approximation to the target characteristics. Furthermore, the configuration has a characteristic that it has no loss in principle.

The interferometer optical switch of the present embodiment as illustrated in FIG. 1 uses only one phase generating coupler 111. Assume that light are launched into the phase generating coupler 111; that the phase difference between the outputs of the two optical waveguides of the phase generating coupler 111 is $\phi(\lambda)$; that light are launched into the two optical waveguides of the optical multi/demultiplexing device 121; and that the phase difference between the light output from the optical multi/demultiplexing device 121 is $\phi_c$ (constant), the wavelength-dependent phase difference produced by the phase generating coupler 111 is set as follows.

$$\phi(\lambda) = \Delta L/\lambda + m/2 - \phi_c \; (m \text{ is an integer}) \quad (8).$$

Figure 4:
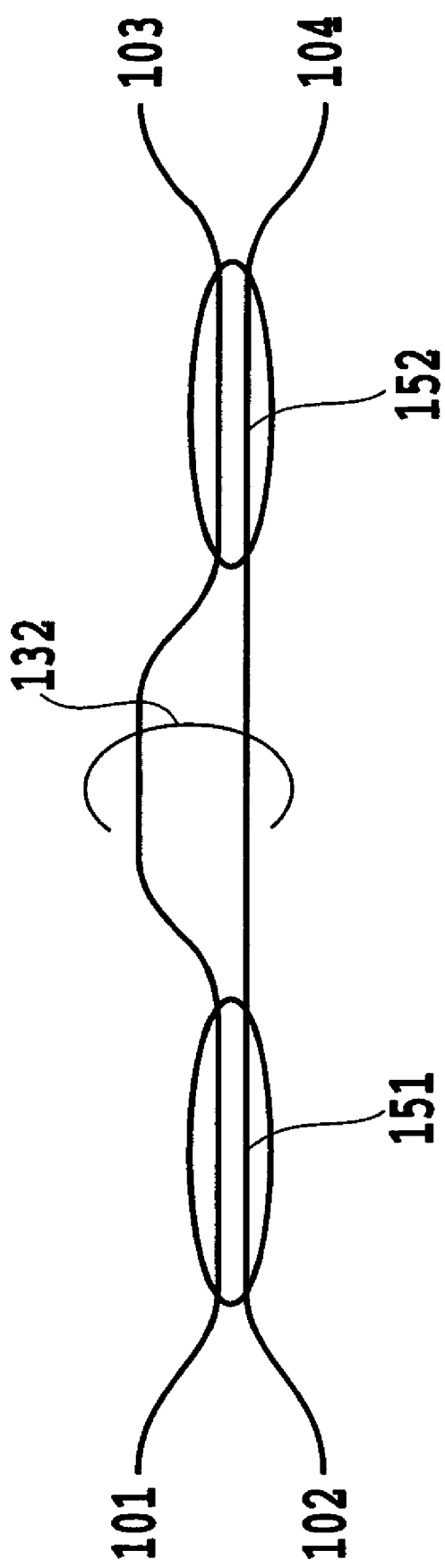
FIG. 4 is a schematic diagram of a phase generating coupler used in the first embodiment in accordance with the present invention.

FIG. 4 shows an example of the phase generating coupler 111. The optical multi/demultiplexing device (phase generating coupler) 111 as shown in FIG. 4 includes two directional couplers 151 and 152; a minute optical delay line 132 consisting of two optical waveguides interconnecting the two directional couplers 151 and 152; input waveguides 101 and 102; and output waveguides 103 and 104.

The power coupling ratios of the two directional couplers 151 and 152 and the path length difference of the single minute optical delay line 152 are obtained by using multiple regression analysis in such a manner that the power coupling ratio of the optical multi/demultiplexing device 111 becomes about 0.5 at the center wavelength λc=1.55 μm of the wavelength region and that the phase difference of the light launched from the optical multi/demultiplexing device 111 satisfies the foregoing expression (8).

The foregoing expressions (5) and (6) are derived under the assumption that the power coupling ratios of the first and second optical multi/demultiplexing devices are equal to a constant 0.5 for the purpose of simplicity. In practice, however, it is necessary to consider the wavelength dependence of the power coupling ratio of the optical multi/demultiplexing device. When using the Mach-Zehnder interferometer optical switch in the cross output OFF state, if the power coupling ratios of the first and second optical multi/demultiplexing devices are equal, high extinction ratio can be obtained by carrying out the phase compensation described above. Thus, the optical multi/demultiplexing devices are set such that the power coupling ratios of the first and second optical multi/demultiplexing devices have nearly the same wavelength dependence.

Figure 5:
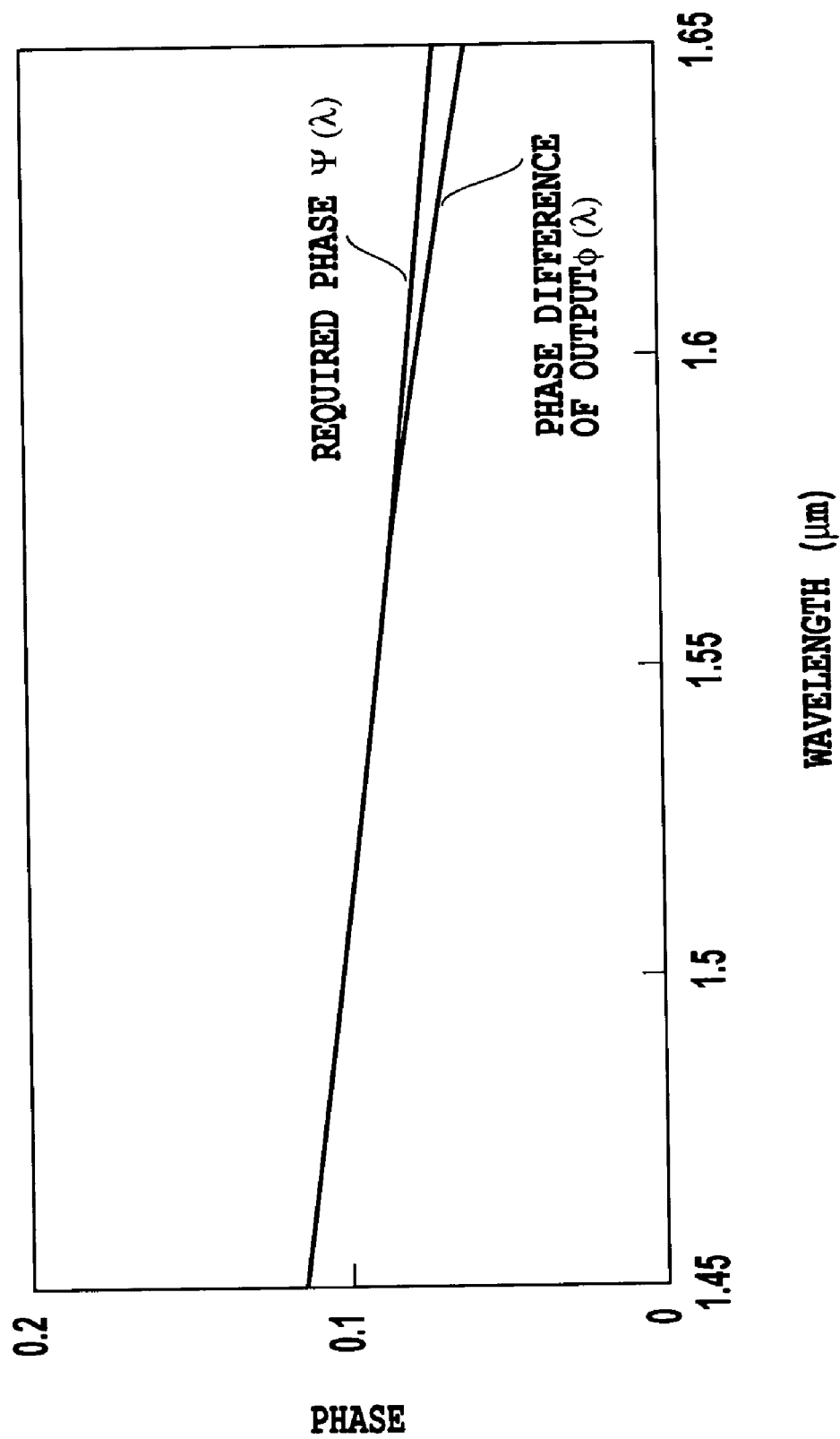
FIG. 5 is a graph illustrating the wavelength dependence of the required phase and the phase difference produced by the phase generating coupler used in the first embodiment in accordance with the present invention.
Figure 6:
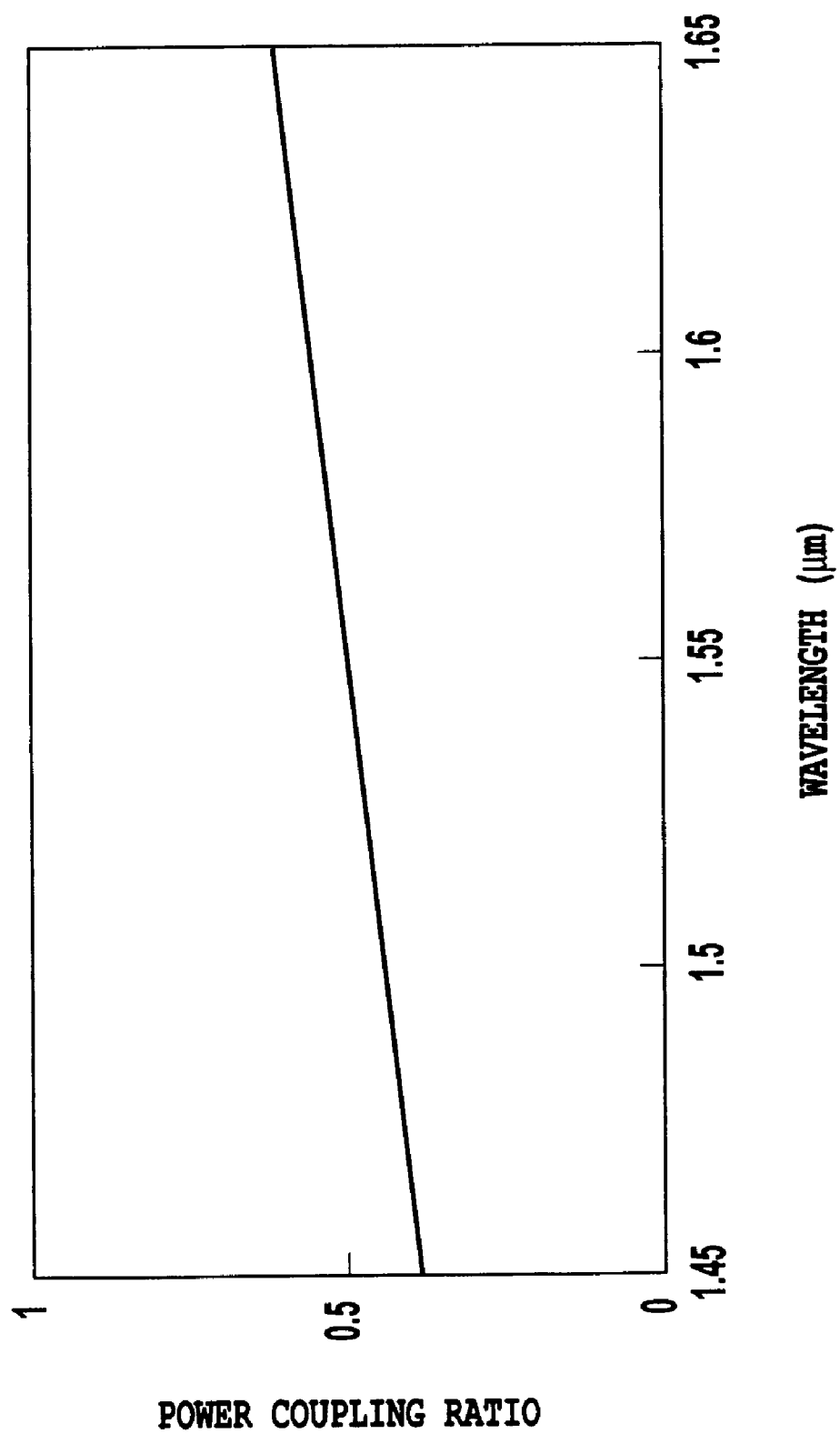
FIG. 6 is a graph illustrating the wavelength dependence of the power coupling ratio of the phase generating coupler used in the first embodiment in accordance with the present invention.

A light is input via the input waveguide 101 of the designed phase generating coupler. In this case, the wavelength-dependent phase difference φ(λ) between the light output from the output waveguides 103 and 104 and the wavelength dependence of the power coupling ratio are shown in FIG. 5 and FIG. 6, respectively. In addition, FIG. 5 simultaneously shows the phase Ψ(λ) that needs to be generated by the phase generating coupler, that is, the desired function represented by the right side of the foregoing expression (8). In FIG. 5 and FIG. 6, ΔL is set at 0.34 λc (≈0.53 μm), m is set at −1, and $\phi_c$ is set at −¼ as a numerical example. It is seen from these figures that the phase generating coupler functions as a 3 dB optical multi/demultiplexing device with the power coupling ratio of about 0.5, and that the phase difference φ(λ) of the output is nearly equal to the phase Ψ(λ) required for achieving the wavelength insensitiveness.

Figure 7:
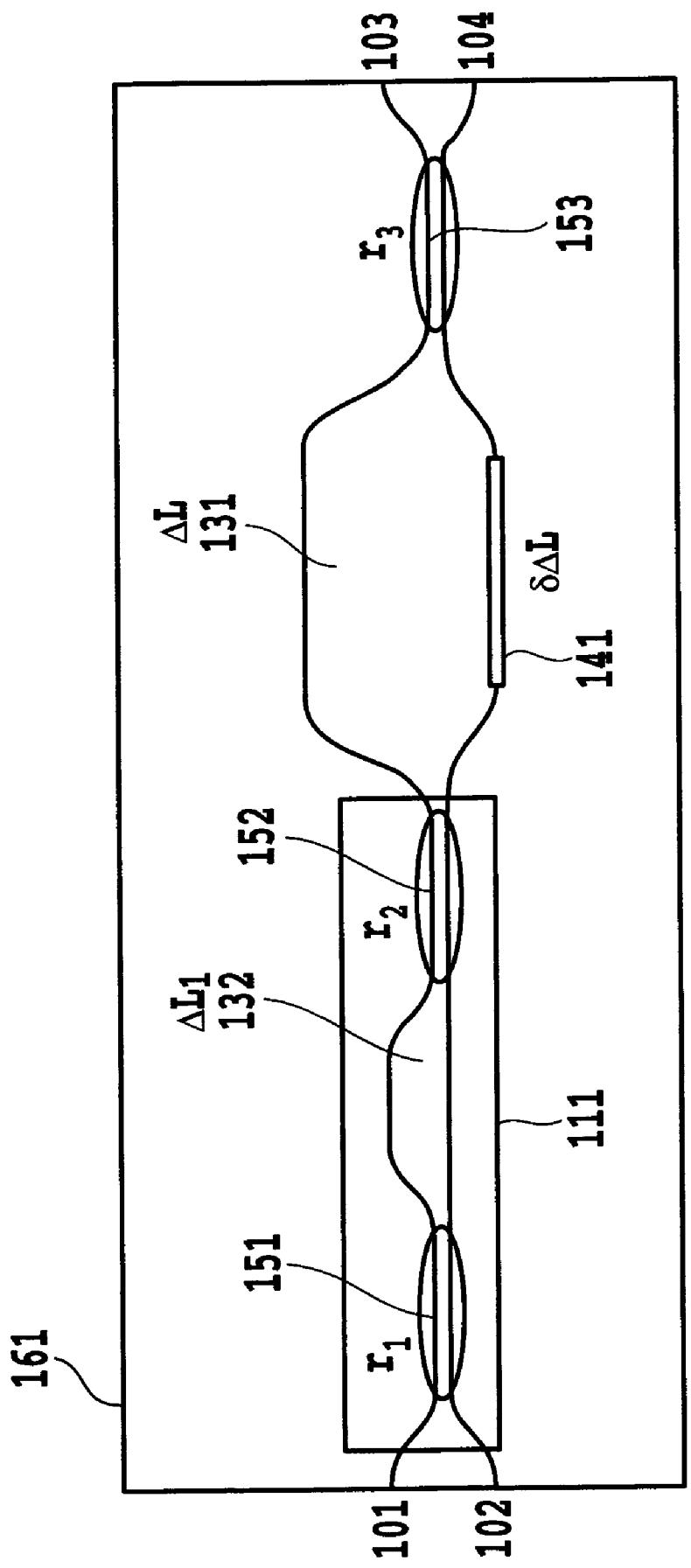
FIG. 7 is a schematic diagram showing a configuration of an interferometer optical switch of the first embodiment in accordance with the present invention.

FIG. 7 is a plan view showing an interferometer optical switch using the phase generating coupler 111. The power coupling ratios of the directional couplers 151 and 152 constituting the phase generating coupler 111 were set at $r_1$=0.3 and $r_2$=0.7, and the path length difference of the minute optical delay line 131 was set at $\Delta L_1$=0.30 λc (≈0.47 μm). In addition, the path length difference of the Mach-Zehnder interferometer 131 was set at ΔL=0.34 λc (≈0.53 μm), and the power coupling ratio of the directional coupler 153 was set at $r_3$=0.5. Here, the path length difference represents the relative optical path length of the upper optical waveguide with respect to the lower optical waveguide. The spacing between the two optical waveguides interconnecting the optical multi/demultiplexing device 111 and the directional coupler 153 of the interferometer optical switch was made 250 μm. As the phase shifter 141, a thin film heater was used and its width was set at 40 μm, and length at 4 mm.

According to the foregoing design values, the silica-based optical waveguide circuit was fabricated by using flame hydrolysis deposition, photolithography technique and reactive ion etching. It was fabricated such that the relative refractive index of the optical waveguides was 0.75% and the core cross section of the optical waveguides was 6×6 μm².

A chip on which the interferometer optical switch was formed was diced, and its switching characteristics were evaluated. Here, the switching operation of a gate switch will be described which uses the fabricated optical waveguide circuit as a basic component.

When the phase shifter (thin film heater) 141 is in the OFF state, the switch is in the bar state. Thus, the optical signal input via the input waveguide 101 is output from the output waveguide 103, but not from the output waveguide 104. In this state, if the thin film heater 141 is activated, the optical path length is varied by an amount of half wavelength of the optical signal (0.5 λc·k: where k is an integer other than zero) by the thermooptic effect, and the path length difference becomes ΔL+δΔL=0.34 λc−0.5 λc=−0.16 λc. In this case, the phase shifter (thin film heater) 141 is in the ON state, and the switch is in the cross state. Thus, the optical signal input via the input waveguide 101 is output from the output waveguide 104. In other words, when considering 101 as the input port, and 104 as the output port, the optical signal is not output when the phase shifter is in the OFF state, but is output when the phase shifter is the ON state, which means that the switch functions as the gate switch. When considering 102 as the input port, similar switching operation was confirmed.

Figure 8:
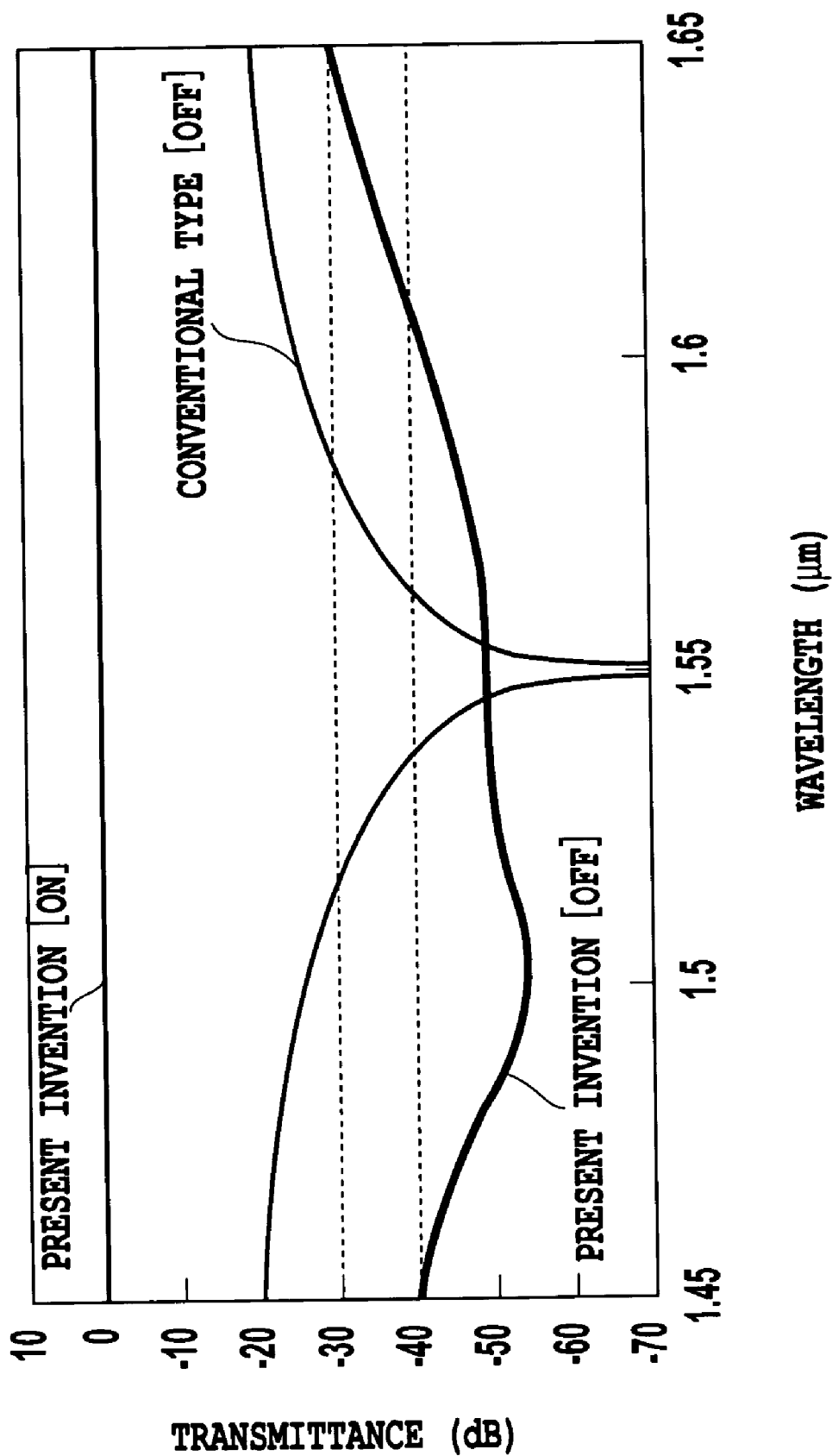
FIG. 8 is a graph illustrating the wavelength dependence of the transmittance of the interferometer optical switch of the first embodiment in accordance with the present invention.
Figure 37:
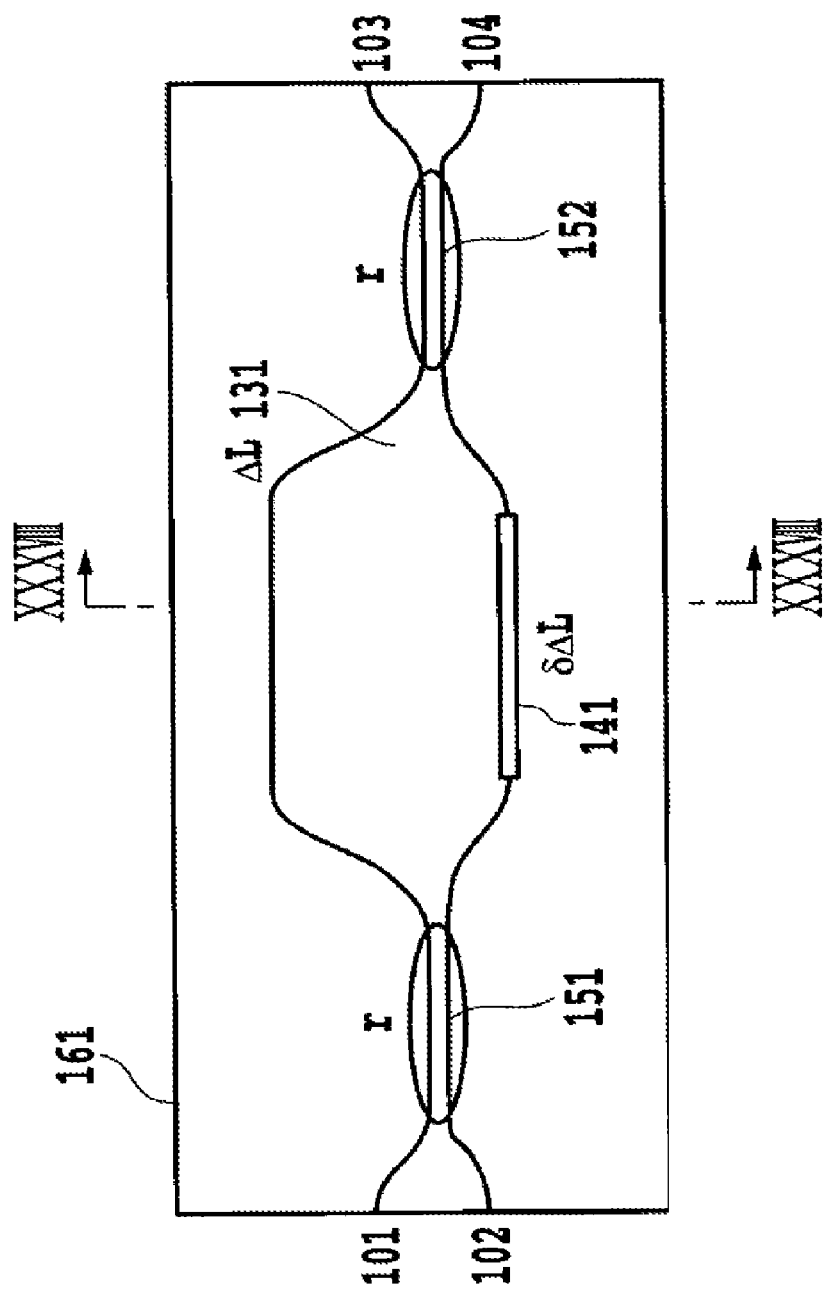
FIG. 37 is a schematic diagram showing a configuration of a conventional Mach-Zehnder interferometer optical switch.
Figure 38:
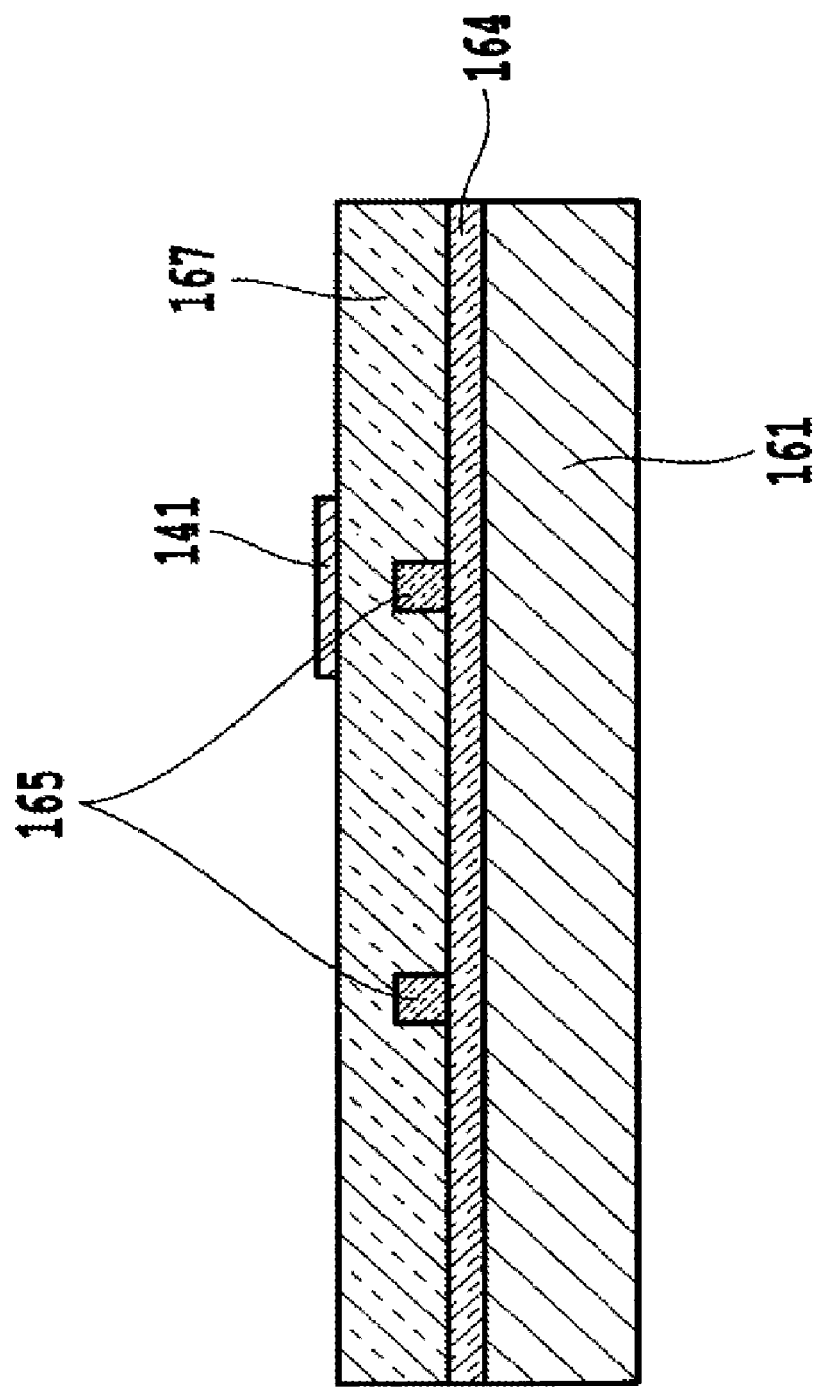
FIG. 38 is a cross-sectional view of the conventional Mach-Zehnder interferometer optical switch.
Figure 39:
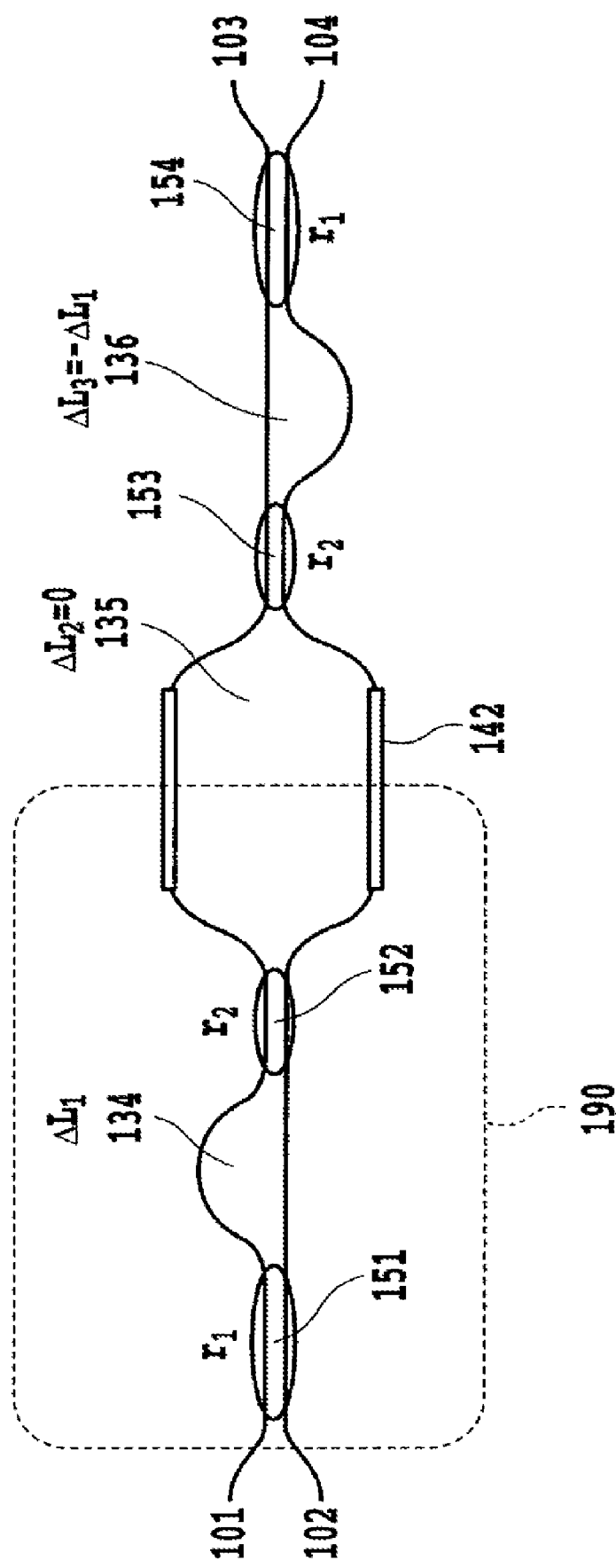
FIG. 39 is a schematic diagram showing a configuration of a conventional wavelength insensitive switch (WINS)
Figure 40:
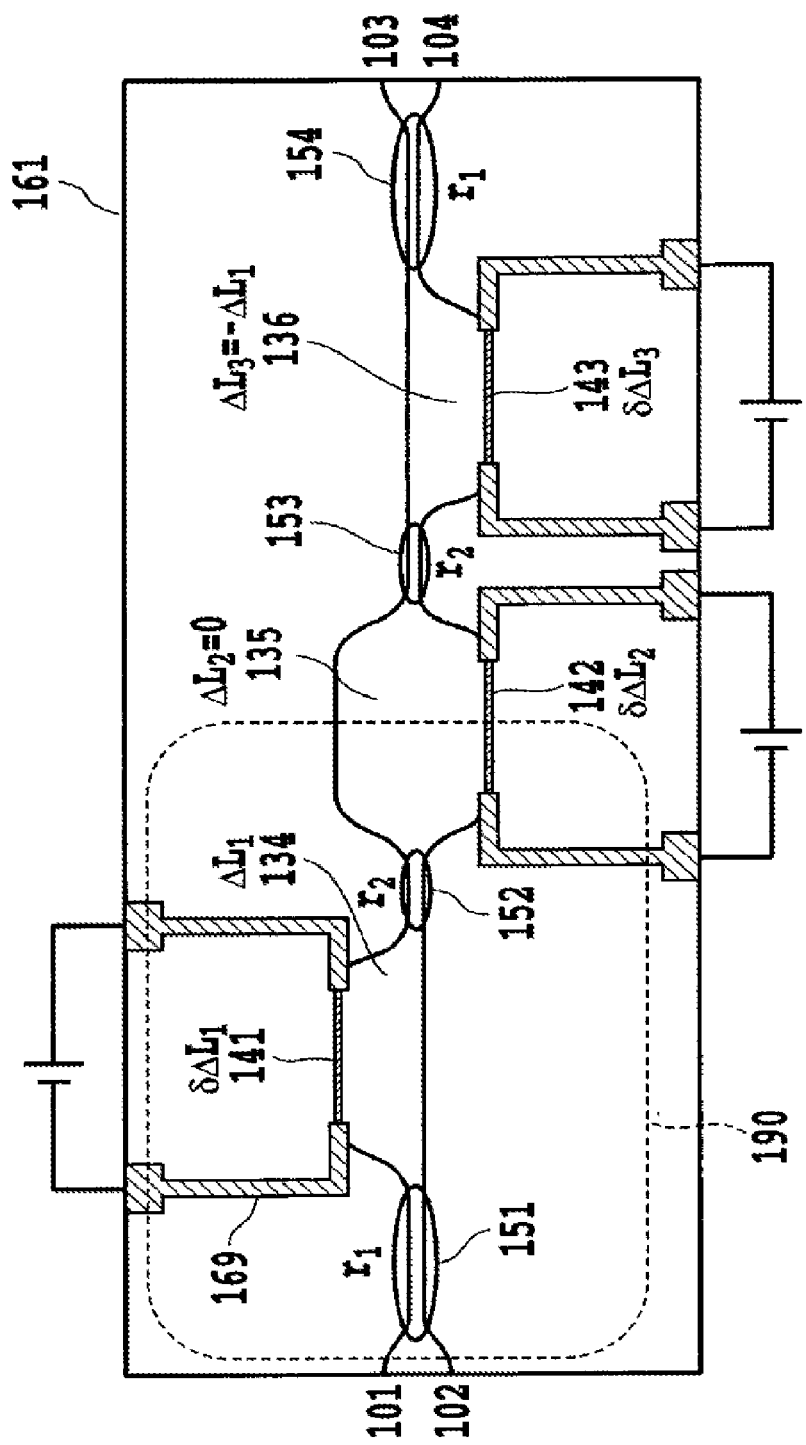
FIG. 40 is a schematic diagram showing a configuration of a conventional wavelength insensitive switch (WINS)

Next, FIG. 8 illustrates the wavelength characteristics of the measured transmittance. The wavelength dependence of the transmittance of the conventional Mach-Zehnder interferometer optical switch as shown in FIG. 37 is also illustrated for comparison.

When the phase shifter (thin film heater) 141 is in the OFF state, the interferometer optical switch of the present embodiment can achieve a high extinction ratio of greater than or equal to 40 dB over a broad wavelength band of 1.45-1.6 μm. When the phase shifter is brought into the ON state, the interferometer optical switch of the present embodiment achieves a good insertion loss over broad wavelength band.

Thus, we confirmed that using the principle completely different from that of the conventional technique, the interferometer optical switch of the present embodiment implements a compact switch that has a high extinction ratio over a wide range and is operational with only one phase shifter. In addition, since it carries out the switching operation in the broad wavelength band, it has large tolerance for the power coupling ratio error of the optical multi/demultiplexing devices and the path length difference error of the optical delay line. As a result, the present embodiment implements an interferometer optical switch that can maintain a high extinction ratio even if there is fabrication error.

As described above, the interferometer optical switch described in the present embodiment is designed such that a high extinction ratio is obtained in a wavelength range of 1.45-1.65 μm. Besides, a high extinction ratio can be obtained at any wavelength region, for example 1 um to 2 um, by providing an appropriate phase with optimum design. In addition, an optical multi/demultiplexing device composed of N+1 optical multi/demultiplexing devices and N optical delay lines that connects adjacent optical multi/demultiplexing devices is used as a phase generating coupler, which is an optical coupler that is capable of producing a wavelength-dependent phase difference. However, it is obvious that other optical multi/demultiplexing devices can also be used to realize a phase generating coupler. Furthermore, its configuration is not limited to that described in the present embodiment. For example, a configuration is also possible which includes three optical multi/demultiplexing devices and two optical delay lines sandwiched between the adjacent optical multi/demultiplexing devices. Alternatively, a configuration is possible in which the phase generating coupler is constructed by combining different optical multi/demultiplexing devices. In addition, the optical multi/demultiplexing devices are not limited to the directional couplers the present embodiment uses, but other types of couplers such as multimode interferometers can be used. Besides, a plurality of types of optical multi/demultiplexing devices can be used such as using a directional coupler and a multimode interferometer as one of and the other of the optical multi/demultiplexing devices constituting the phase generating coupler.

Thus, the phase characteristics can be set considering the wavelength dependence of the power coupling ratios of the optical multi/demultiplexing devices used. In addition, locally varying the refractive index of the optical waveguides enables the adjustment of the optical path length difference and of the coupling characteristics and phase characteristics of the optical multi/demultiplexing devices. Furthermore, although 101 and 102 are used as the input waveguides in the present example, the same advantages are obtained by using 103 and 104 as the input waveguides, and 101 and 102 as the output waveguides. Besides, although it is designed in such a manner that m becomes −1, m can be +1 or some other integer.

As described above, the present invention is not limited to the configuration described here. For example, considering the entire circuit as a whole, it can configure the interferometer optical switch capable of maintaining a high extinction ratio over a broad band regardless of the type of the waveguides, the geometry of the waveguides, the material of the waveguides, wavelength band, or the type of the optical multi/demultiplexing devices. The present invention is implemented by setting the sum of the phase difference of the outputs of the optical multi/demultiplexing devices and the path length difference of the optical delay line at a constant value in the wavelength region or the frequency region being used.

First Variation of First Embodiment

A first variation of the first embodiment in accordance with the present invention uses the same configuration as the interferometer optical switch of the first embodiment as shown in FIG. 7.

To meet the conditions that the power coupling ratio of the phase generating coupler 111 is about 0.5 at the center wavelength $\lambda c=1.55$ µm of the wavelength region, and the phase difference between the output light satisfies the foregoing expression (8), the power coupling ratios of the two directional couplers 151 and 152, and the path length difference of a minute optical delay line 132 were obtained by polynomial approximation. As a result, the power coupling ratios of the directional couplers 151 and 152 were set at $r_1=0.1$ and $r_2=0.6$, respectively, the path length difference of the minute optical delay line 132 was set at $\Delta L_1=0.27 \cdot \lambda c$ (≈0.38 µm), and the power coupling ratio of the directional coupler 153 was set at $r_3=0.5$. In addition, the path length difference of the Mach-Zehnder interferometer was set at $\Delta L=0.37 \cdot \lambda c$ (≈0.53 µm), and the spacing between the two optical waveguides interconnecting the optical multi/demultiplexing device 111 and the directional coupler 153 was made 250 µm. Here, the path length difference represents the relative optical path length of the upper optical waveguide with respect to the lower optical waveguide. As the phase shifter 141, a thin film heater was used and its width was set at 40 µm, and length at 4 mm.

According to the foregoing design values, the silica-based optical waveguide circuit was fabricated by using flame hydrolysis deposition, photolithography technique and reactive ion etching. It was fabricated such that the relative refractive index of the optical waveguides was 1.5% and the core cross section of the optical waveguides was 4.5×4.5 µm².

Thus, the present example uses the waveguides with the relative refractive index higher than that of the conventional waveguides. This is because the high relative refractive index of the waveguide can reduce the minimum radius of curvature of the waveguides, and hence can downsize the circuit, although the excess loss such as a fiber coupling loss increases.

A chip on which the interferometer optical switch was formed was diced, a heatsink (not shown) was disposed under the silicon substrate 161, single mode fibers (not shown) were connected to the input/output waveguides 101-104, and feeder leads (not shown) were connected to the thin film heater 141, thereby forming a two-input, two-output optical switch module. Forming the interferometer optical switch of the present embodiment into a module can facilitate the introduction of the switch to optical communication systems such as optical cross connect systems and optical add/drop multiplexing systems.

Next, the evaluation was made of the switching characteristics of the fabricated interferometer optical switch module. Here, the switching operation will be described in the case where the switch module is used as the gate switch using the fabricated optical waveguide circuit as the basic component. When the phase shifter (thin film heater) 141 is in the OFF state, the switch is in the bar state. Thus, the optical signal input via the input waveguide 101 is output from the output waveguide 103, but not from the output waveguide 104. Although not shown in FIG. 7, by supplying power to the thin film heater formed on the upper side optical waveguide (first optical waveguide) of the two delay lines of the optical delay line 131, the optical path length was varied by an amount corresponding to half the wavelength of the optical signal (0.5 $\lambda c \cdot k$: k is an integer other than zero) by the thermooptic effect, and the path length difference became $\Delta L+\delta\Delta L=0.30$ $\lambda c+0.50 \lambda c=0.80 \lambda c$. In this case, the switch was in the cross state when the phase shifter (thin film heater) 141 was in the ON state, and hence the optical signal input via the input waveguide 101 was output from the output waveguide 104. Thus, we confirmed that the switch functions as a gate switch. Although the foregoing λ is assumed to have a value +1 in the present example, it is obvious that k can take other values.

Figure 9:
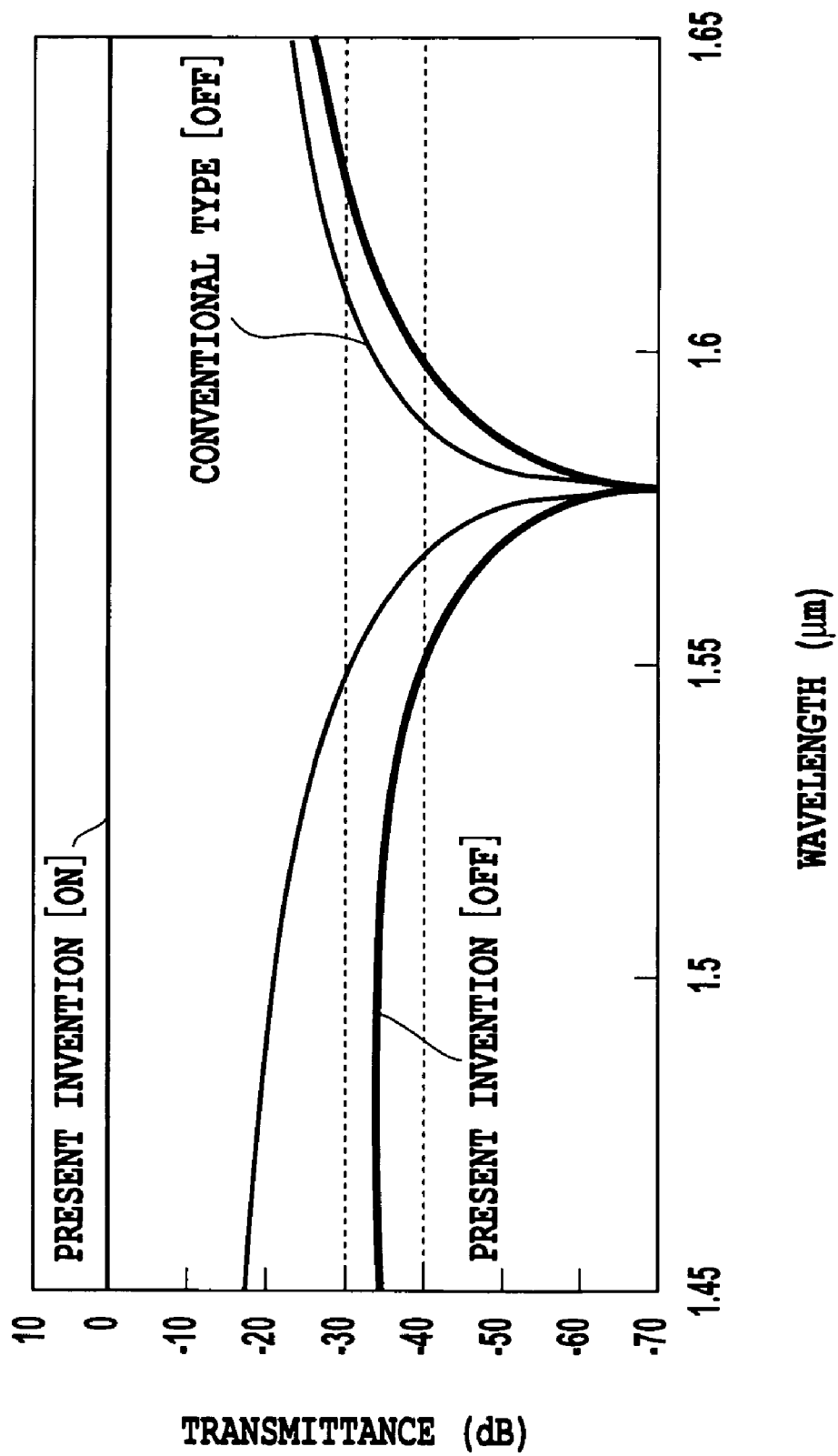
FIG. 9 is a graph illustrating the wavelength dependence of the transmittance of the interferometer optical switch in a first variation of the first embodiment in accordance with the present invention.

FIG. 9 illustrates the wavelength characteristics of the measured transmittance. The wavelength dependence of the transmittance of the conventional Mach-Zehnder interferometer optical switch as shown in FIG. 37 is also illustrated for comparison. When the phase shifter was in the OFF state, the interferometer optical switch of the present embodiment was able to achieve a high extinction ratio in a broader wavelength band than the conventional optical switch. When the phase shifter was brought into the ON state, the interferometer optical switch of the present embodiment achieved a good insertion loss in the broad wavelength band.

Second Variation of First Embodiment

A second variation of the first embodiment in accordance with the present invention uses the same configuration as the interferometer optical switch of the first embodiment shown in FIG. 7.

To meet the conditions that the power coupling ratio of the phase generating coupler 111 is about 0.45 at the center wavelength $\lambda c=1.55$ µm of the wavelength region, and the phase difference between the output light satisfies the foregoing expression (8), the power coupling ratios of the two directional couplers 151 and 152, and the path length difference of the minute optical delay line 132 were obtained by least square approximation. As a result, the power coupling ratios of the directional couplers 151 and 152 were set at $r_1=0.4$ and $r_2=0.8$, respectively, the path length difference of the minute optical delay line 132 was set at $\Delta L_1=0.30\cdot\lambda c$ (≈0.47 µm), and the power coupling ratio of the directional coupler 153 was set at $r_3=0.5$. In addition, the path length difference of the Mach-Zehnder interferometer was set at $\Delta L=0.32\cdot\lambda c$ (≈0.50 µm), and the spacing between the two optical waveguides interconnecting the optical multi/demultiplexing device 111 and the directional coupler 153 was made 250 µm. Here, the path length difference represents the relative optical path length of the upper optical waveguide with respect to the lower optical waveguide. As the phase shifter, a thin film heater was used and its width was set at 40 µm, and length at 4 mm. As for the path length difference of the Mach-Zehnder interferometer, it was initially set at $\Delta L=0$ µm, and after the circuit was fabricated, permanent local heat processing with a thin film heater was carried out to vary the refractive index of the waveguides, thereby adjusting the optical path length difference to $\Delta L=0.32\,\lambda c$ (≈0.50 µm).

Thus, in this invention, the optical path length refers to the effective optical path length of the waveguide, which takes into consideration both the wavelength-dependent refractive index and the path length of the waveguide. Accordingly, the optical path length can be altered by varying the refractive index of the waveguides even after forming the waveguides. Consequently, after the interferometer optical switch with the path length difference of zero has been formed, the optical path length difference can be adjusted to the design value by varying the refractive index of the waveguides in the fabrication process. In addition, the fabrication error can be removed by using the permanent local heat processing using the thin film heater. In other words, even if the optical path length difference deviates from the design value because of the fabrication error, the path length difference can be corrected to the design value by adjusting the refractive index after the fabrication. Incidentally, the reason why the present embodiment uses the thin film heater is that the thin film heater has already been formed on the optical waveguide as the phase shifter. Besides, the thin film heater formed on the optical waveguide enables the refractive index to be adjusted simply and accurately. It is needless to say that the adjusting method of the refractive index is not limited to the thin film heater, but other means such as light irradiation with a laser can also be used. In addition, although the present embodiment uses the thin film formed for the switching operation to perform the local heat treatment, another thin film heater can be installed to be used specifically for the local heat treatment to adjust the refractive index. Furthermore, the characteristics of the optical multi/demultiplexing device 111 can be corrected by adjusting the refractive index of the optical waveguides of the directional couplers 151 and 152 or of the minute optical delay line 132 constituting the optical multi/demultiplexing device 111.

According to the foregoing design values, the silica-based optical waveguide circuit was fabricated by using flame hydrolysis deposition, photolithography technique and reactive ion etching. It was fabricated such that the relative refractive index of the optical waveguides was 0.75%, and the core cross section of the optical waveguides was 6×6 µm².

A chip on which the interferometer optical switch was formed was diced, a heatsink (not shown) was disposed under the silicon substrate 161, dispersion shifted fibers (not shown) were connected to the input/output waveguides 101-104, and feeder leads (not shown) were connected to the thin film heater 141, thereby forming a two-input, two-output optical switch module.

Next, the evaluation was made of the switching characteristics of the interferometer optical switch module fabricated as described above. Here, the switching operation will be described in the case where the switch is used as the gate switch employing the fabricated optical waveguide circuit as the basic component. When the phase shifter (thin film heater) 141 is in the OFF state, the switch is in the bar state. Thus, the optical signal input via the input waveguide 101 is output from the output waveguide 103, but not from the output waveguide 104. Here, by supplying power to the thin film heater 141, the optical path length was varied by an amount corresponding to half the wavelength of the optical signal (0.5 $\lambda c\cdot k$: k is an integer other than zero) by the thermooptic effect, and the path length difference became $\Delta L+\delta\Delta L=0.32\,\lambda c-0.50\,\lambda c=-0.18\,\lambda c$. In this case, the switch was in the cross state when the phase shifter (thin film heater) 141 was in the ON state, and hence the optical signal input via the input waveguide 101 was output from the output waveguide 104. Thus, we confirmed that the switch functions as a gate switch.

Figure 10:
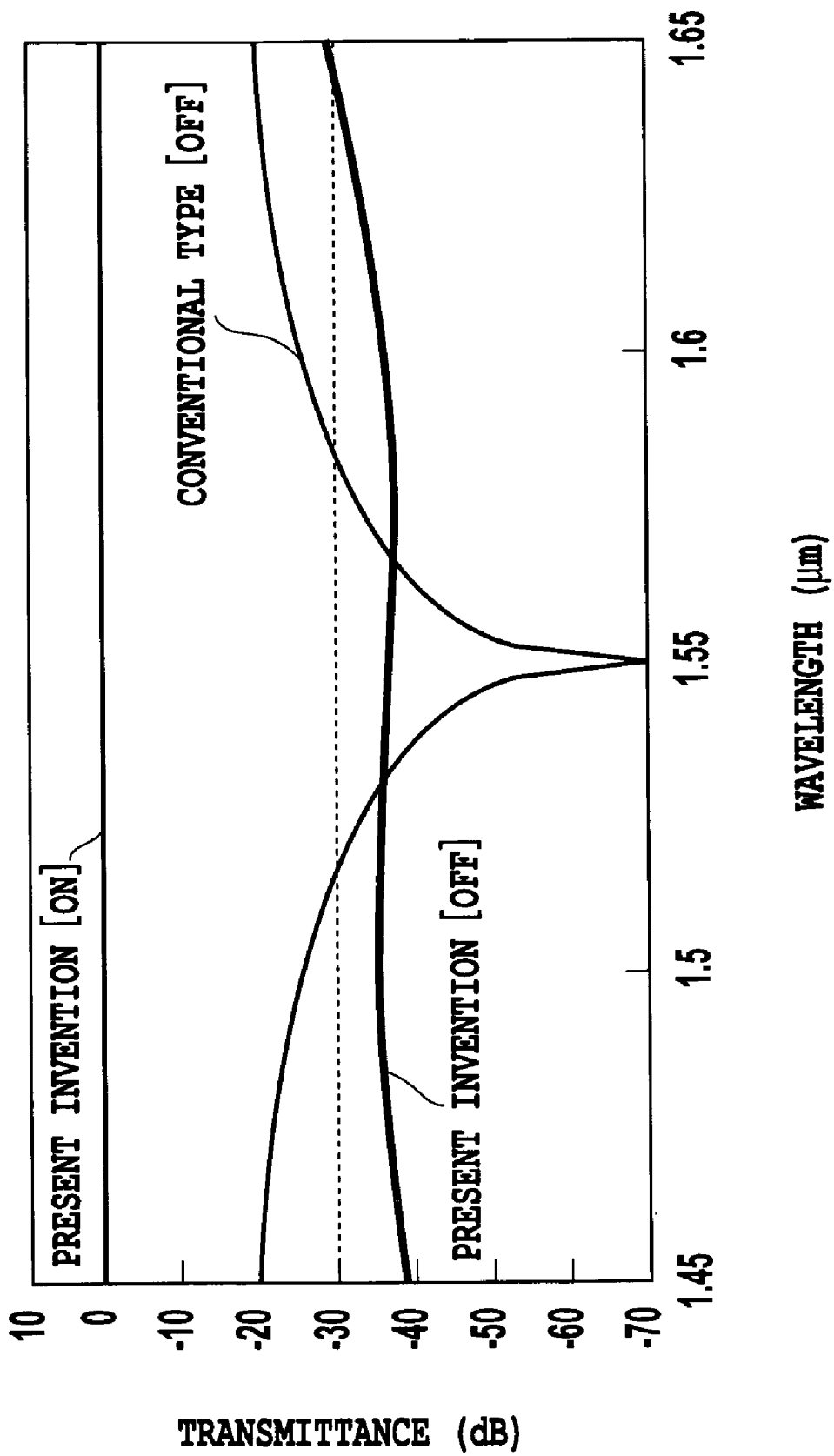
FIG. 10 is a graph illustrating the wavelength dependence of the transmittance of the interferometer optical switch in a second variation of the first embodiment in accordance with the present invention.

FIG. 10 illustrates the wavelength characteristics of the measured transmittance. The wavelength dependence of the transmittance of the conventional Mach-Zehnder interferometer optical switch as shown in FIG. 37 is also illustrated for comparison. When the phase shifter was in the OFF state, the interferometer optical switch of the present embodiment achieved an extinction ratio greater than or equal to 30 dB over a broad wavelength band of 1.45-1.63 µm. When the phase shifter was brought into the ON state, the interferometer optical switch of the present embodiment achieved a good insertion loss over the broad wavelength band. Although the present example is designed such that the power coupling ratio (0.45) of the first optical multi/demultiplexing device (phase generating coupler 111) and the power coupling ratio (0.5) of the second optical multi/demultiplexing device (directional coupler 153) differ from each other, it can achieve a high extinction ratio over a broader wavelength band than the conventional optical switch. Thus, the first and second optical multi/demultiplexing devices can have different power coupling ratios, and the power coupling ratios can have different wavelength dependence.

SECOND EMBODIMENT

Figure 11:
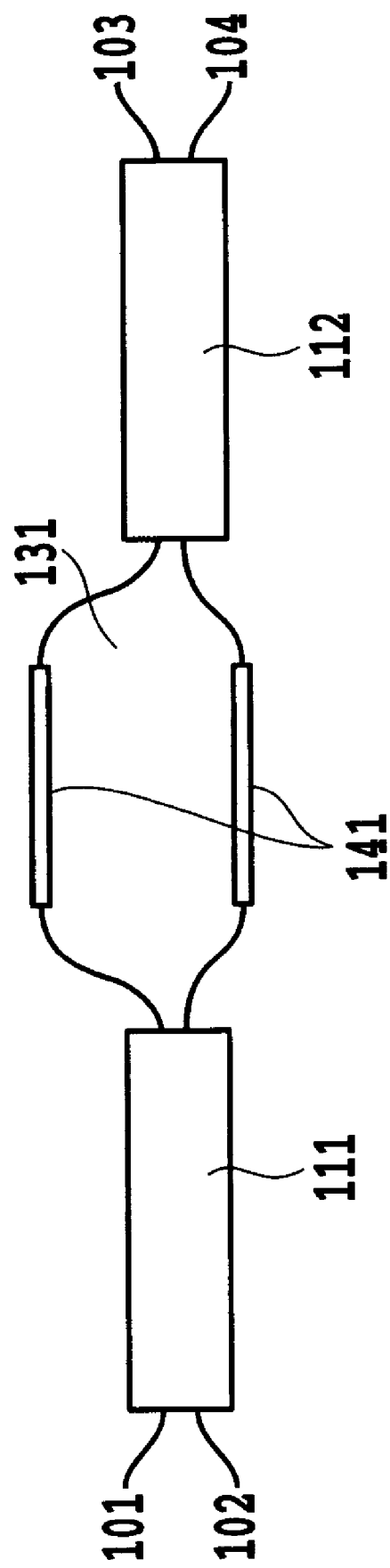
FIG. 11 is a schematic diagram showing a configuration of an interferometer optical switch of a second embodiment in accordance with the present invention.

FIG. 11 shows a configuration of the interferometer optical switch of a second embodiment in accordance with the present invention. The circuit of the interferometer optical switch includes a pair of optical multi/demultiplexing devices (phase generating couplers) 111 and 112, the phase differences of the outputs of which have wavelength dependence; an optical delay line 131 between the optical multi/demultiplexing devices 111 and 112; phase shifters (thin film heaters) 141 formed in the optical delay line 131; input waveguides 101 and 102; and output waveguides 103 and 104.

In the present embodiment, a configuration will be described which includes a plurality of phase generating couplers. Assume that a light is input to the phase generating coupler 111 in the first stage, and the phase difference between light output from the two optical waveguides connected to the phase generating coupler 111 is $\phi_1(\lambda)$; and that light are launched into the two optical waveguides connected to the phase generating coupler 112 at the second stage, and the phase difference between the light output from the phase generating coupler 112 is $\phi_2(\lambda)$. Then, the wavelength-dependent phase differences of the outputs of the phase generating couplers 111 and 112 is set to satisfy the following expression.

$$\phi_1(\lambda)+\phi_2(\lambda)=\Delta L/\lambda+m/2 \qquad (9).$$

Where m is an integer.

Here, the optical multi/demultiplexing device (phase generating coupler) as shown in FIG. 4 is used as the phase generating couplers 111 and 112. The optical multi/demultiplexing device (phase generating coupler) as shown in FIG. 4 includes two directional couplers 151 and 152; a minute optical delay line 132 consisting of the two optical waveguides interconnecting the two directional couplers 151 and 152; input waveguides 101 and 102; and output waveguides 103 and 104. To meet the conditions that the power coupling ratios of the optical multi/demultiplexing devices become about 0.5 at the center wavelength $\lambda c=1.55$ μm of the wavelength region, and the phase difference between the output light satisfies the foregoing expression (9), the power coupling ratios of the two directional couplers 151 and 152 constituting the phase generating couplers, and the path length difference of the minute optical delay line 132 were obtained by least square approximation.

Figure 12:
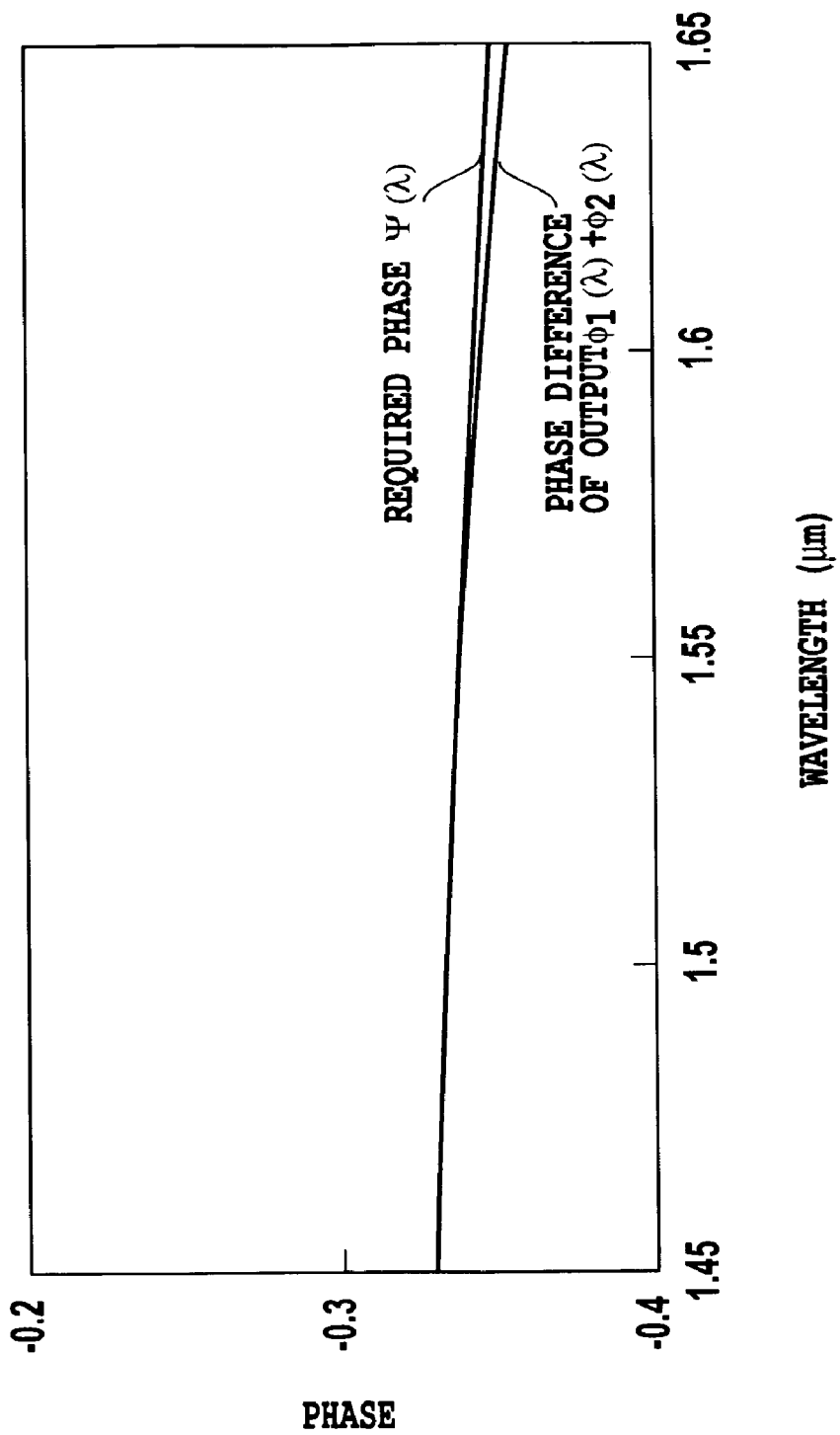
FIG. 12 is a graph illustrating the wavelength dependence of the required phase and the phase difference of the light launched from the output ports of the optical couplers in the second embodiment in accordance with the present invention.

FIG. 12 illustrates the sum of the phase differences of the phase generating couplers 111 and 112 thus designed. At the same time, the required phase $\Psi(\lambda)$ to be corrected by the phase generating couplers, that is, the desired function given by the right side of the foregoing expressions (9) is drawn. In FIG. 12, $\Delta L$ is set at 0.16 $\lambda c$ ($\approx$0.25 μm), and m is set at −1 as a numerical example. It is seen from FIG. 12 that the two phase generating couplers each function as a 3 dB optical multi/demultiplexing device with the power coupling ratio of about 0.5, and that the sum of the phase differences $\phi_1(\lambda)+\phi_2(\lambda)$ is nearly equal to the required phase $\Psi(\lambda)$ required for achieving the wavelength insensitiveness.

Figure 13:
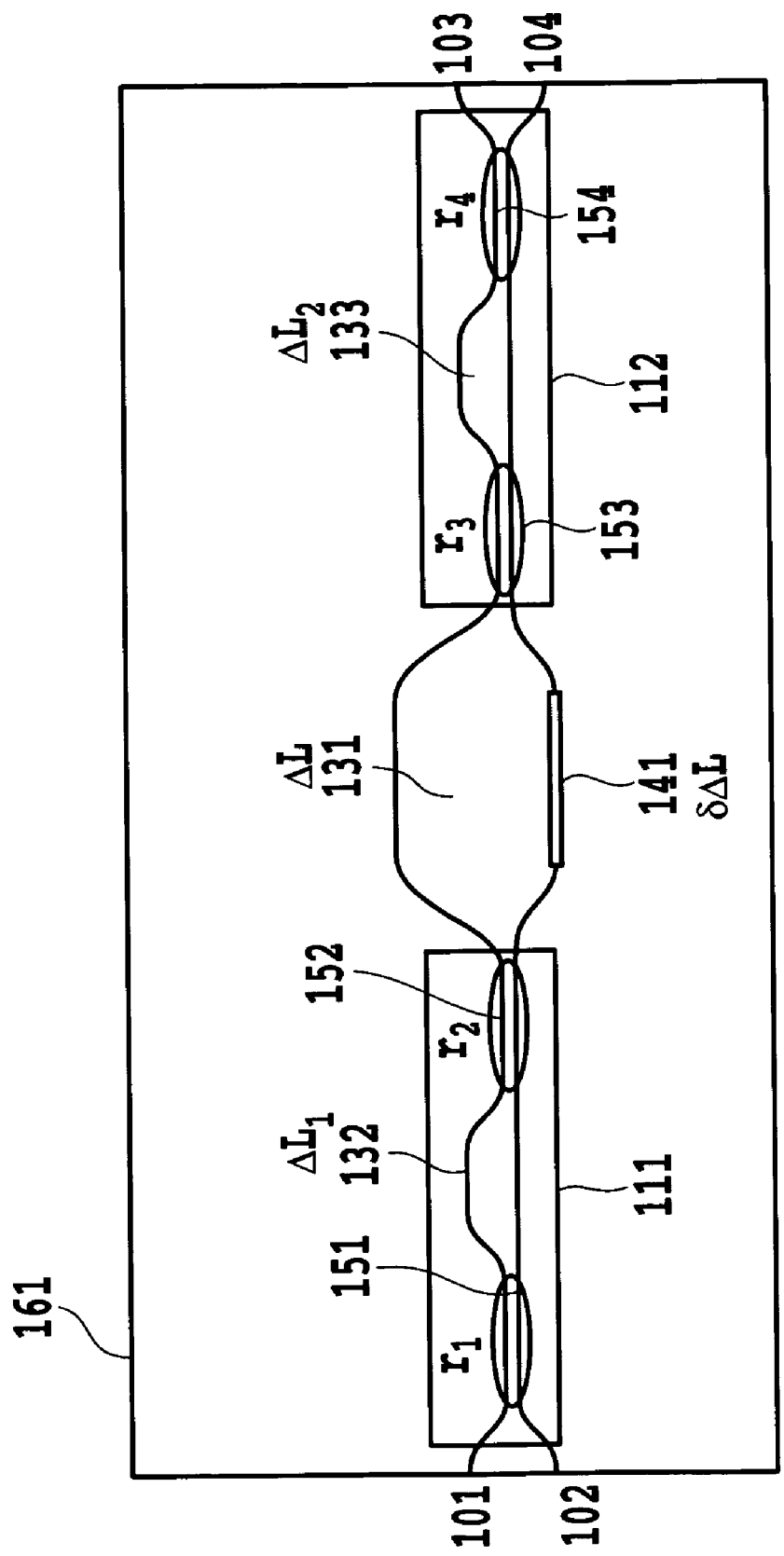
FIG. 13 is a schematic diagram showing a configuration of an interferometer optical switch of the second embodiment in accordance with the present invention.

FIG. 13 is a plan view showing an actually fabricated interferometer optical switch. The power coupling ratios of the directional couplers 151 and 152 constituting the phase generating coupler 111 were set at $r_1=0.4$ and $r_2=0.1$. As for the minute optical delay line 132 having two optical delay lines, a first optical waveguide and a second optical waveguide, their optical path lengths are set at $l_{11}=502.32$ μm and $l_{21}=501.99$ μm so that the optical path length difference between them is $\Delta L_1=l_{11}-l_{21}=0.21$ $\lambda c$ (=0.33 μm). Likewise, the power coupling ratios of the directional couplers 153 and 154 constituting the other phase generating coupler 112 are set at $r_3=0.2$ and $r_4=0.3$. As for the minute optical delay line 133 having two optical delay lines, a first optical waveguide and a second optical waveguide, their optical path lengths are set at $l_{12}=463.94$ μm and $l_{22}=463.68$ μm so that the optical path length difference between them is $\Delta L_2=l_{12}-l_{22}=0.17$ $\lambda c$ (=0.26 μm). In addition, the present embodiment employs two phase generating couplers, and their optical delay lines are disposed in such a manner that the optical delay lines having a greater sum of the optical path lengths are placed disproportionately on one side (upper side of FIG. 13). More specifically, since $\Sigma l_{1,1}=l_{11}, \Sigma l_{2,1}=l_{21}, \Sigma l_{1,2}=l_{12},$ and $\Sigma l_{2,2}=l_{22}$, they satisfy $\Sigma l_{1,1}>\Sigma l_{2,1}$ and $\Sigma l_{1,2}>\Sigma l_{2,2}$. In addition, the path length difference of the Mach-Zehnder interferometer is set at $\Delta L=0.16$ $\lambda c$ ($\approx$0.25 μm), and the spacing between the two optical waveguides interconnecting the optical multi/demultiplexing devices 111 and 112 was made 200 μm. As the phase shifter 141, a thin film heater was used and its width was set at 40 μm, and length at 4 mm.

According to the foregoing design values, the silica-based optical waveguide circuit was fabricated by using flame hydrolysis deposition, photolithography technique and reactive ion etching. It was fabricated such that the relative refractive index of the optical waveguides was 1.5%, and the core cross section of the optical waveguides was 4.5×4.5 μm².

A chip on which the interferometer optical switch was formed was diced, a heatsink (not shown) was disposed under the silicon substrate 161, single mode fibers (not shown) were connected to the input/output waveguides 101-104, and feeder leads (not shown) were connected to the thin film heater 141, thereby forming a two-input, two-output optical switch module. Then, the switching characteristics of the interferometer optical switch module were evaluated.

Here, the switching operation will be described in the case where the switch module is used as the gate switch using the fabricated optical waveguide circuit as the basic component. When the phase shifter (thin film heater) 141 is in the OFF state, the switch is in the bar state. Thus, the optical signal input via the input waveguide 101 is output from the output waveguide 103, but not from the output waveguide 104. Here, by supplying power to the thin film heater 141, the optical path length was varied by an amount corresponding to half the wavelength of the optical signal (0.5 $\lambda c \cdot k$: k is an integer other than zero) by the thermooptic effect, and the path length difference became $\Delta L+\delta\Delta L=0.16$ $\lambda c-0.5$ $\lambda c=-0.34$ $\lambda c$. In this case, the switch was in the cross state when the phase shifter (thin film heater) 141 was in the ON state, and hence the optical signal input via the input waveguide 101 was output from the output waveguide 104. In other words, when considering 101 as the input port, and 104 as the output port, the optical signal is not output when the phase shifter is in the OFF state, but is output when the phase shifter is the ON state, which means that the switch functions as the gate switch. When considering the 102 as the input port, similar switching operation was confirmed.

Figure 14:
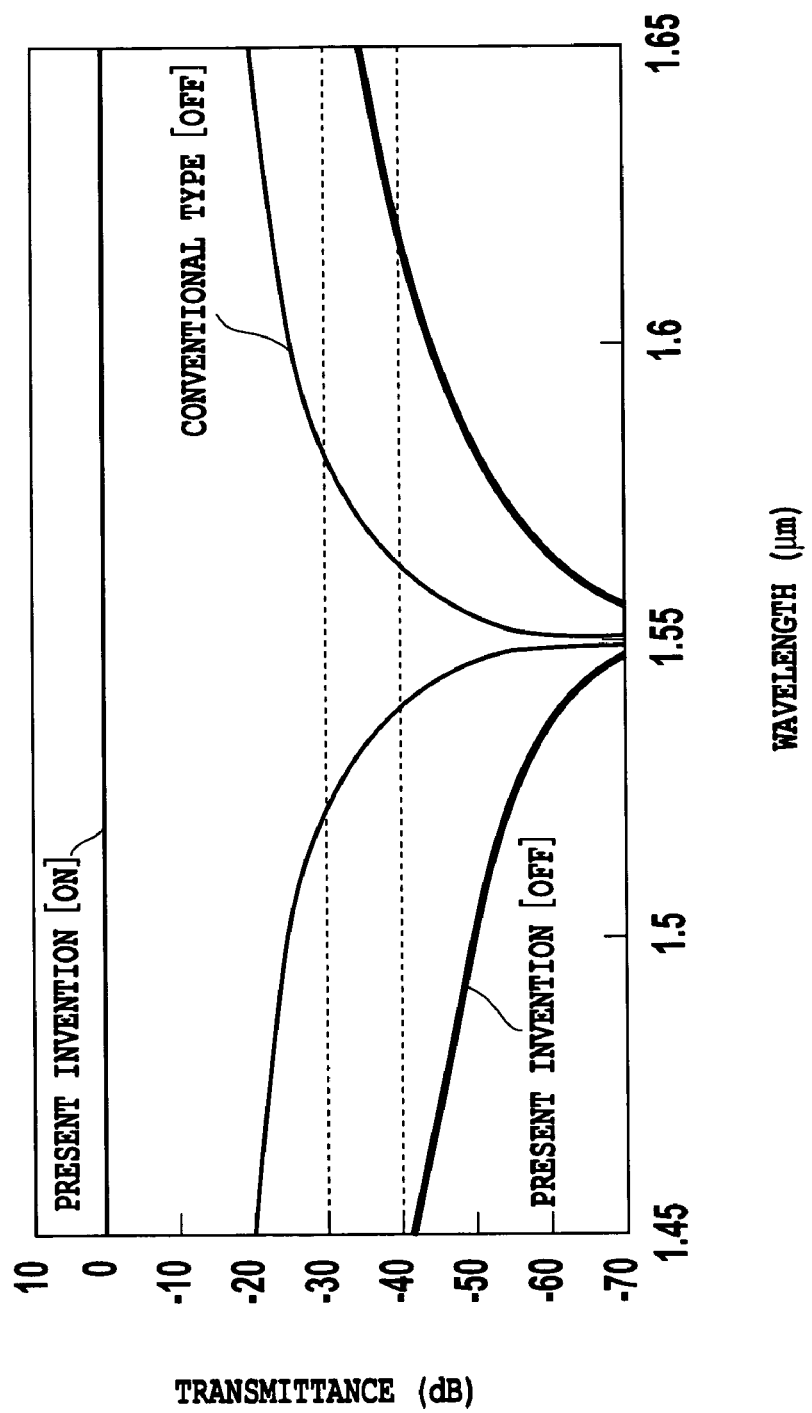
FIG. 14 is a graph illustrating the wavelength dependence of the transmittance of the interferometer optical switch of the second embodiment in accordance with the present invention.

Next, FIG. 14 illustrates the wavelength characteristics of the measured transmittance of the interferometer optical switch of the present embodiment. The wavelength dependence of the transmittance of the conventional Mach-Zehnder interferometer optical switch as shown in FIG. 37 is also illustrated for comparison. When the phase shifter 141 is in the OFF state, the interferometer optical switch of the present embodiment can achieve a high extinction ratio equal to or greater than 40 dB over a broad wavelength band of 1.45-1.6 μm. When the phase shifter is brought into the ON state, the interferometer optical switch of the present embodiment achieves a good insertion loss over a broad wavelength band.

Thus, the interferometer optical switch described in the present embodiment uses a novel operation principle to implement high extinction ratio over a wide wavelength region. It was confirmed that the switch is operational with only one phase shifter. In addition, the switch has a larger tolerance as regards power coupling ratio variations of the optical multi/demultiplexing device and path length variations of the optical delay line, since it is operational over a wide wavelength range. Accordingly, the present embodiment implements an interferometer optical switch that can maintain a high extinction ratio even if there is fabrication error.

Since the present embodiment employs two different phase generating couplers, it can increase the phase compensation amount and the degree of approximation of the power coupling ratios of the optical multi/demultiplexing devices, thereby being able to achieve characteristics better than that of the first embodiment. In addition, an ideal Mach-Zehnder interferometer optical switch is implemented when the power coupling ratios of the first and second optical multi/demultiplexing devices are 0.5 regardless of the wavelength. Since the present embodiment is configured such that it can set the phase differences and the power coupling ratios of the first and second optical multi/demultiplexing devices without restraint, it can implement an ideal interferometer optical switch.

As described above, the interferometer optical switch described in the present embodiment is designed such that it can achieve a high extinction ratio in a wavelength band of 1.45-1.65 µm. However, the present invention is not limited to this wavelength region. The switch can achive a high extinction ratio at any wavelength region, for example 1 µm-2 µm, by providing an appropriate phase with phase generating coupler. Furthermore, an optical multi/demultiplexing device composed of N+1 optical multi/demultiplexing devices and N optical delay lines that connects adjacent optical multi/demultiplexing devices is used as a phase generating coupler, which is an optical coupler that is capable of producing a wavelength-dependent phase difference. However, it is obvious that optical multi/demultiplexing device with other configuration can be used as the phase generating coupler. Besides, the configuration is not limited to that described in the present embodiment. For example, the optical multi/demultiplexing device that is used as the phase generating coupler can be configured by four optical multi/demultiplexing devices and three optical delay lines sandwiched between the adjacent optical multi/demultiplexing devices, or can be configured by combining different optical multi/demultiplexing devices. Furthermore, as for the optical multi/demultiplexing devices used in the present embodiment to construct the optical multi/demultiplexing device that generates a wavelength-dependent phase difference, they are not limited to the directional couplers, but other types can also be used. In addition, the phase characteristics can be set considering the wavelength dependence of the power coupling ratios of the optical multi/demultiplexing devices used. Besides, it is possible, in the present embodiment, to adjust the optical path length difference, and the coupling characteristics and phase characteristics of the optical multi/demultiplexing device by locally varying the refractive index of the optical waveguides. ggg, although the present example employs the waveguides 101 and 102 as the input waveguides, it can achieve the same advantages by using the waveguides 103 and 104 as the input waveguides, and 101 and 102 as the output waveguides. Finally, although the present example is designed such that m in the foregoing expression (9) becomes −1, m may be +1 or any other integer.

As described above, the present invention is not limited to the configuration described here, but can configure the interferometer optical switch that can maintain a high extinction ratio over a broad band regardless of the types of the waveguides, the geometry of the waveguides, the material of the waveguides, wavelength band or the types of the optical multi/demultiplexing device by making the sum of the phase differences of the outputs of the optical multi/demultiplexing devices and the phase difference due to the path length difference of the optical delay line constituting the circuit a constant value in the entire wavelength or frequency band considering the circuit in its entirety.

THIRD EMBODIMENT

Figure 15:
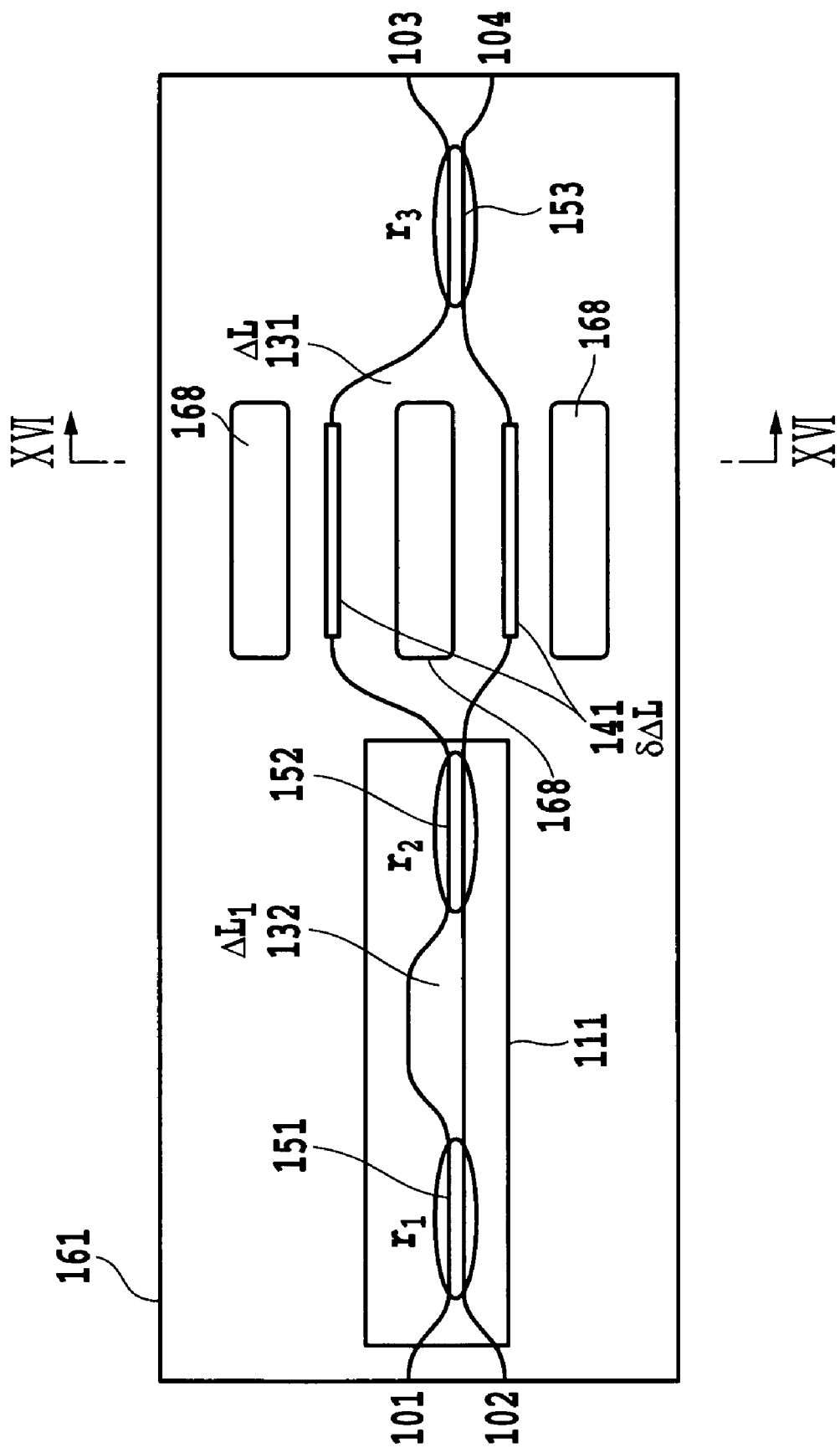
FIG. 15 is a schematic diagram showing a configuration of an interferometer optical switch of a third embodiment in accordance with the present invention.

FIG. 15 shows a configuration of the interferometer optical switch of a third embodiment in accordance with the present invention. The circuit of the interferometer optical switch of the present embodiment includes an optical multi/demultiplexing device (phase generating coupler) 111, the phase difference of the output of which has wavelength dependence; a directional coupler 153; an optical delay line 131 between the optical multi/demultiplexing device 111 and the directional coupler 153; phase shifters 141 formed in the optical delay line 131; input waveguides 101 and 102; and output waveguides 103 and 104. As the phase generating coupler 111, the present embodiment uses an optical multi/demultiplexing device that includes two directional couplers 151 and 152, and a minute optical delay line 132 composed of two optical waveguides interconnecting the two directional couplers 151 and 152. In addition, three adiabatic grooves 168 are formed at the sides of the pair of phase shifters 141 on a substrate.

Figure 16:
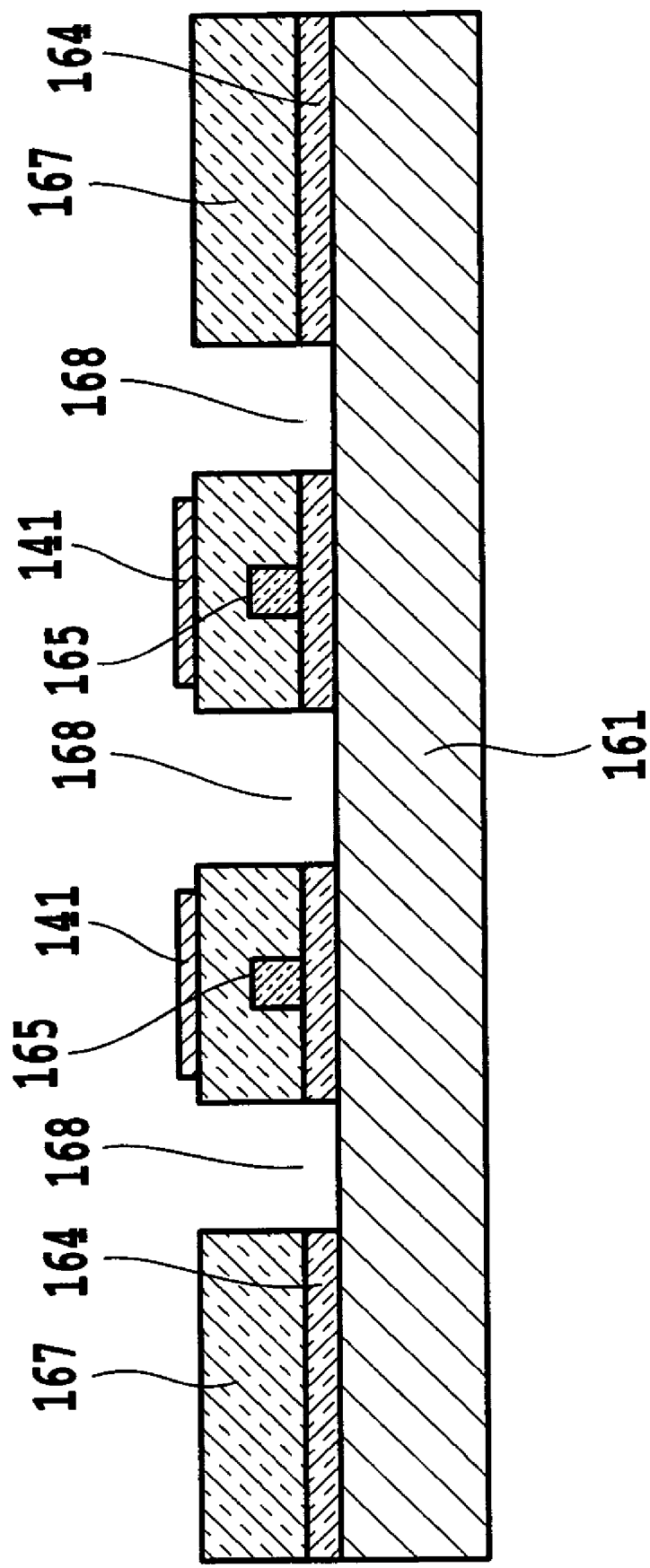
FIG. 16 is a cross-sectional view of the interferometer optical switch of the third embodiment in accordance with the present invention.

FIG. 16 shows the cross sectional structure taken along the line XVI-XVI of the interferometer optical switch as shown in FIG. 15. On a silicon substrate 161, cladding glass layers 164 and 167 composed of silica-based glass are stacked. As a mid layer of the cladding glass layers 164 and 167, a core glass section 165 made from the silica-based glass is disposed, which constitutes the optical waveguides. In addition, on a surface of the overcladding glass layer 167, the phase shifters (thin film heaters) 141 are formed, and at both sides of the phase shifters 141, the adiabatic grooves 168 are formed. The adiabatic grooves 168 are located at such position that equalizes the stress near core waveguides.

To meet the conditions that the power coupling ratio of the phase generating coupler 111 is about 0.5 at the center wavelength $\lambda c=1.55$ µm of the wavelength region, and the phase difference between the output light satisfies the foregoing expression (8), the power coupling ratios of the two directional couplers 151 and 152, and the path length difference of the minute optical delay line 132 were obtained by polynomial approximation. As a result, the power coupling ratios of the directional couplers 151 and 152 were set at $r_1=0.1$ and $r_2=0.6$, respectively, the path length difference of the minute optical delay line 132 was set at $\Delta L_1=0.27 \cdot \lambda c$ ($\approx 0.38$ µm), and the power coupling ratio of the directional coupler 153 was set at $r_3=0.5$. In addition, the path length difference of the Mach-Zehnder interferometer was set at $\Delta L=0.37 \cdot \lambda c$ ($\approx 0.53$ µm), and the spacing between the two optical waveguides interconnecting the optical multi/demultiplexing device 111 and the directional coupler 153 was made 100 µm. Here, the path length difference represents a relative optical path length of the upper optical waveguide with respect to the lower optical waveguide. As the phase shifters 141, a thin film heater was used and its width was set at 40 µm, and length at 4 mm.

According to the foregoing design values, the silica-based optical waveguide circuit was fabricated by using flame hydrolysis deposition, photolithography technique and reactive ion etching. It was fabricated such that the relative refractive index of the optical waveguides was 0.75%, the core cross section of the optical waveguides was $6 \times 6$ µm², and the width and the depth of the adiabatic grooves 168 were 70 µm and 35 µm, respectively.

A chip on which the interferometer optical switch was formed was diced, a heatsink (not shown) was disposed under the silicon substrate 161, single mode fibers (not shown) were connected to the input/output waveguides 101-104, and feeder leads (not shown) were connected to the thin film heaters 141, thereby forming a two-input, two-output optical switch module. Then, the switching characteristics of the interferometer optical switch module were evaluated.

Here, the switching operation will be described in the case where the switch module is used as the gate switch using the fabricated optical waveguide circuit as the basic component.

When the phase shifters (thin film heaters) 141 are in the OFF state, the switch is in the bar state. Thus, the optical signal input via the input waveguide 101 is output from the output waveguide 103, but not from the output waveguide 104. By supplying power to the thin film heaters 141, the optical path length was varied by an amount corresponding to half the wavelength of the optical signal (0.5 $\lambda$c·k: k is an integer other than zero) by the thermooptic effect, and the path length difference became $\Delta L+\delta\Delta L=0.37$ $\lambda$c+0.50 $\lambda$c=−0.13 $\lambda$c. In this case, the switch was in the cross state when the phase shifters (thin film heaters) 141 were in the ON state, and hence the optical signal input via the input waveguide 101 was output from the output waveguide 104. In other words, when using the waveguide 101 as the input port and 104 as the output port, the optical signal was not output when the phase shifters 141 were in the OFF state, but was output when the phase shifters 141 were in the ON state, which means that the switch functions as a gate switch. We confirmed the same switching operation when using the waveguide 102 as the input port. In addition, although the present example employs the waveguides 101 and 102 as the input waveguides, it can achieve the same advantages by using the waveguides 103 and 104 as the input waveguides, and 101 and 102 as the output waveguides. Besides, since the optical switch of the present embodiment has the adiabatic groove structure, it can suppress the power consumption of the phase shifters required for the switching to $\frac{1}{10}$ that of the conventional switch.

Figure 17:
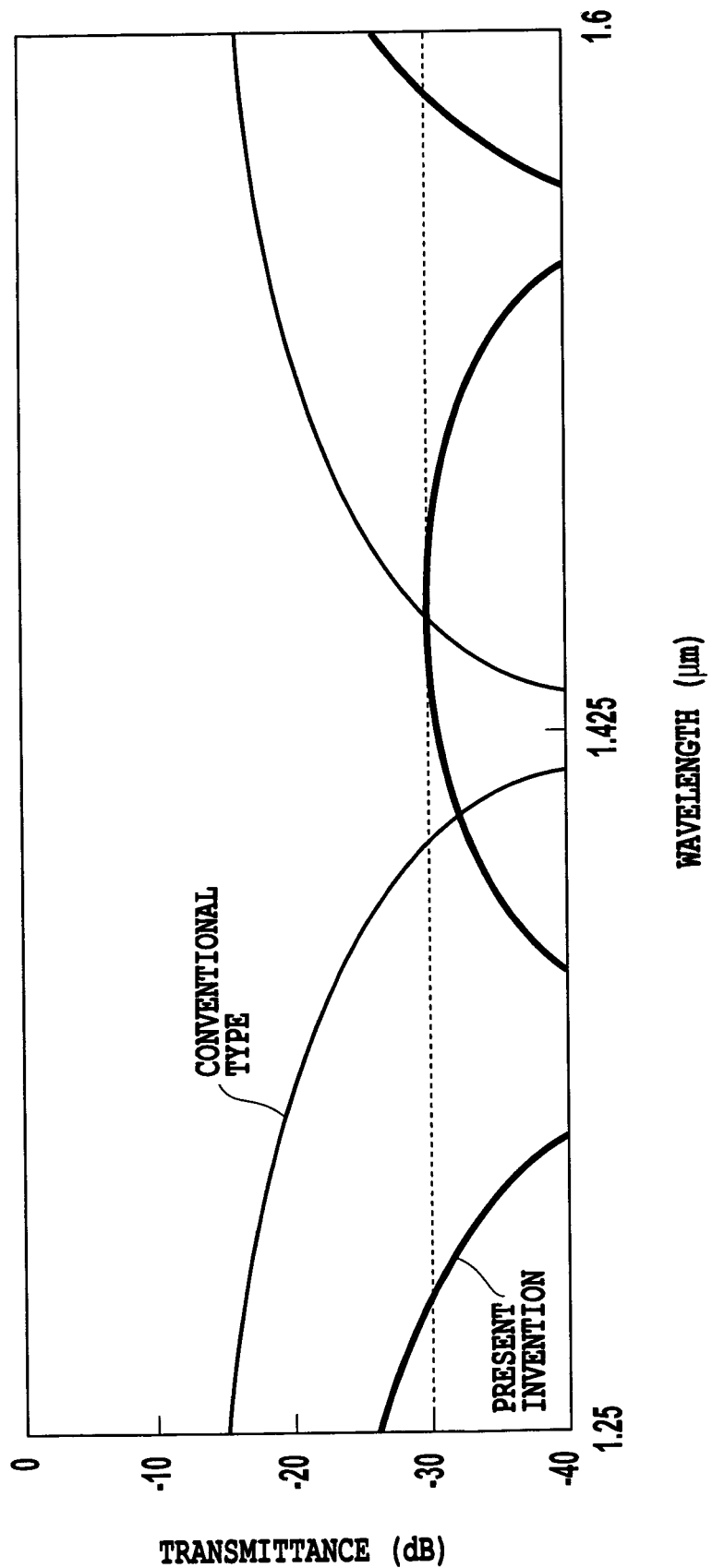
FIG. 17 is a graph illustrating the wavelength dependence of the transmittance of the interferometer optical switch of the third embodiment in accordance with the present invention.

Next, FIG. 17 illustrates the wavelength dependence of the transmittance measured for the circuit of the present embodiment. The optical switch of the present embodiment can also achieve a high extinction ratio equal to or greater than 30 dB over a broad wavelength band of 1.3-1.6 μm when the phase shifters are in the OFF state.

Thus, the interferometer optical switch described in the present embodiment uses a novel operation principle to implement high extinction ratio over a wide wavelength region. It was confirmed that the switch is operational with only one phase shifter. In addition, the switch has a larger tolerance as regards power coupling ratio variations of the optical multi/demultiplexing device and path length variations of the optical delay line, since it is operational over a wide wavelength range. Accordingly, the present embodiment implements an interferometer optical switch that can maintain a high extinction ratio even if there is fabrication error. In addition, since the interferometer optical switch of the present embodiment has the adiabatic groove structure on the substrate, it can greatly reduce the switching power. It is obvious that the geometry and position of the grooves are not limited, and the grooves can include materials other than air, and that a structure other than the optical circuit can be formed on the planar substrate as illustrated in the present embodiment.

FOURTH EMBODIMENT

Figure 18:
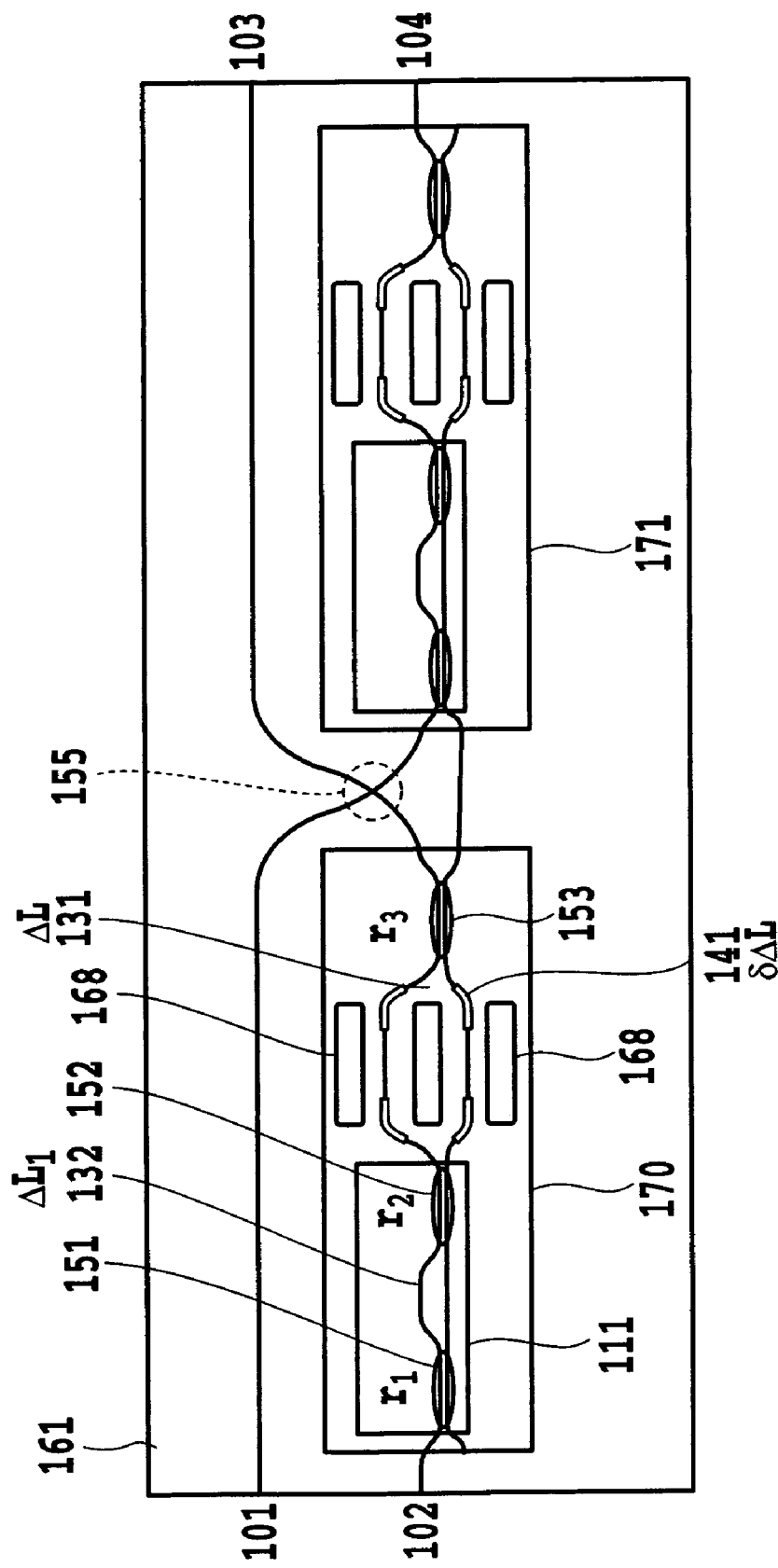
FIG. 18 is a schematic diagram showing a configuration of an interferometer optical switch of a fourth embodiment in accordance with the present invention.

FIG. 18 shows a configuration of the interferometer optical switch of a fourth embodiment in accordance with the present invention. The circuit of the interferometer optical switch of the present embodiment is an optical switch with a multiple-stage interferometer configuration using a plurality of interferometer optical switches. Since the multiple-stage interferometer configuration can block light with plurality of basic components when the switch is in the OFF state, it can achieve an extinction ratio higher than that of the single basic component.

The present circuit is configured by connecting two interferometer optical switches of the first embodiment as shown in FIG. 7. A first stage (input side) interferometer optical switch 170 has its first output (corresponding to 104 of FIG. 7) connected to a first input (corresponding to 102 of FIG. 7) of a second stage (output side) interferometer optical switch 171, and has its second output (corresponding to 103 of FIG. 7) used as the output waveguide 103. The second stage interferometer optical switch 171 has its second input (corresponding to 101 of FIG. 7) used as the input waveguide 101. The input waveguide 101 and the output waveguide 103 intersect with each other on the way, thereby forming a cross waveguide 155. It is obvious that such a circuit layout is also possible in which the input waveguide and output waveguide do not intersect with each other. In addition, the interferometer optical switch 170 of the first stage has its second input (corresponding to 101 of FIG. 7) used as the input waveguide 102, and the interferometer optical switch 171 of the second stage has its second output (corresponding to 103 of FIG. 7) used as the output waveguide 104.

To meet the conditions that the power coupling ratios of the phase generating couplers are about 0.5 at the center wavelength $\lambda$c=1.55 μm of the wavelength region, and the phase difference between the output light satisfies the foregoing expression (8), the power coupling ratios of the two directional couplers 151 and 152, and the path length difference of the minute optical delay line 132 were obtained by the conjugate gradient method. As a result, the power coupling ratios of the directional couplers 151 and 152 were set at $r_1$=0.3 and $r_2$=0.7, respectively, the path length difference of the minute optical delay line 132 was set at $\Delta L_1$=0.30·$\lambda$c (≈0.47 μm), and the power coupling ratio of the directional coupler 153 was set at $r_3$=0.5. In addition, the path length difference of the Mach-Zehnder interferometer was set at $\Delta L$=0.34·$\lambda$c (≈0.53 μm), and the spacing between the two optical waveguides interconnecting the optical multi/demultiplexing device 111 and the directional coupler 153 was made 100 μm. Here, the path length difference represents the relative optical path length of the upper optical waveguide with respect to the lower optical waveguide. As the phase shifters 141, a thin film heater was used and its width was set at 40 μm, and length at 4 mm. The path length difference of the Mach-Zehnder interferometer was initially set at $\Delta L$=0 μm, and after the circuit was fabricated, permanent local heat processing using the thin film heaters 141 was carried out to adjust the optical path length difference to $\Delta L$=0.34 $\lambda$c (≈0.53 μm).

Although the present embodiment forms two thin film heaters 141 on each of the pair of the optical waveguides constituting the optical delay line 131, and uses one for the local heat processing and the other for the switching operation, it is also possible to use both for the local heat processing, or for the switching operation. It is obvious that three or more thin film heaters can be formed. In addition, the geometry of the thin film heaters 141 is not limited, and the plurality of thin film heaters can have different geometry. Furthermore, the thin film heaters 141 of the pair of the optical waveguides constituting the optical delay line 131 can be used simultaneously to carry out the local heat processing or the switching operation.

According to the foregoing design values, the silica-based optical waveguide circuit was fabricated by using flame hydrolysis deposition, photolithography technique and reactive ion etching. It was fabricated such that the relative refractive index of the optical waveguides was 0.75%, the core cross section of the optical waveguides was 4.5×4.5 μm², and the width and the depth of the adiabatic grooves were 70 μm and 50 μm, respectively.

A chip on which the interferometer optical switch was formed was diced, a heatsink (not shown) was disposed under the silicon substrate 161, dispersion shifted fibers (not shown) were connected to the input/output waveguides 101-104, and feeder leads (not shown) were connected to the thin film heaters 141, thereby forming a two-input, two-output optical switch module. Then, the switching characteristics of the interferometer optical switch module were evaluated.

When the phase shifters (thin film heaters) 141 are in the OFF state, the switch is in the bar state. Thus, the optical signal input via the input waveguide 102 is output from the output waveguide 103, but not from the output waveguide 104. In this case, since the two basic components 170 and 171 block light from launching out of the output waveguide 104, the present embodiment can achieve a higher extinction ratio. By supplying power to the thin film heaters 141 of the interferometer optical switches 170 and 171, the optical path length was varied by an amount corresponding to half the wavelength of the optical signal (0.5 $\lambda c \cdot k$: k is an integer other than zero) by the thermooptic effect, and the path length difference became $\Delta L + \delta \Delta L = 0.34 \lambda c - 0.50 \lambda c = -0.16 \lambda c$. In this case, the switch was in the cross state when the phase shifters (thin film heaters) 141 were in the ON state, and hence the optical signal input via the input waveguide 102 was output from the output waveguide 104. In other words, when using the waveguide 101 as the input port and 104 as the output port, the optical signal was not output when the phase shifters 141 were in the OFF state, but was output when the phase shifters 141 were in the ON state, which means that the switch functions as a gate switch. In addition, although the present example employs the waveguides 101 and 102 as the input waveguides, it can achieve the same advantages by using the waveguides 103 and 104 as the input waveguides, and 101 and 102 as the output waveguides. Besides, since the optical switch of the present embodiment has the adiabatic groove structure, it can suppress the power consumption of the phase shifters required for the switching to 1/10 of the conventional switch.

Figure 19:
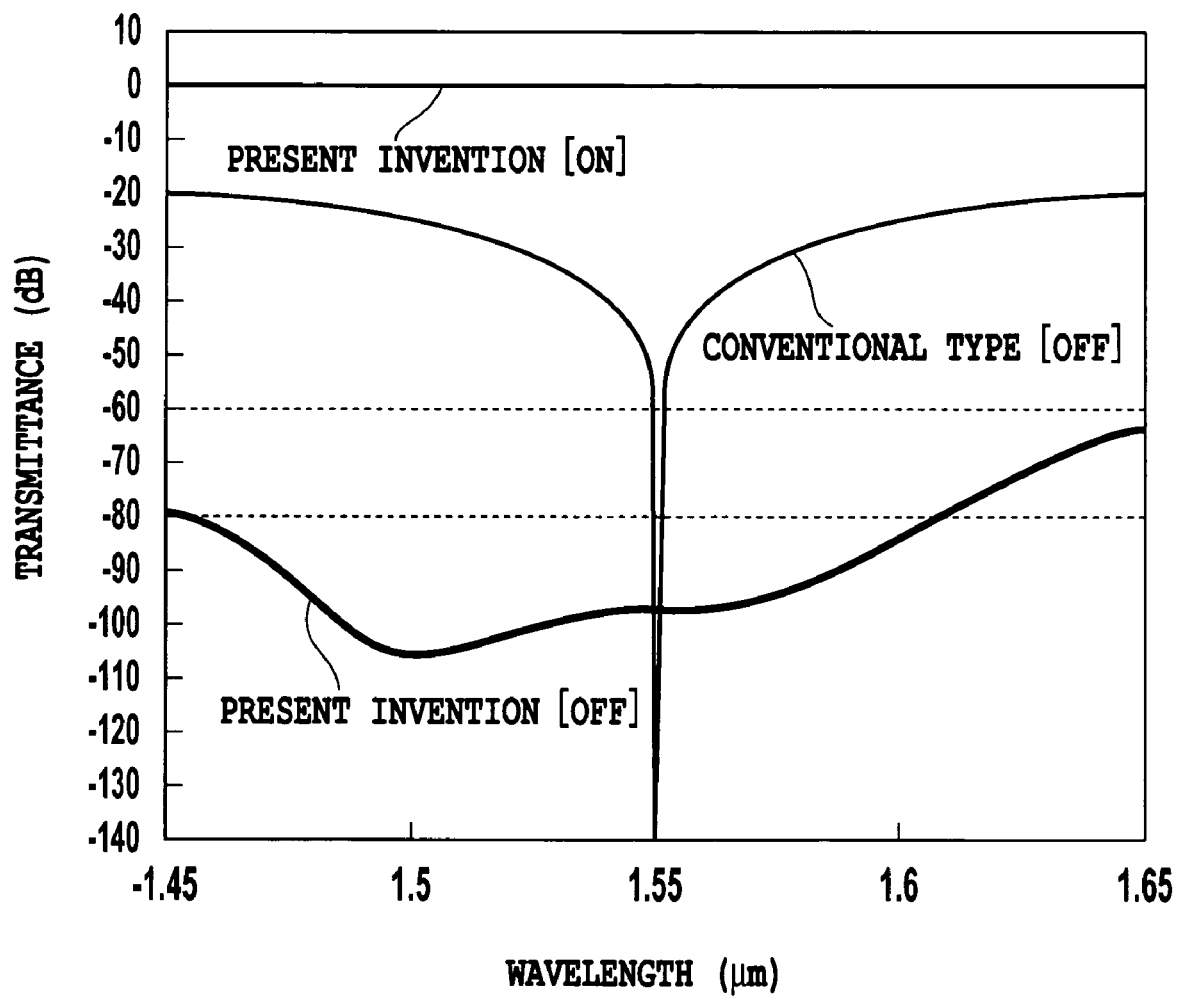
FIG. 19 is a graph illustrating the wavelength dependence of the transmittance of the interferometer optical switch of the fourth embodiment in accordance with the present invention.

Next, FIG. 19 illustrates the wavelength characteristics of the measured transmittance of the interferometer optical switch of the present embodiment. The wavelength dependence of the transmittance of the conventional Mach-Zehnder interferometer optical switch as shown in FIG. 37 is also illustrated for comparison. When the phase shifters 141 are in the OFF state, the interferometer optical switch of the present embodiment can achieve a high extinction ratio equal to or greater than 60 dB over a broad wavelength band of 1.45-1.63 μm because of the multiple-stage interferometer configuration. When the phase shifters are brought into the ON state, the interferometer optical switch of the present embodiment achieves a good insertion loss over a broad wavelength band.

As described above, the plurality of interferometer optical switches in accordance with the present invention, which are configured in a multiple stage, enable them to function as a single interferometer optical switch. Although the present embodiment constructs the two-stage interferometer configuration by combining the two identical interferometer optical switches, it is obvious that the two interferometer optical switches can use different design values. In addition, it is also possible to assume a configuration other than the two-stage interferometer configuration described in the present embodiment. Besides, it is also possible to use any desired optical waveguides as the input waveguides and output waveguides by interconnecting any desired optical waveguides. Furthermore, it is also possible to combine three or more interferometer optical switches with the same structure, or to combine a plurality of interferometer optical switches with different structures.

As described above, using the interferometer optical switch of the present embodiment enables the switching operation over the broad wavelength band. In addition, since the interferometer optical switch of the present embodiment can carry out switching operation over the broad wavelength band, it has a great tolerance for the power coupling ratio error of the optical multi/demultiplexing devices or for the path length difference error of the optical delay lines. Accordingly, the present embodiment implements an interferometer optical switch that can maintain a high extinction ratio even if there is fabrication error.

First Variation of Fourth Embodiment

Figure 20:
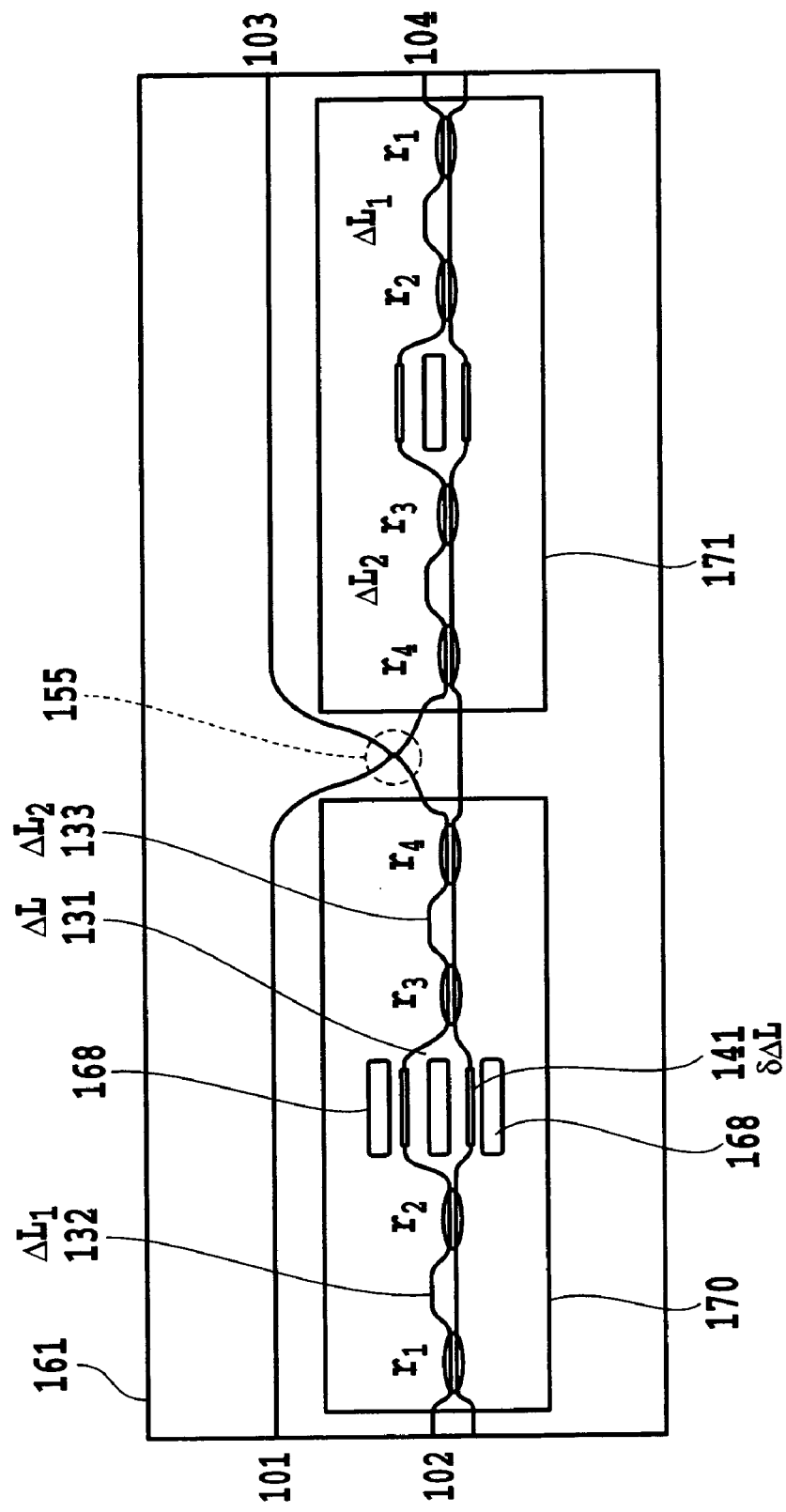
FIG. 20 is a schematic diagram showing a configuration of an interferometer optical switch of a first variation of the fourth embodiment in accordance with the present invention.

FIG. 20 shows a configuration of the interferometer optical switch of a first variation of the fourth embodiment in accordance with the present invention. The circuit of the variation is an optical switch with a multiple-stage interferometer configuration using two interferometer optical switches described in the second embodiment as shown in FIG. 13. With such a multiple-stage interferometer configuration, the switch can achieve an extinction ratio higher than that of the single basic component because it can prevent the leakage light with the plurality of basic components 170 and 171 in the OFF state.

The multiple-stage interferometer optical switch of the present example has two basic components of FIG. 13 arranged in line symmetry with respect to the center of the circuit. Then, the interferometer optical switch 170 in the first stage has its first output (corresponding to 104 of FIG. 13) connected to a first input (corresponding to 102 of FIG. 13) of the interferometer optical switch 171 in the second stage, and has its second output (corresponding to 103 of FIG. 13) used as the output waveguide 103. The interferometer optical switch 171 in the second stage has its second input (corresponding to 101 of FIG. 13) used as the input waveguide 101. The input waveguide 101 and the output waveguide 103 intersect with each other on the way, thereby forming a cross waveguide 155. In addition, the interferometer optical switch 170 of the first stage has its second input (corresponding to 101 of FIG. 13) used as the input waveguide 102, and the interferometer optical switch 171 of the second stage has its second output (corresponding to 103 of FIG. 13) used as the output waveguide 104. It is obvious that the two basic components 170 and 171 can be disposed in the same direction as in the foregoing fourth embodiment or can be disposed in the opposite direction. As for the circuit layout, it is not limited: the two basic components 170 and 171 can be disposed in the horizontal direction as shown in FIG. 20, or in the vertical direction.

The interferometer optical switches 170 and 171 constituting the multiple-stage interferometer of this example use the same design values. The power coupling ratios of the two directional couplers 151 and 152 and 153 and 154, and the path length differences of the minute optical delay lines 132 and 133 constituting the phase generating couplers were obtained by using the multiple regression analysis in such a manner that the power coupling ratios of the phase generating couplers 111 and 112 (see FIG. 13) became about 0.5 at the center wavelength $\lambda c=1.55$ μm of the wavelength region and that the phase difference between the output light satisfied the foregoing expression (9). As a result, the power coupling ratios of the directional couplers 151 and 152 constituting the first phase generating coupler 111 were set at $r_1=0.3$ and $r_2=0.1$, respectively, and the path length difference of the minute optical delay line 132 was set at $\Delta L_1=0.19\ \lambda c$ ($\approx 0.29\ \mu m$). Here, the path length difference represents the relative optical path length of the upper optical waveguide with respect to the lower optical waveguide. Likewise, the power coupling ratios of the directional couplers 153 and 154 constituting the second phase generating coupler 112 were set at $r_1=0.1$ and $r_2=0.3$, respectively, and the path length difference of the minute optical delay line 133 was set at $\Delta L_2=0.19\ \lambda c$ ($\approx 0.29\ \mu m$). In addition, the path length difference of the Mach-Zehnder interferometer was set at $\Delta L=0.16\ \lambda c$ ($\approx 0.25\ \mu m$), and the spacing between the two optical waveguides interconnecting the optical multi/demultiplexing devices 111 and 112 was made 100 μm. As the phase shifters 141, a thin film heater was used and its width was set at 40 μm, and length at 4 mm.

According to the foregoing design values, the silica-based optical waveguide circuit was fabricated by using flame hydrolysis deposition, photolithography technique and reactive ion etching. It was fabricated such that the relative refractive index of the optical waveguides was 1.5%, the core cross section of the optical waveguides was $4.5\times 4.5\ \mu m^2$, and the width and the depth of the adiabatic grooves 168 were 70 μm and 50 μm, respectively.

A chip on which the interferometer optical switch was formed was diced, a heatsink (not shown) was disposed under the silicon substrate 161, single mode fibers (not shown) were connected to the input/output waveguides 101-104, and feeder leads (not shown) were connected to the thin film heaters 141, thereby forming a two-input, two-output optical switch module. Then, the switching characteristics of the interferometer optical switch module were evaluated.

When the phase shifters (thin film heaters) 141 are in the OFF state, the switch is in the bar state. Thus, the optical signal input via the input waveguide 102 is output from the output waveguide 103, but not from the output waveguide 104. In this case, since the two basic components 170 and 171 prevent leakage light from coming out of the output waveguide 104, the present embodiment can achieve a higher extinction ratio. By supplying power to the thin film heaters 141 of the interferometer optical switches 170 and 171, and varying the optical path length by an amount corresponding to half the wavelength of the optical signal (0.5 λc·k: k is an integer other than zero) by the thermooptic effect, the path length difference became $\Delta L-\delta\Delta L=0.16\ \lambda c-0.50\ \lambda c=-0.34\ \lambda c$. In this case, the phase shifters (thin film heaters) 141 were in the ON state, and the switch was in the cross state, and hence the optical signal input via the input waveguide 102 was output from the output waveguide 104. In addition, although the present example employs the waveguides 101 and 102 as the input waveguides, it can achieve the same advantages by using the waveguides 103 and 104 as the input waveguides, and 101 and 102 as the output waveguides. Besides, since the optical switch of the present example has the adiabatic groove structure, it can suppress the power consumption of the phase shifters required for the switching to 1/10 that of the conventional switch.

Figure 21:
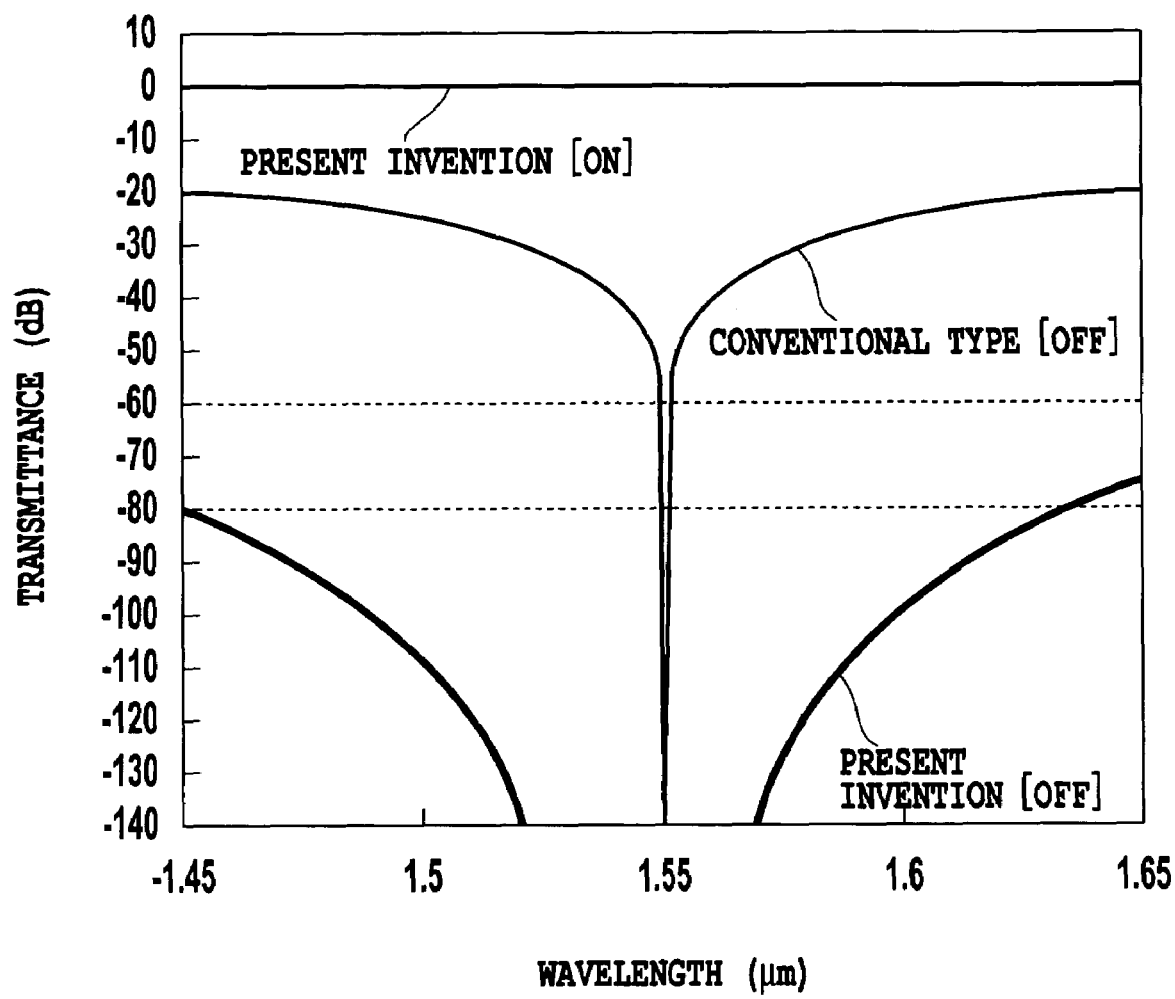
FIG. 21 is a graph illustrating the wavelength dependence of the transmittance of the interferometer optical switch of a first variation of the fourth embodiment in accordance with the present invention.

Next, FIG. 21 illustrates the wavelength characteristics of the measured transmittance of the interferometer optical switch of the present example. The wavelength dependence of the transmittance of the conventional Mach-Zehnder interferometer optical switch as shown in FIG. 37 is also illustrated for comparison.

When the phase shifters 141 are in the OFF state, the interferometer optical switch of the present example can achieve a high extinction ratio equal to or greater than 60 dB over a broad wavelength band of 1.45-1.65 μm, and equal to or greater than 80 dB over a broad wavelength band of 1.45-1.63 μm because of the multiple-stage interferometer configuration. When the phase shifters are brought into the ON state, the interferometer optical switch of the present example achieves a good insertion loss over a broad wavelength band.

As described above, using the plurality of interferometer optical switches in accordance with the present invention enables them to function as a single interferometer optical switch. Although the present example constructs the two-stage interferometer configuration by combining the two identical interferometer optical switches, it is obvious that two interferometer optical switches can use different design values. In addition, it is also possible to assume a configuration other than the two-stage interferometer configuration described in the present example such as combining the interferometer optical switch of the first embodiment and the interferometer optical switch of the second embodiment. Besides, the method of interconnecting a plurality of interferometer optical switches is not limited to that of the present example, but any desired optical waveguides can be interconnected, and any desired optical waveguides can be used as the input waveguides and output waveguides. Furthermore, it is also possible to combine three or more interferometer optical switches.

To increase the tolerance for the fabrication error, the present example were designed such that the power coupling ratios of the directional couplers 151-154 and the path length differences of the minute optical delay lines 132 and 133 constituting the two phase generating couplers 111 and 112 (see FIG. 13) became equal, respectively. Then, the phase generating couplers 111 and 112 are configured in line symmetry with respect to the center, which means that $r_1=r_4$, $r_2=r_3$ and $\Delta L_1=\Delta L_2$. There will only be two types of a coupling ratio design for the directional couplers 151-154. Accordingly, the switch described in the present embodiment can realize the designed switching characteristics simply by fabricating two types of the coupling ratio. In contrast, if all four directional couplers were designed with different coupling ratios, as described in the second embodiment, it will be necessary to fabricate all four types of the coupling ratios to the designed values. Therefore, the switch design in the present embodiment has larger fabrication tolerance. On the other hand, the switch design in the second embodiment offers higher degree of approximation because there is more flexibility in the design variables. The preferred circuit design can be selected depending on the use of the interferometer optical switches.

In addition, comparing the two configurations of the multiple-stage interferometers, although the present example is greater than the foregoing fourth embodiment in the circuit size, it has the advantage of being able to reduce the types of the design values. More specifically, although the fourth embodiment uses three types of directional couplers with different power coupling ratios, the present example uses only two types of the power coupling ratios, thereby facilitating the fabrication. Furthermore, the present example constructs the multiple-stage interferometer switch by placing two basic switches in line symmetry, where the basic switches each has line symmetric configuration. Thus, the present example has a configuration with a very high symmetry, which facilitates the insertion of a half-wave plate or the like.

Although the two interferometer optical switches 170 and 171 have the same design values in the present example, they can have different design values. For example, since the present example sets the maximum extinction wavelength of the two interferometer optical switches at 1.55 μm, it can implement a maximum extinction ratio with a very high absolute value equal to or greater than 140 dB in the maximum extinction wavelength range of 1.52-1.57 µm around the center wavelength of 1.55 µm. On the other hand, the maximum extinction wavelength of the two switches can be set at different values. For example, the maximum extinction wavelength of the interferometer optical switch 170 can be set at about 1.5 µm, and the maximum extinction wavelength of the interferometer optical switch 171 can be set at about 1.6 µm. Although there will be a little reduction of the maximum extinction, the wavelength range with maximum extinction can be extended. The embodiment described here is only an example of the possible implementation of the present invention, and the basic components constituting the multiple-stage interferometer can be designed to have any desired characteristics.

FIFTH EMBODIMENT

Figure 22:
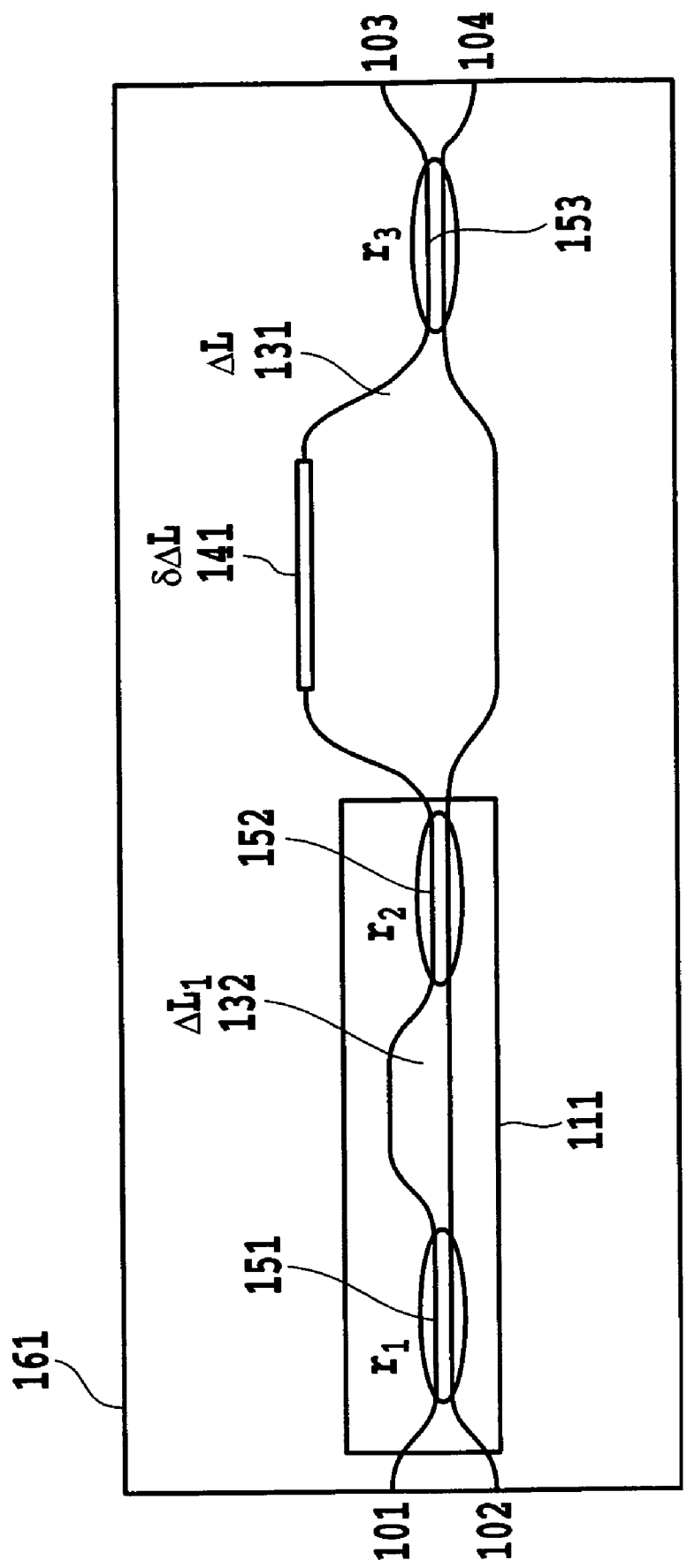
FIG. 22 is a schematic diagram showing a configuration of an interferometer optical switch of a fifth embodiment in accordance with the present invention.

FIG. 22 shows a configuration of the interferometer optical switch of a fifth embodiment in accordance with the present invention. The circuit of the interferometer optical switch of the present embodiment includes a phase generating coupler 111; a directional coupler 153; an optical delay line 131 between the optical multi/demultiplexing device 111 and directional coupler 153; a phase shifter 141 formed in the optical delay line 131; input waveguides 101 and 102; and output waveguides 103 and 104.

As for the interferometer optical switches of the foregoing first to fourth embodiments, such cases as satisfying the foregoing expression (7) are described so that the output intensity is switched between 0 and 1 in particular. However, the optical switch in accordance with the present invention can be configured in such a manner that the output intensity can take a different value between 0 and 1 by setting the sum $2\pi\{\phi_1(\lambda)+\phi\Delta_L(\lambda)+\phi_2(\lambda)\}$ of the phase differences at a value different from $m\cdot\pi$ (m is an integer) so that the sum becomes wavelength insensitive. This makes it possible to implement an output intensity variable optical switch (broad band variable optical attenuator) that can be used over a broad band.

To place the output transmittance at 0 dB, −10 dB, −20 dB and −30 dB, for example, the phase difference values are set such that the output intensity of the optical signal output from the output waveguide 104 is Pc=1.0, 0.1, 0.01 and 0.001. Since the output intensity of the optical switch is represented by the foregoing expression (6), setting the total phase difference $\{\phi_1(\lambda)+\phi\Delta_L(\lambda)+\phi_2(\lambda)\}$ caused by the optical multi/demultiplexing device 111 and optical delay line 131 at −1.00, −0.60, −0.53, −0.51 and −0.50 can implement the broad band light intensity variable optical switch with the output transmittance of 0 dB, −10 dB, −20 dB and −30 dB.

In the interferometer optical switch of the present embodiment as shown in FIG. 22, the power coupling ratios of the directional couplers 151 and 152 constituting the phase generating coupler 111 were set at $r_1=0.3$ and $r_2=0.7$, and the optical path length of the minute optical delay line 132 is set at $\Delta L_1=0.30$ λc (≈0.47 µm). In addition, the path length difference of the Mach-Zehnder interferometer 131 was set at $\Delta L=0.34\cdot\lambda c$ (≈0.53 µm), and the power coupling ratio of the directional coupler 153 was set at $r_3=0.5$. Here, the path length difference represents the relative optical path length of the upper optical waveguide with respect to the lower optical waveguide. The spacing between the two optical waveguides interconnecting the optical multi/demultiplexing device 111 and the directional coupler 153 was made 200 µm. As the phase shifter 141, a thin film heater was used and its width was set at 40 µm, and length at 4 mm.

According to the foregoing design values, the silica-based optical waveguide circuit was fabricated by using flame hydrolysis deposition, photolithography technique and reactive ion etching. It was fabricated such that the relative refractive index of the optical waveguides was 1.5% and the core cross section of the optical waveguides was 4.5×4.5 µm².

A chip on which the interferometer optical switch was formed was diced, a heatsink (not shown) was disposed under the silicon substrate 161, single mode fibers (not shown) were connected to the input/output waveguides 101-104, and feeder leads (not shown) were connected to the thin film heater 141, thereby forming a two-input, two-output optical switch module. Then, the switching characteristics of the interferometer optical switch module were evaluated.

Figure 23:
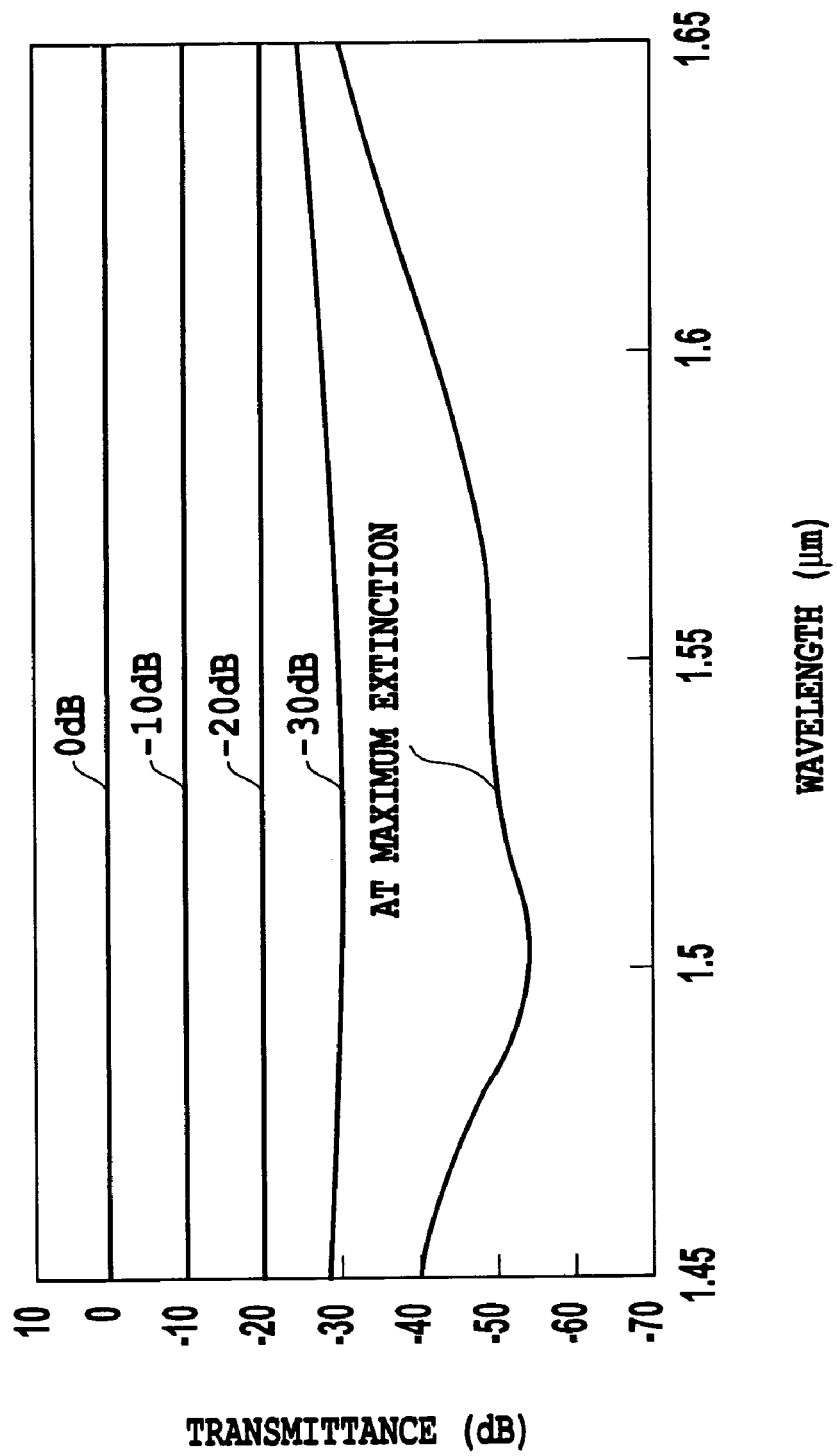
FIG. 23 is a graph illustrating the wavelength dependence of the transmittance of the interferometer optical switch of the fifth embodiment in accordance with the present invention.
Figure 41B:
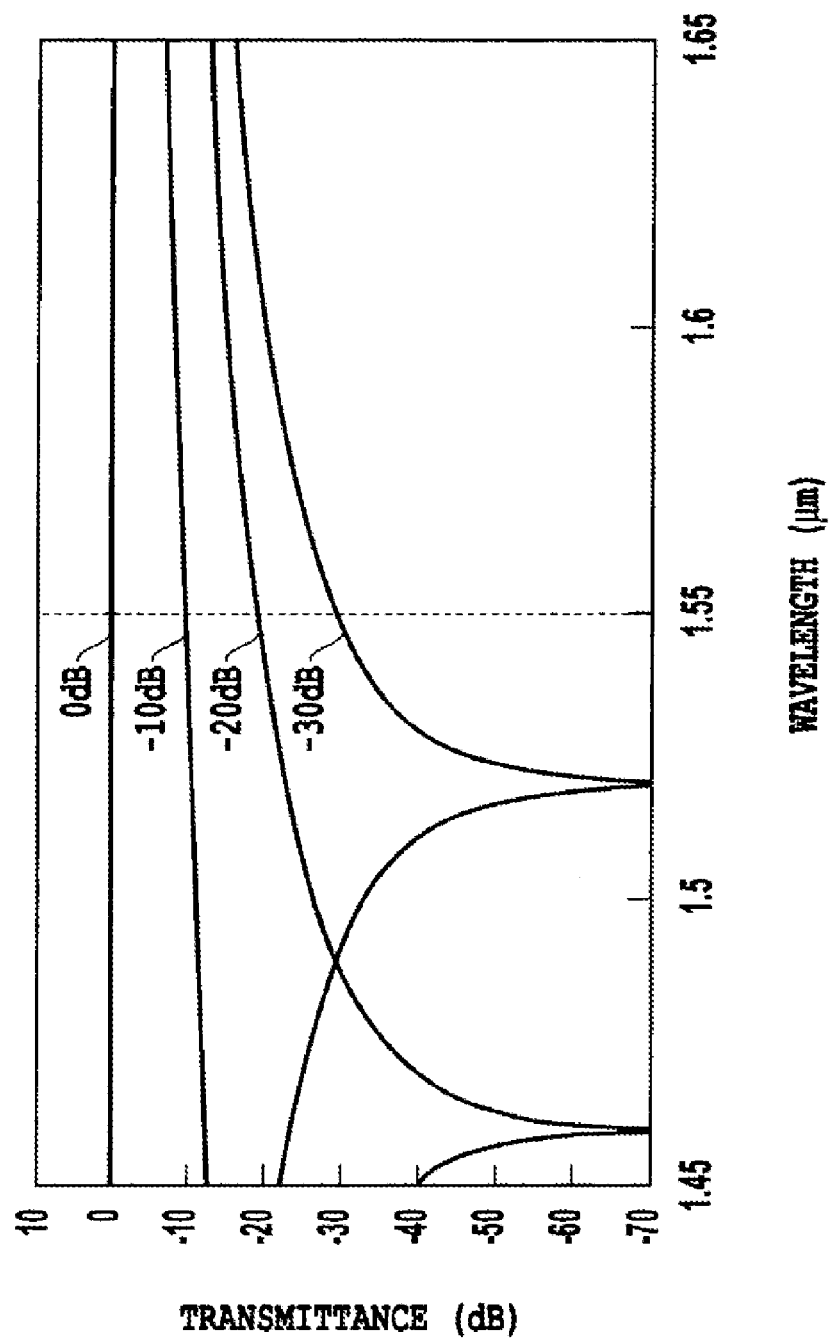
FIG. 41B is a graph illustrating the wavelength dependence of the transmittance when the optical transmittance at the center wavelength $\lambda c$ is set at −30 dB, −20 dB and −10 dB in a conventional variable optical attenuator.

When the phase shifter (thin film heater) 141 is in the OFF state, the switch is in the bar state. When light is launched into the input waveguide, in this state, most of the light is launched from the output waveguide 103, and light launched from the output waveguide 104 is blocked. FIG. 23 illustrates the wavelength dependence of the transmittance under the assumption that the wavelength dependence of the transmittance in this state corresponds to the case of the maximum extinction. Here, supplying power to the thin film heater 141 and varying the power to set the optical path length difference at $\Delta L=0.35$ λc, 0.37 λc, 0.44 λc and 0.84 λc by the thermooptic effect, the total phase difference $\{\phi_1(\lambda)+\phi\Delta_L(\lambda)+\phi_2(\lambda)\}$ caused by the optical multi/demultiplexing device 111 and optical delay line 131 became −0.51, −0.53, −0.60 and −1.00, and the transmittance in the respective state became −30 dB, −20 dB, −10 dB and 0 dB (see FIG. 23). In addition, the wavelength dependence of the transmittance was wavelength insensitive over a broad wavelength band as illustrated in FIG. 23. Comparing with the wavelength characteristics of the conventional variable optical attenuator as illustrated in FIG. 41B, the advantages of the present invention are quite obvious. The conventional switch can attenuate the light at only a particular wavelength. In contrast, the present invention can attenuate the light collectively over a broad wavelength band. Thus, we confirmed the operation of the interferometer optical switch as a wide range intensity variable optical switch (variable optical attenuator).

Although the ideal case was described here in which the first and second optical multi/demultiplexing devices 111 and 153 each have the power coupling ratio of 0.5, the wavelength dependence or fabrication error can take place in practice. To achieve the precise flatness, the phase difference should be set considering the power coupling ratios of the first and second optical multi/demultiplexing devices 111 and 153. Assume that the first and second optical multi/demultiplexing devices 111 and 153 have the power coupling ratios $R1(\lambda)$ and $R2(\lambda)$, respectively. Then, by setting the sum of the phase differences in such a manner that the output intensity $Pc(\lambda)$ becomes constant for the wavelength, the output intensity can be made wavelength insensitive. More specifically, the sum of the phase differences is preferably set as follows.

$$\phi_1(\lambda)+\phi_{\Delta L}(\lambda)+\phi_2(\lambda)=\arccos\{\{Pc(\lambda)-R1(\lambda)\{1-R2(\lambda)\}-R2(\lambda)\{1-R1(\lambda)\}\}\cdot[4R1(\lambda)\{1-R2(\lambda)\}R2(\lambda)\{1-R1(\lambda)\}]^{-1/2}\}/2\pi$$

As clearly seen from the characteristics of FIG. 23, by only setting the sum of the phase differences at a constant value, the transmittance can be kept constant over a sufficiently broad band, thereby being able to implement good characteristics.

Although the optical signal is input to the input waveguide 101, and the optical signal is output from the output waveguide 104 in the foregoing example, this is not essential. For example, the optical signal can be output from the output waveguide 103, or the optical signal can be input to the input waveguide 102. Alternatively, the optical signal can be input to the output waveguides 103 and 104, and output from the input waveguides 101 and 102. In addition, although not shown in FIG. 22, a phase shifter can also be formed on the lower side optical waveguide (second optical waveguide) of the two delay lines constituting the optical delay line 131 to vary the optical path length difference, which makes it possible to set the optical attenuation at the desired value. It is obvious that the intensity variable optical switch described in the present embodiment can implement the features described in the other embodiments. For example, as described in the second embodiment, the first and second optical multi/demultiplexing devices 111 and 112 of FIG. 13 can be used as the phase generating couplers; as described in the third embodiment, the adiabatic groove structure of FIG. 15 can be formed; and as described in the fourth embodiment, the multiple-stage interferometer configuration of FIG. 18 can be used to make the total output intensity constant with respect to the wavelength by adjusting each basic components with different conditions.

As described above, the interferometer optical switch described in the present embodiment uses a novel operation principle to implement a switch that is operatonal over a wide wavelength region. It was confirmed that the switch operates as a variable optical attenuator with uniform transmittance throughout the whole wavelength region. In addition, the switch is operational with only one phase shifter.

SIXTH EMBODIMENT

Figure 24:
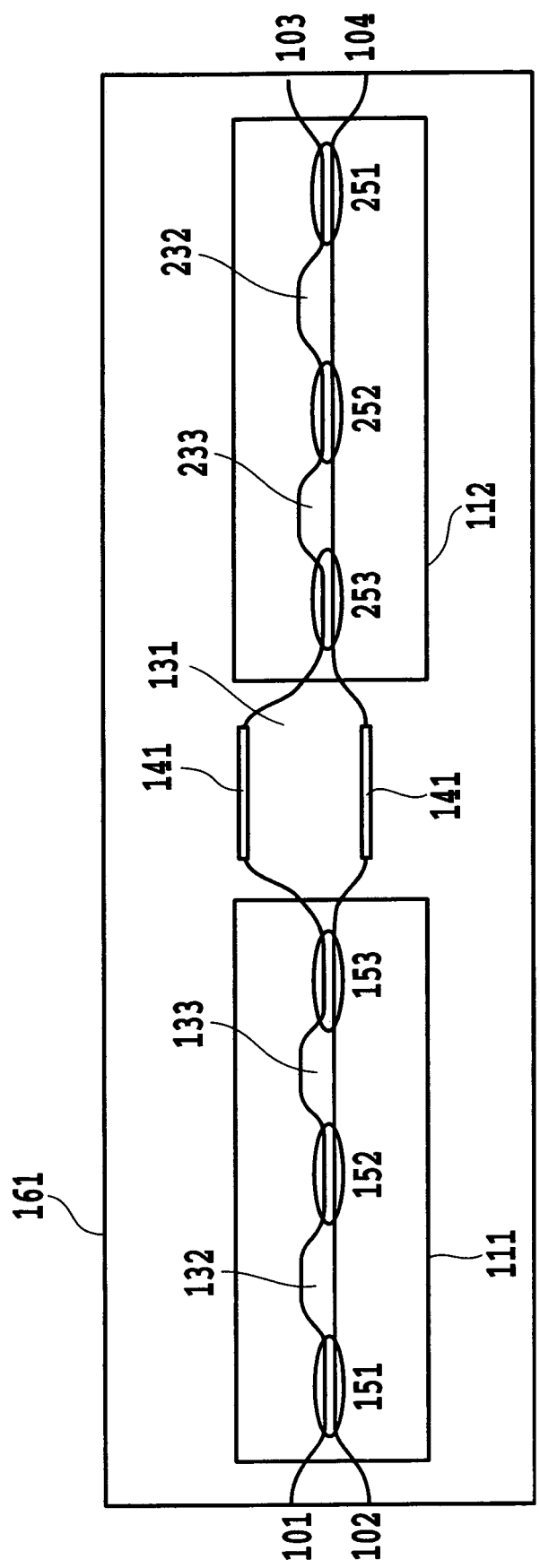
FIG. 24 is a schematic diagram showing a configuration of an interferometer optical switch of a sixth embodiment in accordance with the present invention.

FIG. 24 shows a configuration of the interferometer optical switch of a sixth embodiment in accordance with the present invention. The circuit of the interferometer optical switch of the present embodiment includes a pair of optical multi/demultiplexing devices (phase generating couplers) 111 and 112, the phase differences of the outputs of which have the wavelength dependence; an optical delay line 131 between the optical multi/demultiplexing devices 111 and 112; phase shifters 141 formed in the optical delay line 131; input waveguides 101 and 102; and output waveguides 103 and 104. Setting the phase differences of the outputs of the optical multi/demultiplexing devices 111 and 112 appropriately makes it possible to implement an optical switch with good switching characteristics over a broad wavelength band.

Although a variety of means are conceived as a method of implementing the optical multi/demultiplexing devices, the phase differences of the outputs of which have the wavelength dependence, the present embodiment configures the optical multi/demultiplexing devices 111 and 112 with N+1 optical couplers, and N optical delay lines sandwiched between the adjacent optical couplers, where N is a natural number. FIG. 24 shows a case where N=2.

Figure 25:
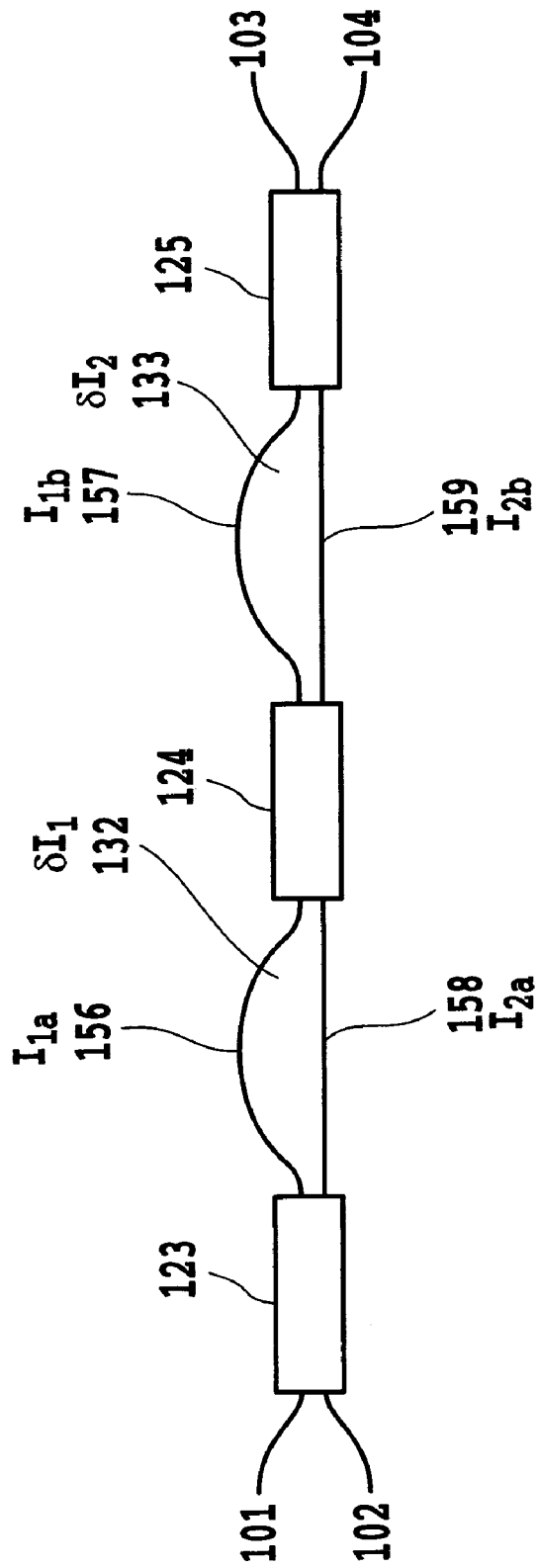
FIG. 25 is a schematic diagram of a phase generating coupler used in the sixth embodiment in accordance with the present invention.

FIG. 25 shows a configuration of the phase generating coupler (optical multi/demultiplexing device) used in the sixth embodiment in accordance with the present invention. The optical multi/demultiplexing device of FIG. 25 includes three optical couplers 123, 124 and 125, and two optical delay lines 132 and 133 between the adjacent optical couplers. The optical delay line 132 is composed of two optical waveguides: a first optical waveguide 156, and a second optical waveguide 158, the optical path lengths of which are given by $l_{1a}$ and $l_{2a}$. The optical path length difference is $\delta_1 = l_{1a} - l_{2a}$. Likewise, the optical delay line 133 is composed of two optical waveguides: a first optical waveguide 157, and a second optical waveguide 159, the optical path lengths of which are given by $l_{1b}$ and $l_{2b}$. The optical path length difference is $\delta l_2 = l_{1b} - l_{2b}$.

The first to fifth embodiments described so far employed the optical multi/demultiplexing device composed of N+1 optical couplers and N optical delay lines as a means for implementing the phase generating coupler. This is because this device can be designed to function as a phase generating coupler with desired coupling ratio and output phase difference with no theoretical loss. It is obvious that other devices can be implemented as a phase generating coupler to create a wavelength-dependent phase required for producing the switches described in the present invention. For example, a combination of optical couplers and an optical delay line can be used to configure the optical multi/demultiplexing device. It may be an FIR (Finite Impulse Response) filter typified by a transversal-form filter, or an IIR (Infinite Impulse Response) filter typified by a ring-form filter.

Next, a design example will be described in which the interferometer optical switch is operated as an asymmetric optical switch. The asymmetric switch is achieved when the total phase obtained by summing up the phase difference $2\pi\phi_{\Delta L}(\lambda)$ caused by the optical path length difference of the optical delay line of the Mach-Zehnder interferometer, and the phase differences $2\pi\phi_1(\lambda)$ and $2\pi\phi_2(\lambda)$ produced by the phase generating couplers 111 and 112, the phase differences of the outputs of which have wavelength dependence, is equal to $m \cdot \pi$ (m is an integer), and when m is an odd number. A conventional asymmetric Mach-Zehnder interferometer optical switch has wavelength dependence that comes from the optical delay line. Accordingly, it cannot set the phase at $m \cdot \pi$ (m: odd number) except for a particular wavelength, and hence the usable wavelength band is limited. On the other hand, the interferometer optical switch in accordance with the present invention can set the phase at a constant value $m \cdot \pi$ (m: odd number) regardless of the wavelength by using the optical multi/demultiplexing devices (phase generating couplers) 111 and 112, the phase differences of the outputs of which have wavelength dependence. In addition, since the switch is asymmetric, the cross port has a high extinction ratio even if the power coupling ratios of the first and second optical multi/demultiplexing devices 111 and 112 deviate from the ideal value 0.5. There will be an insertion loss in ON state when the power coupling ratio deviates from the ideal value, but the loss is negligible compared with the deterioration of the extinction ratio of the symmetric switch when the power coupling ratio deviates from the ideal value.

In the first embodiment described with reference to FIG. 1, the foregoing expression (6) is obtained under the assumption that the first and second optical multi/demultiplexing devices 111 and 112 have the power coupling ratio of a constant value 0.5 throughout the wavelength band. In practice, however, it is not easy to set the power coupling ratios of the optical multi/demultiplexing devices at a constant value of 0.5 throughout the wavelength band. In particular, as the wavelength band becomes broader, it becomes more difficult to maintain the power coupling ratio at a constant value. If the first and second optical multi/demultiplexing devices 111 and 112 have the same power coupling ratio $R(\lambda)$, the light intensity Pc that is output from the output waveguide 104 by the input to the waveguide 101 is given by the following expression.

$$P_C = 2R(\lambda) \cdot [1-R(\lambda)] \cdot [1 + \cos\{2\pi\{\phi_{\Delta L}(\lambda) + \Phi(\lambda)\}\}] \quad (10).$$

Where $\Phi(\lambda)$ is a phase produced by the phase differences of the outputs of the first and second optical multi/demultiplexing devices 111 and 112, and $\Phi(\lambda) \equiv \phi_1(\lambda) + \phi_2(\lambda)$. It is seen from the foregoing expression (10) that when $2\pi\{\phi_{\Delta L}(\lambda) + \phi_1(\lambda) + \phi_2(\lambda)\}$ is equal to $m \cdot \pi$ (m is an integer) and m is an odd number, high extinction ratio can be maintained regardless of the power coupling ratio $R(\lambda)$ of the first and second optical multi/demultiplexing devices 111 and 112. Thus, it is easy to maintain a high extinction ratio over a broad wavelength band.

In summary, a conventional asymmetric Mach-Zehnder interferometer optical switch could not operate over a wide wavelength region because there will be wavelength dependence when the optical path length difference of the optical delay line is set at a finite value. In contrast, the optical path length difference of the optical delay line can be set at arbitrary value by providing the optical delay line with a wavelength-dependenent phase. This phase is generated by the phase difference of the output ports of the optical multi/demultiplexing device. Thus, implementing this principle produces an asymmetric Mach-Zehnder interferometer optical switch with a high extinction ratio over a wide wavelength region and with large fabrication tolerance.

Next, a concrete design example of the phase generating coupler will be described. The present embodiment uses as a means for implementing the phase generating coupler an optical multi/demultiplexing device including N+1 optical couplers and N minute optical delay lines sandwiched between the adjacent optical couplers. Then, under the constraints that the N+1 optical couplers constituting the first and second optical multi/demultiplexing devices 111 and 112 all have the same power coupling ratio, and its value was made as small as possible, the design parameters were optimized so that the power coupling ratios of the phase generating couplers became about 0.5 throughout the wavelength band used, and that the output phase difference $\phi(\lambda)$ was equal to the required phase $\Psi(\lambda)$. The optimized design parameters are as follows: the power coupling ratios of the optical couplers 151, 152, 153, 251, 252 and 253 constituting the phase generating couplers; the optical path length differences of the minute optical delay lines 132, 133, 232 and 233; and the optical path length difference $\Delta L$ of the optical delay line 131 of the Mach-Zehnder interferometer. Although the optical path length difference of a conventional Mach-Zehnder interferometer optical switch is set at $0 \cdot \lambda c$ or $0.5 \cdot \lambda c$, the present invention optimizes the output phase differences of the phase generating couplers including the optical path length difference $\Delta L$ to approximate the phase, which is one of the characteristics of the present invention.

In the present embodiment, the wavelength range is set at 1.25-1.65 µm, and considering that the switch is mainly used at 1.3 µm and 1.55 µm, the optimization is made such that the degree of approximation becomes maximum at 1.3 µm and 1.55 µm in particular. As the optical couplers 151, 152, 153, 251, 252 and 253, directional couplers each consisting of two optical waveguides placed side by side in close proximity are used. As a result of the optimization, N was given by N=2; the power coupling ratio of the directional couplers 151, 152, 153, 251, 252 and 253 became r=0.1; the optical path length difference of the minute optical delay lines 132 and 232 became $\Delta L_1 = 0.09 \cdot \lambda c$ ($\approx 0.13$ µm); and the optical path length difference of the minute optical delay lines 133 and 233 became $\Delta L_2 = 0.05 \cdot \lambda c$ ($\approx 0.07$ µm). In addition, the optical path length difference of the Mach-Zehnder interferometer was made $\Delta L = 0.31 \cdot \lambda c$ ($\approx 0.45$ µm), m was given by m=−1, and the spacing between the two optical waveguides across the optical multi/demultiplexing devices 111 and 112 was made 500 µm. As the phase shifters 141, a thin film heater was used whose width was 80 µm, and length was 3 mm.

According to the foregoing design values, the silica-based optical waveguide circuit was fabricated by using flame hydrolysis deposition, photolithography technique and reactive ion etching. It was fabricated such that the relative refractive index of the optical waveguides was 0.75%, and the core cross section of the optical waveguides was 6×6 µm².

A chip on which the interferometer optical switch was formed was diced, a heatsink (not shown) was disposed under the silicon substrate 161, single mode fibers (not shown) were connected to the input/output waveguides 101-104, and feeder leads (not shown) were connected to the thin film heaters 141, thereby forming a two-input, two-output optical switch module.

When the phase shifters (thin film heaters) 141 are in the OFF state, the switch is in the bar state, and hence the optical signal is not output from the cross port. By supplying power to the thin film heaters 141, the optical path length difference is changed to $\Delta L + \delta \Delta L = 0.31 \lambda c - 0.50 \lambda c = -0.19 \lambda c$, thereby changing the switch to the ON state. In this state, the switch is turned into the cross state, and the optical signal is output from the cross port.

Figure 26:
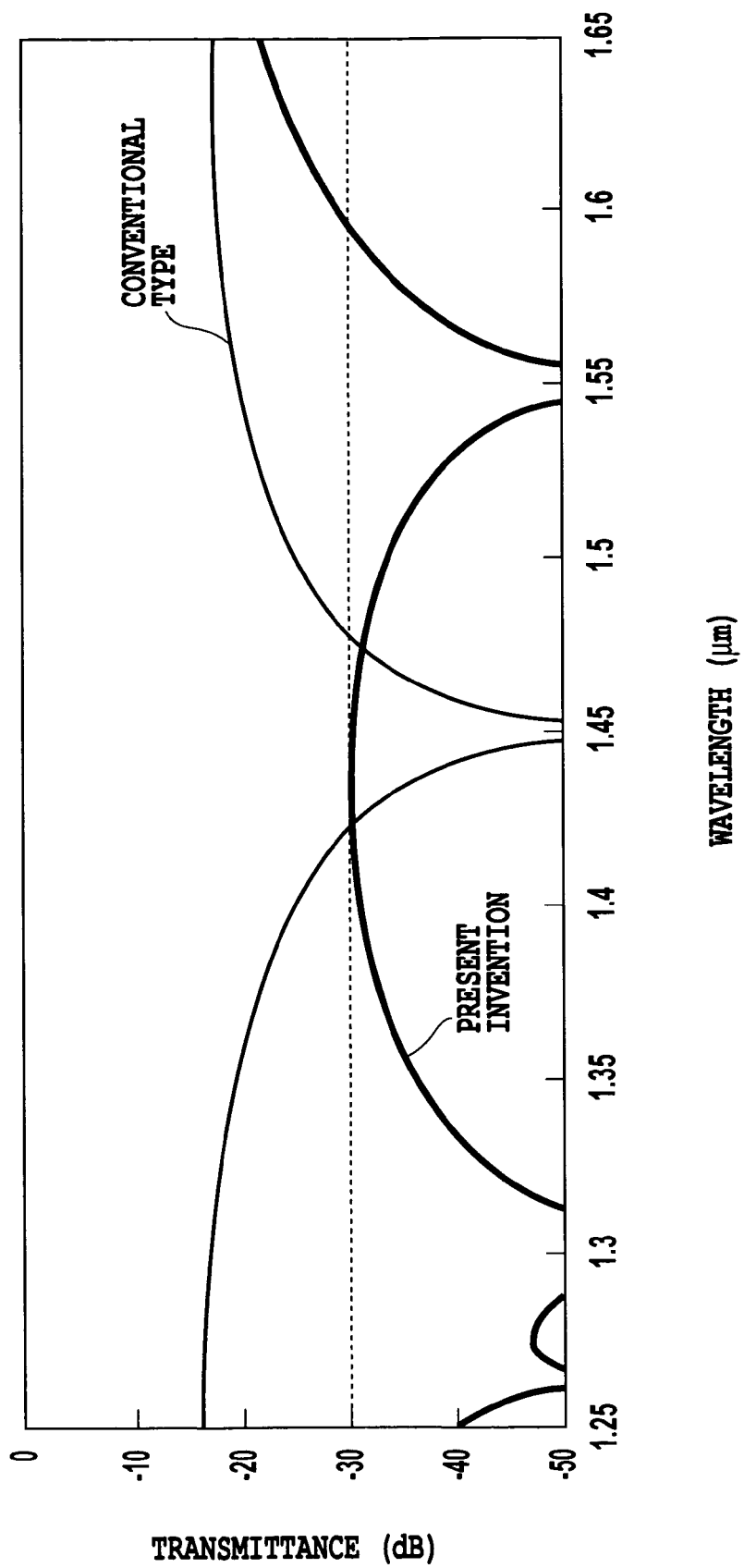
FIG. 26 is a graph illustrating the wavelength dependence of the transmittance of the interferometer optical switch of the sixth embodiment in accordance with the present invention.

Next, FIG. 26 illustrates the wavelength characteristics of the transmittance measured for the interferometer optical switch of the present embodiment. When the phase shifters 141 are in the OFF state, the optical switch of the present embodiment can achieve a high extinction ratio equal to or greater than 30 dB over a broad wavelength band of 1.25-1.6 µm. In particular, since the present embodiment optimizes the design values of the phase generating couplers 111 and 112 in such a manner that the degree of approximation becomes high at 1.3 µm and 1.55 µm, the extinction ratio is higher at 1.3 µm and 1.55 µm, which is equal to or greater than 50 dB.

As described above, the present invention provides an asymmetric Mach-Zehnder interferometer optical switch that functions as a gate switch capable of maintaining a high extinction ratio over a wavelength region. The present invention, however, is not limited to the gate switch, but is applicable to broaden the band of any desired interferometer optical switches such as broad band tap switches. In addition, although the phase differences of the phase generating couplers and the optical path length difference $\Delta L$ of the optical delay line of the Mach-Zehnder interferometer are set at $2\pi\{\phi_{\Delta L}(\lambda) + \phi_1(\lambda) + \phi_2(\lambda)\} = (2m'+1) \cdot \pi$ (m' is an integer) in the initial OFF state in the foregoing description, this is not essential. For example, setting them at $2\pi\{\phi_{\Delta L}(\lambda) + \phi_1(\lambda) + \phi_2(\lambda)\} = 2m' \cdot \pi$ (m' is an integer) in the OFF state can implement a symmetric Mach-Zehnder interferometer which is capable of switching over a broad wavelength band, and which can operate as a good bifurcation switch.

For the optimization of the design variables, the present embodiment impose certain constraints where all of the N+1 optical couplers (123, 124 and 125) have the same power coupling ratio, and its value is made as small as possible. Although such constraints are not essential, setting all the power coupling ratios of the optical couplers constituting the phase generating couplers at a constant value offers an advantage of being able to facilitate the fabrication of the optical couplers. In addition, although the power coupling ratios can be set at any desired values from zero to one, the power coupling ratios are optimized at a small value such as 0.1. This is because the reduction of the power coupling ratios offers such advantages as downsizing the directional couplers, increasing the fabrication tolerance, and decreasing the polarization dependence. Since the phase generating couplers (FIG. 25) of the present embodiment each have a larger number of optical couplers (123, 124 and 125) and optical delay lines (132 and 133) than the case where N=1 (FIG. 4), the circuit size is slightly increased. However, since the directional couplers (123, 124 and 125) are compact, an increase in the circuit size is negligible.

In addition, the present embodiment employs the phase generating couplers composed of N+1 optical couplers, and N optical delay lines sandwiched between the adjacent optical couplers, where N is set at N=2. An increase of N, which will enable an increase of the number of parameters that can be set, can raise the degree of approximation of the phase generating couplers. For example, comparing FIG. 26 (the present embodiment) with FIG. 17 (third embodiment), since the present embodiment is better in the degree of approximation, it has a broader wavelength range in which the extinction ratio is equal to or greater than 30 dB. More specifically, the third embodiment, which sets N at N=1, has three design variables. In contrast, the present embodiment, which sets N at N=2, has five design variables, and hence has higher design flexibility. Accordingly, the present embodiment can raise the degree of approximation. There will still be sufficient design flexibility even when N+1=3 optical couplers are set at the same value. As a result, the design values are obtained which enable all the optical couplers to have the power coupling ratio of 0.1, and hence can implement the interferometer optical switch having large resistance to the fabrication error, and small polarization dependence.

Furthermore, the present embodiment employs two phase generating couplers 111 and 112, and in their optical delay lines 132, 133, 233 and 232, the optical delay line having greater sum of the optical path lengths is placed at one side (upper side of FIG. 24) unevenly on the circuit. More specifically, in FIG. 24, the optical path lengths of the first optical waveguide constituting the N=2 optical delay lines 132 and 133 of the first optical multi/demultiplexing device 111 have the sum of $\Sigma \delta l_{1,1} = l_{11a} + l_{11b} = 678.26 + 551.79 = 1230.05$; the optical path lengths of the second optical waveguide have the sum of $\Sigma l_{2,1} = l_{21a} + l_{21b} = 678.13 + 551.72 = 1229.85$; the optical path lengths of the first optical waveguide constituting the N=2 optical delay line 233 and 232 of the second optical multi/demultiplexing device 112 have the sum of $\Sigma l_{1,2} = l_{12a} + l_{12b} = 551.79 + 678.26 = 1230.05$; and the optical path lengths of the second optical waveguide have the sum of $\Sigma l_{2,2} = l_{22a} + l_{22b} = 551.72 + 678.13 = 1229.85$. Thus, they satisfy the relations $\Sigma l_{1,1} > \Sigma l_{2,1}$ and $\Sigma l_{1,2} > \Sigma l_{2,2}$, which means that the first optical waveguide has the longer sum of the optical delay lines of the phase generating couplers 111 and 112. Accordingly, it is seen that the longer waveguide are disposed unevenly at the upper side of FIG. 24. In this way, the phase generating couplers 111 and 112 can produce the phase effectively phase. In particular, the configuration of the interferometer optical switch of the present embodiment is a special example, which uses as the first and second optical multi/demultiplexing devices the phase generating couplers with the same design values, and disposes them in such a manner that they are mirror symmetry with each other with respect to the center of the optical delay line 131 of the Mach-Zehnder interferometer. In this case, the phase differences are set in such a manner that they satisfy the relationship $\phi_1(\lambda) = \phi_2(\lambda) = \Psi(\lambda)/2$. The first embodiment employs a phase difference $\phi_1(\lambda)$ of only one phase generating coupler. In contrast, it is enough for the present embodiment to produce half of the required phase difference per phase generating coupler. It is obvious that it is not essential for the longer waveguide in the optical delay lines of the first and second phase generating couplers to be disposed at one side, but disposed at opposite sides. Incidentally, in the individual embodiments in accordance with the present invention, the path length difference of the optical delay line refers to the relative path length difference of the first waveguide with respect to the second waveguide. Accordingly, when the second waveguide is longer than the first waveguide, the path length difference becomes negative. When N is equal to or greater than two, and N optical delay lines have different signs, the uneven disposition can be defined in the same manner as described above. For example, if the second waveguide of the minute optical delay lines 132 and 232 is longer, and hence the path length difference has a negative sign, the sum of the optical path length differences of the first optical waveguide and second optical waveguide constituting the optical delay lines 132 and 133 of the first optical multi/demultiplexing device 111, and the sum of the optical path lengths of the first optical waveguide and second optical waveguide constituting the optical delay line 233 and 232 of the second optical multi/demultiplexing device 112 are $\Sigma l_{1,1} = l_{11a} + l_{11b} = 678.13 + 551.79 = 1229.92$, $\Sigma l_{2,1} = l_{21a} + l_{21b} = 678.26 + 551.72 = 1229.98$, $\Sigma l_{1,2} = l_{12a} + l_{12b} = 551.79 + 678.13$, and $\Sigma l_{2,2} = l_{22a} + l_{22b} = 551.72 + 678.26$, respectively. In this case, they satisfy $\Sigma l_{2,1} > \Sigma l_{1,1}$ and $\Sigma l_{2,2} > \Sigma l_{1,2}$, which means that the optical delay lines of the first and second multi/demultiplexing device 111 and 112 are both disposed in the second waveguide side.

SEVENTH EMBODIMENT

Figure 27:
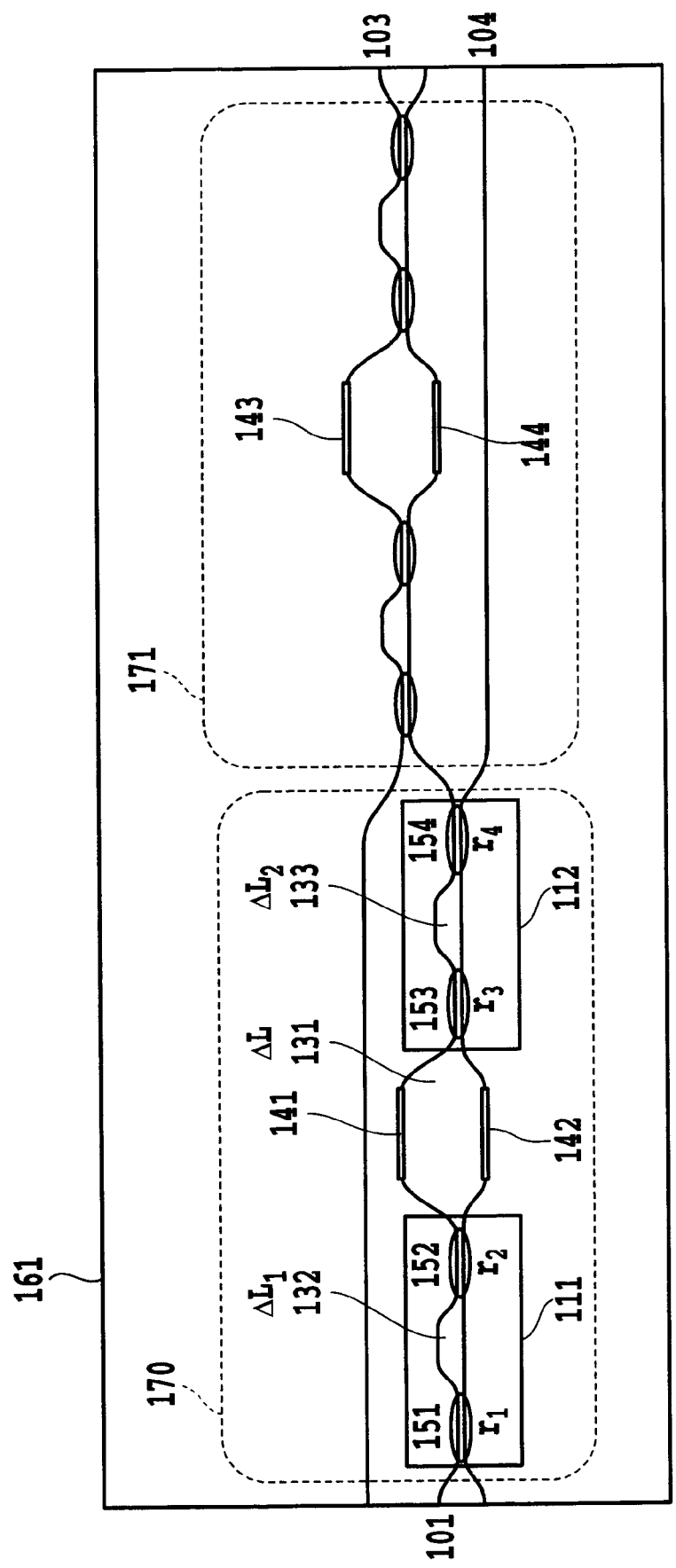
FIG. 27 is a schematic diagram showing a configuration of an interferometer optical switch of a seventh embodiment in accordance with the present invention.

FIG. 27 shows a configuration of the interferometer optical switch of a seventh embodiment in accordance with the present invention. It is possible to make the interferometer optical switch of the present embodiment function as a 1×2 switch. In addition, it can carry out the switching operation regardless of the wavelength by using phase generating couplers, the phase differences of the outputs of which have wavelength dependence, as the optical multi/demultiplexing devices of the interferometer optical switch, the basic component of the present circuit.

The circuit of the optical switch is configured by connecting two interferometer optical switches 170 and 171 in cascade. More specifically, the two, first and second, interferometer optical switches 170 and 171 with the same design values are used, and the upper port at the output side of the first interferometer optical switch 170 is connected to the lower port at the input side of the second interferometer optical switch 171. In addition, the upper port at the input side of the first interferometer optical switch 170 is used as the input waveguide 101; the upper port at the output side of the second interferometer optical switch 171 is used as the output waveguide 103 (first output port); and the lower port at the output side of the first interferometer optical switch 170 is used as the output waveguide 104 (second output port).

Since the present embodiment employs two interferometer optical switches 170 and 171 with the same design values, only the first interferometer optical switch 170 will be described in detail. Although a variety of means are conceivable as a method of implementing the optical multi/demultiplexing device, the phase difference of the output of which has wavelength dependence, the optical multi/demultiplexing device can be implemented by interconnecting optical couplers with an optical delay line. The present embodiment configures each of the optical multi/demultiplexing devices (phase generating coupler) 111 and 112 with N+1 (=2) optical couplers 151 and 152 or 153 and 154; and N (=1) optical delay line 132 or 133 between the adjacent optical couplers. The optical multi/demultiplexing device 111 includes the optical couplers (directional couplers 151 and 152), and the optical delay line 132 between the adjacent optical couplers. The optical delay line 132 is composed of two optical waveguides: a first optical waveguide and a second optical waveguide, and their optical path length difference is $\Delta L_1 = l_{11} - l_{21}$, where $l_{11}$ and $l_{21}$ are their optical path lengths. Likewise, the optical multi/demultiplexing device 112 includes the optical couplers (directional couplers 153 and 154), and the optical delay line 133 between the adjacent optical couplers. The optical delay line 133 is composed of two optical waveguides: a first optical waveguide and a second optical waveguide, and their optical path length difference is $\Delta L_2 = l_{12} - l_{22}$, where $l_{12}$ and $l_{22}$ are their optical path lengths.

Next, a design example of a concrete phase generating coupler will be described. The present embodiment uses as a means for implementing the phase generating coupler an optical multi/demultiplexing device composed of N+1 optical couplers, and N minute optical delay lines sandwiched between the adjacent optical couplers. Then constraints are imposed that the power coupling ratios of each N+1=2 (four in total) optical couplers constituting the first and second optical multi/demultiplexing devices 111 and 112 are the same ($r_1 = r_2 = r_3 = r_4 = r$). As the optical couplers, directional couplers are used each of which is composed of two optical waveguides placed side by side in close proximity. In the present embodiment, the wavelength range is set at 1.45-1.65 μm, and the design parameters are optimized in such a manner that the power coupling ratio of the phase generating coupler becomes about 0.5 throughout the wavelength band used, and the phase difference $\Phi(\lambda) = \phi_1(\lambda) + \phi_2(\lambda)$ of the output agrees with the appropriate phase $\Psi(\lambda)$. Here, the appropriate phase refers to a phase required for implementing an asymmetric Mach-Zehnder interferometer optical switch capable of operation over a wide wavelength range. The phase is given by substituting 2m'+1 (m' is an integer) for m (m is an integer) of the foregoing expression (7). The optimized design parameters include the power coupling ratios of the optical couplers constituting the phase generating couplers; the optical path lengths of the minute optical delay lines; and the optical path length difference ΔL of the optical delay line of the Mach-Zehnder interferometer. A conventional Mach-Zehnder interferometer optical switch has an optical path length difference of ΔL, which is set at 0·λc or 0.5·λc. In contrast, the present invention performs optimization of the phase generating coupler design variables including the optical path length difference ΔL so that the phase difference of the light launched from the phase generating coupler is equal to the appropriate phase.

For the optimization, the present embodiment imposes the constraints that the N+1 optical couplers have the same power coupling ratio. Although such constraints are not essential, setting all the power coupling ratios of the optical couplers constituting the phase generating couplers at the same value offers the advantage of being able to facilitate the fabrication of the optical couplers. Comparing with the second embodiment, since the second embodiment does not impose any constraints on the power coupling ratios of the optical couplers constituting the phase generating couplers, and increases the flexibility of the design values, the second embodiment is superior to the present embodiment in the degree of approximation. In contrast, the present embodiment is designed considering the ease of fabrication. Like this way, the phase generating couplers are designed according to the application of the circuit.

Furthermore, the present embodiment employs two phase generating couplers, and their optical delay lines are placed on the circuit in such a fashion that the optical delay line with a greater sum of the optical path lengths is unevenly disposed at one side (upper side of FIG. 27), that is, in such a manner that $\Sigma l_{1,1} > \Sigma l_{2,1}$ and $\Sigma l_{1,2} > \Sigma l_{2,2}$ are satisfied.

As a result of numerical calculations, N was set at N=1; the power coupling ratio of the directional couplers 151, 152, 153 and 154 was set at r=0.2; and the optical path length differences of the minute optical delay lines 132 and 133 were set at $\Delta L_1 = \Delta L_2 = 0.15 \cdot \lambda c$ (≈0.23 μm). In addition, the optical path length difference of the Mach-Zehnder interferometer was set at $\Delta L = 0.28 \cdot \lambda c$ (≈0.43 μm); m' was set at m'=−1; and the spacing between the two optical waveguides that connects optical multi/demultiplexing devices 111 and 112 was made 100 μm. As the phase shifters, a thin film heater was used, whose width was 30 μm, and length was 2 mm.

According to the foregoing design values, the silica-based optical waveguide circuit was fabricated by using flame hydrolysis deposition, photolithography technique and reactive ion etching. It was fabricated such that the relative refractive index of the optical waveguides was 0.75% and the core cross section of the optical waveguides was 6×6 μm².

A chip on which the interferometer optical switch was formed was diced, a heatsink (not shown) was disposed under the silicon substrate 161, single mode fibers (not shown) were connected to the input/output waveguides 101-104, and feeder leads (not shown) were connected to the thin film heaters 141, thereby forming a two-input, two-output optical switch module.

Next, the switching operation will be described in the case where a light is input via the input waveguide 101 of the optical switch module fabricated, and the output port is switched from the output waveguide 103 (first output port) to 104 (second output port). In the initial state, the thin film heater (144) is activated to change the optical path length difference of the interferometer optical switch 171 to $\Delta L + \delta \Delta L = 0.28 \lambda c - 0.50 \lambda c = -0.22 \lambda c$. In this state, the interferometer optical switch 170 of the first stage is in the bar state, and the interferometer optical switch 171 of the second stage is in the cross state. Accordingly, the light input via the input waveguide 101 is completely transmitted via the through port of the interferometer optical switch 170, and is output from the output waveguide 103 (first output port) of the interferometer optical switch 171. On the other hand, the light is not output from the output waveguide 104 (second output port) of the interferometer optical switch 170. Next, the thin film heater (144) is turned off again, and the power is supplied to the thin film heater (142) to change the optical path length difference of the interferometer optical switch 170 to $\Delta L + \delta \Delta L = 0.28 \lambda c - 0.50 \lambda c = -0.22 \lambda c$. In this state, the interferometer optical switch 170 of the first stage is placed in the cross state, and the interferometer optical switch 171 of the second stage is placed in the bar state. Accordingly, the light input via the input waveguide 101 is output from the cross port of the interferometer optical switch 170, that is, from the output waveguide 104 (second output port). On the other hand, since the light is cut off by the through port of the interferometer optical switch 170 and the cross port of the interferometer optical switch 171, the light is not output from the output waveguide 103 (first output port). In this way, the interferometer optical switch of the present embodiment can be operated as a bifurcation switch with a constant power consumption of 0.5 W.

Figure 28A:
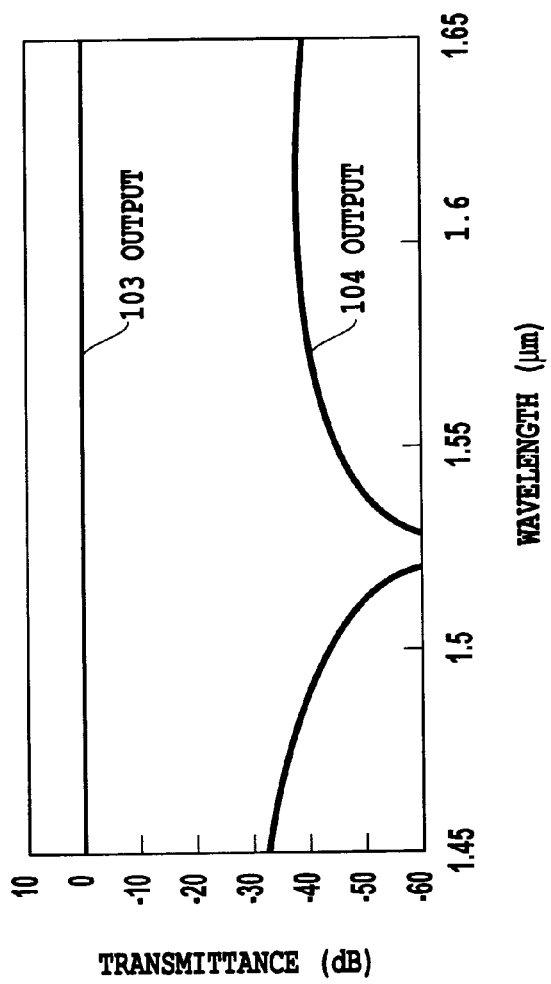
FIG. 28A is a graph illustrating the wavelength dependence of the transmittance in an OFF state of the interferometer optical switch of the seventh embodiment in accordance with the present invention.
Figure 28B:
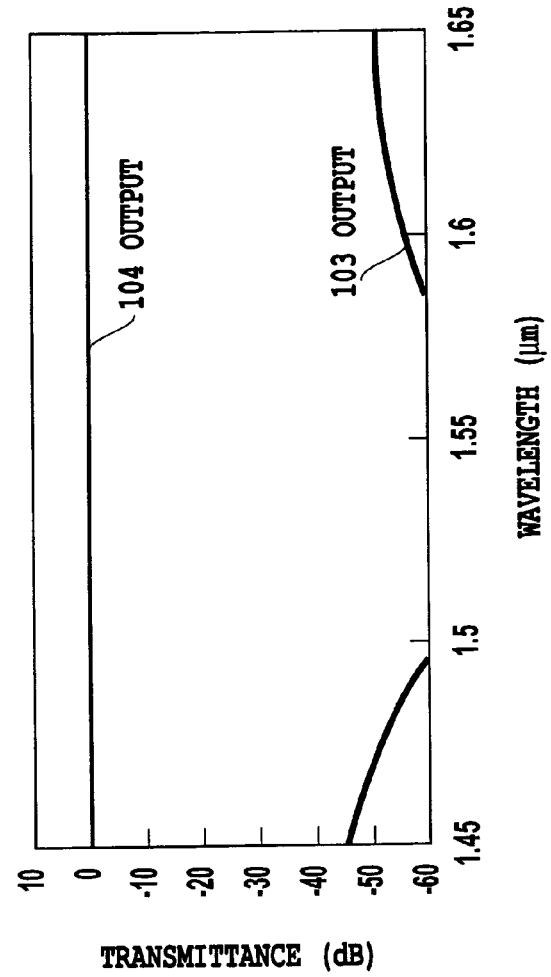
FIG. 28B is a graph illustrating the wavelength dependence of the transmittance in an ON state of the interferometer optical switch of the seventh embodiment in accordance with the present invention.

FIG. 28A illustrates the wavelength characteristics of the transmittance in the initial state (OFF state) output from the output waveguide 103 (first output port) of the interferometer optical switch of the present embodiment; and FIG. 28B illustrates the wavelength characteristics of the transmittance in a post-switching state (ON state) output from the other output waveguide 104 (second output port). In either case, a high extinction ratio equal to or greater than 30 dB is obtained over a broad wavelength band of 1.45-1.65 μm. Thus, a 1×2 switch is implemented which has a high extinction ratio over a broad wavelength band, and constant power consumption.

In the present embodiment, two interferometer optical switches equipped with phase generating couplers were connected in series to configure a single interferometer optical switch. This embodiment demonstrated the operation of the interferometer optical switch as a constant power consumption, broad band 1×2 switch. However, the interferometer optical switch presented in this embodiment can be used for different applications. Moreover, any configuration other than that described in this embodiment can be used to configure a wide-range 1×2 optical switch or a wide-range optical switch with constant power consumption.

EIGHTH EMBODIMENT

Figure 29:
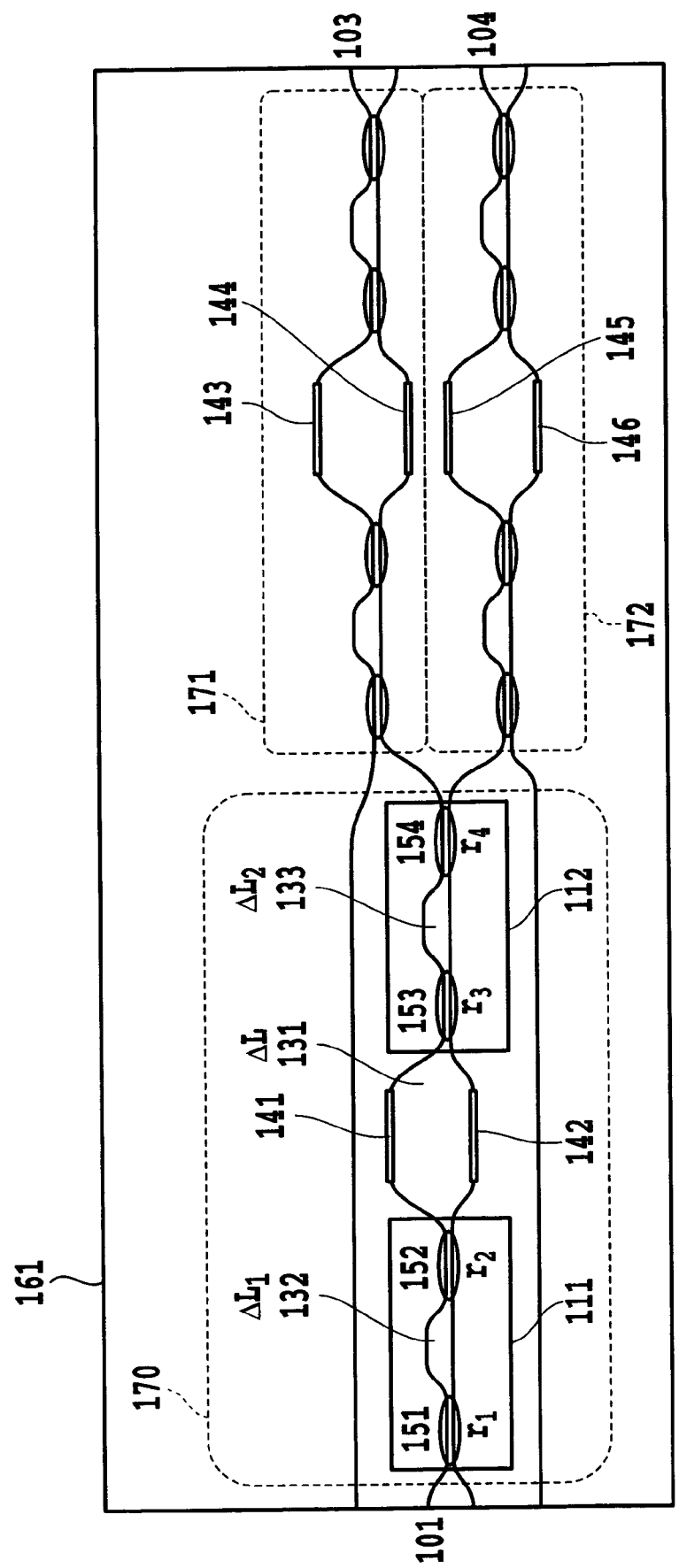
FIG. 29 is a schematic diagram showing a configuration of an interferometer optical switch of an eighth embodiment in accordance with the present invention.

FIG. 29 shows a configuration of the interferometer optical switch of an eighth embodiment in accordance with the present invention. The optical switch of the present embodiment can operate as a 1×2 switch with a PI-Loss (Path Independent Loss) configuration. Furthermore, it can carry out the switching operation independent of the wavelength band by using the phase generating couplers, the phase differences of the outputs of which have wavelength dependence, as the optical multi/demultiplexing devices of the interferometer optical switch, which are the basic component of the present embodiment.

The circuit of the interferometer optical switch of the present embodiment is configured by connecting a plurality of interferometer optical switches in cascade. More specifically, using three, first to third, interferometer optical switches 170, 171 and 172 with the same design values, the first interferometer optical switch 170 has its upper port at the output side connected to the lower port at the input side of the second interferometer optical switch 171, and has its lower port at the output side connected to the upper port at the input side of the third interferometer optical switch 172. In addition, the first interferometer optical switch 170 has its upper port at the input side used as the input waveguide 101, the second interferometer optical switch 171 has its upper port at the output side used as the output waveguide 103 (first output port), and the third interferometer optical switch 172 has its upper port at the output side used as the output waveguide 104 (second output port).

Since the present embodiment employs three interferometer optical switches 170, 171 and 172 with the same design values, only the first interferometer optical switch 170 will be described in detail. To achieve uniform output intensity of the interferometer optical switch of the present embodiment throughout the wavelength band, optimization was performed for the power coupling ratios of the optical couplers 151-154 constituting the individual phase generating couplers 111 and 112, the optical path length differences of the minute optical delay lines 132 and 133, and the optical path length difference ΔL of the optical delay line 131 of the Mach-Zehnder interferometer. As a result of numerical calculations, the power coupling ratios of the directional couplers 151 and 152, and 153 and 154 constituting the phase generating couplers 111 and 112 were set at $r_1=0.2$, $r_2=0.2$, $r_3=0.2$ and $r_4=0.2$, and the optical path length differences of the minute optical delay lines 132 and 133 were set at $\Delta L_1=0.15\cdot\lambda c$ (≈0.23 μm) and $\Delta L_2=0.15\cdot\lambda c$ (≈0.23 μm). In addition, the optical path length difference of the optical delay line 131 of the Mach-Zehnder interferometer was set at $\Delta L=0.28\cdot\lambda c$ (≈0.43 μm), and the spacing between the two optical waveguides of the optical delay line 131 was set at 200 μm. As the phase shifters 141 and 142, a thin film heater was used whose width was 50 μm, and length was 3 mm.

According to the foregoing design values, the silica-based optical waveguide circuit was fabricated by using flame hydrolysis deposition, photolithography technique and reactive ion etching. It was fabricated such that the relative refractive index of the optical waveguides was 1.5%, and the core cross section of the optical waveguides was 4.5×4.5 μm².

A chip on which the interferometer optical switch was formed was diced, a heatsink (not shown) was disposed under the silicon substrate 161, single mode fibers (not shown) were connected to the input/output waveguides 101-104, and feeder leads (not shown) were connected to the thin film heaters 141, thereby forming a two-input, two-output optical switch module.

Next, the switching operation will be described in the case where a light is input via the input waveguide 101 of the optical switch module fabricated, and the output port is switched from the output waveguide 103 (first output port) to 104 (second output port). In the initial state, the thin film heaters (144 and 146) are operated to change the optical path length differences of the interferometer optical switches 171 and 172 to $\Delta L+\delta\Delta L=0.28\lambda c-0.50\lambda c=-0.22\lambda c$. In this state, the interferometer optical switch 170 of the first stage is in the bar state, and the two interferometer optical switches 171 and 172 of the second stage are in the cross state. Accordingly, the light input via the input waveguide 101 is completely transmitted via the through port of the interferometer optical switch 170, and is output from the output waveguide 103 (first output port) of the interferometer optical switch 171. On the other hand, light is not output from the output waveguide 104 (second output port) because the light is cut off by the cross port of the interferometer optical switch 170 and the through port of the interferometer optical switch 172. Next, the thin film heaters (144 and 146) are turned off again, and the power is supplied to the thin film heater (142) to change the optical path length difference of the interferometer optical switch 170 to $\Delta L+\delta\Delta L=0.28\lambda c-0.50\lambda c=-0.22\lambda c$. In this state, the interferometer optical switch 170 of the first stage is placed in the cross state, and the interferometer optical switches 171 and 172 of the second stage are placed in the bar state. Accordingly, light input via the input waveguide 101 is transmitted through the cross port of the interferometer optical switch 170, and is output from the output waveguide 104 (second output port) of the interferometer optical switch 172. On the other hand, since the light is cut off by the through port of the interferometer optical switch 170 and the cross port of the interferometer optical switch 171, light is not output from the output waveguide 103 (first output port).

Figure 30A:
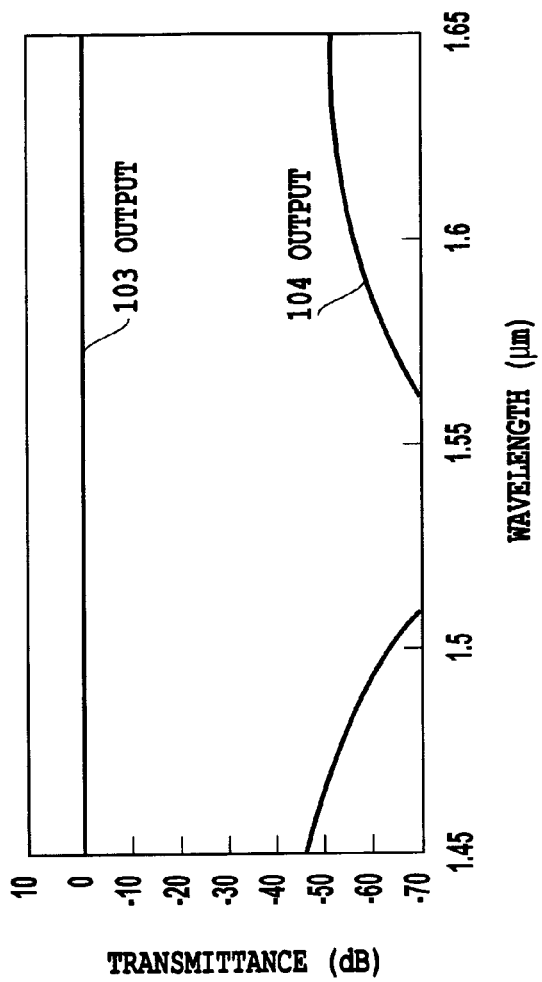
FIG. 30A is a graph illustrating the wavelength dependence of the transmittance in an OFF state of the interferometer optical switch of the eighth embodiment in accordance with the present invention.
Figure 30B:
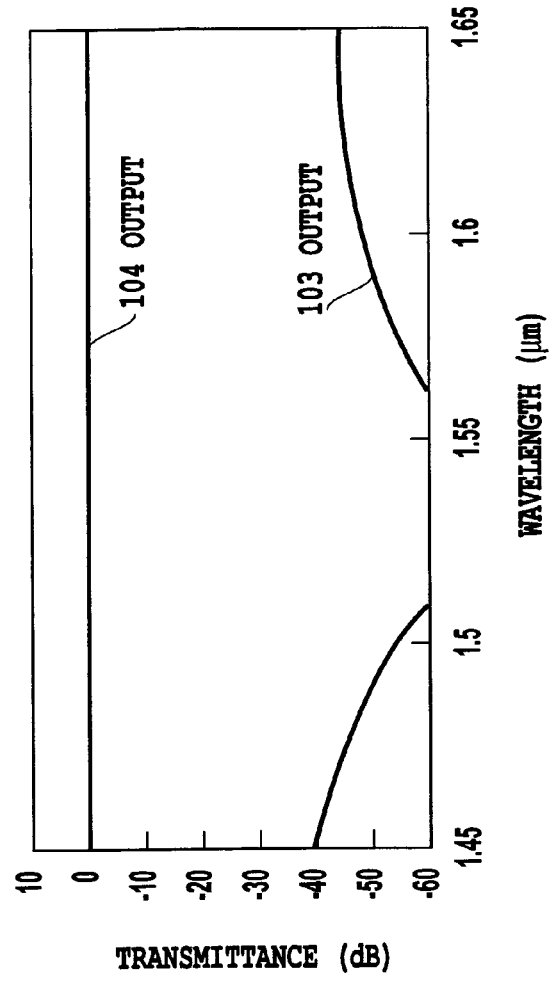
FIG. 30B is a graph illustrating the wavelength dependence of the transmittance in an ON state of the interferometer optical switch of the eighth embodiment in accordance with the present invention.

FIG. 30A illustrates the wavelength characteristics of the transmittance in the initial state (OFF state) output from the output waveguide 103 (first output port) of the interferometer optical switch of the present embodiment; and FIG. 30B illustrates the wavelength characteristics of the transmittance in a post-switching state (ON state) output from the other output waveguide 104 (second output port). In either case, a high extinction ratio equal to or greater than 45 dB is obtained over a broad wavelength band of 1.45-1.65 μm. In addition, the interferometer optical switch of the present embodiment has a PI-Loss configuration in which, light passes through same amount of path regardless of the output port selected. Thus, same characteristics are obtained for the first path (input from 101 and output from 103) and the second path (input from 101 and output from 104).

In the present embodiment, the interferometer optical switches including the phase generating couplers are connected in cascade to configure a single interferometer optical switch. This embodiment demonstrated the operation of the interferometer optical switch as a PI-LOSS broad band 1×2 switch with the same wavelength characteristics independent of the optical path. However, the interferometer optical switch presented in this embodiment can be used for different applications. Moreover, any configuration other than that described in this embodiment can be used to configure a wide-range 1×2 optical switch or a wide-range optical switch with PI-LOSS characteristics.

NINTH EMBODIMENT

Figure 31:
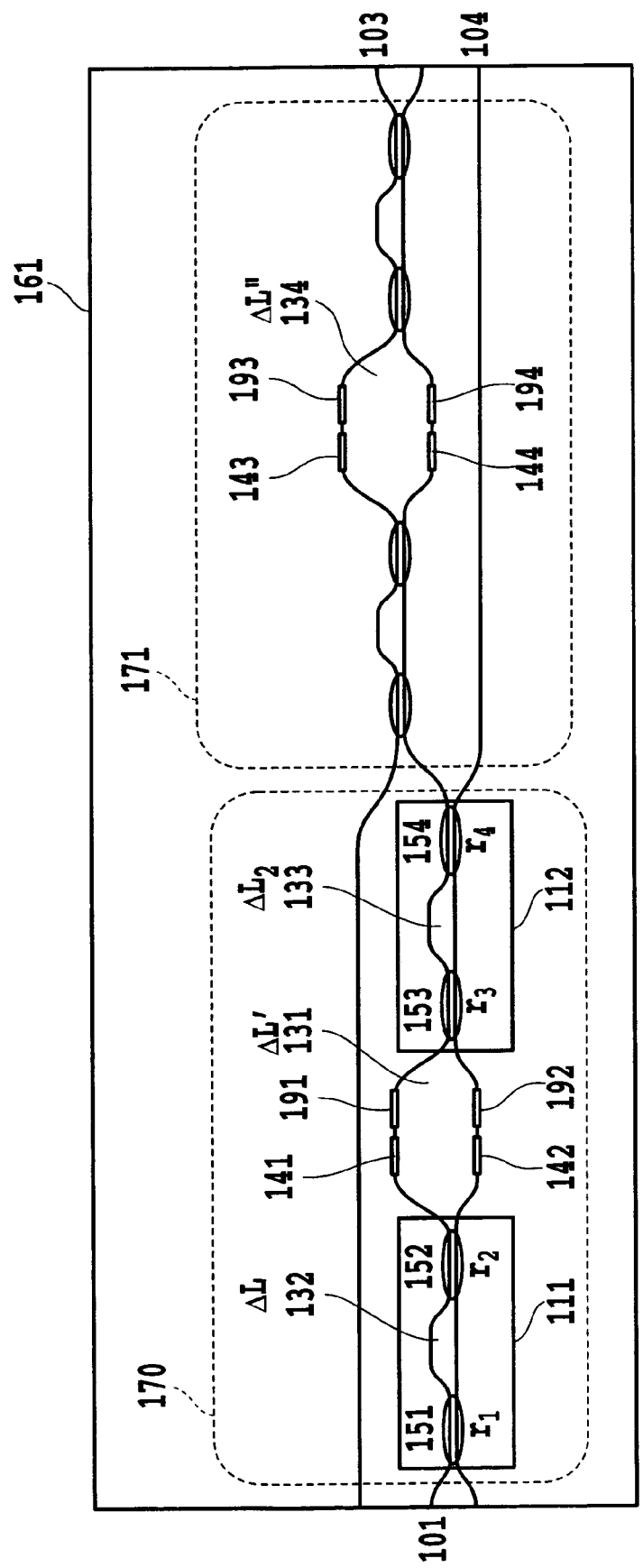
FIG. 31 is a schematic diagram showing a configuration of an interferometer optical switch of a ninth embodiment in accordance with the present invention.

FIG. 31 shows a configuration of the interferometer optical switch of a ninth embodiment in accordance with the present invention. The interferometer optical switch of the present embodiment has on its optical waveguides birefringent index adjusting means, and can operate as a polarization beam switch as will be described below. Furthermore, it can carry out the switching operation independent of the wavelength by using the phase generating couplers, the phase differences of the outputs of which have wavelength dependence, as the optical multi/demultiplexing devices of the interferometer optical switch, which are the basic component of the present embodiment.

The interferometer optical switch of the present embodiment is configured by connecting two interferometer optical switches 170 and 171 in cascade. More specifically, using the two, the first and second, interferometer optical switches 170 and 171 with the same design values, the first interferometer optical switch 170 has its upper port at the output side connected to the lower port at the input side of the second interferometer optical switch 171. In addition, the first interferometer optical switch 170 has its upper port at the input side used as the input waveguide 101, the second interferometer optical switch 171 has its upper port at the output side used as the output waveguide 103 (first output port), and the first interferometer optical switch 170 has its lower port at the output side used as the output waveguide 104 (second output port).

Since the present embodiment employs the first and second interferometer optical switches 170 and 171 with the same design values, only the first interferometer optical switch 170 will be described in detail. The present embodiment uses as a means for implementing the phase generating coupler 111 or 112 an optical multi/demultiplexing device including N+1 (=2) optical couplers 151 and 152, or 153 and 154, and N (=1) minute optical delay line 132 or 133 between the adjacent optical couplers. As the optical couplers 151 and 152, or 153 and 154, directional couplers each including two optical waveguides placed side by side in close proximity are used. In the present embodiment, the applicable wavelength range is set at 1.45-1.65 µm, and the design parameters are optimized in such a manner that the power coupling ratios of the phase generating couplers 111 and 112 become about 0.5 throughout the wavelength band used, and the phase difference $\Phi(\lambda)$ of the output agrees with the appropriate phase $\Psi(\lambda)$. The optimized design parameters include the power coupling ratios of the optical couplers 151 and 152, and 153 and 154 constituting the phase generating couplers 111 and 112; the optical path length differences of the minute optical delay lines 132 and 133; and the optical path length difference $\Delta L$ of the optical delay line 131 of the Mach-Zehnder interferometer. As a result of numerical calculations, N was set at 1, the power coupling ratios of the directional couplers 151 and 152, and 153 and 154 were set at $r_1=0.2$, $r_2=0.2$, $r_3=0.2$ and $r_4=0.2$, and the optical path length differences of the minute optical delay lines 132 and 133 were set at $\Delta L_1=0.15\cdot\lambda c$ (≈0.23 µm) and $\Delta L_2=0.15\cdot\lambda c$ (=0.23 µm). In addition, the optimum value of the optical path length difference of the optical delay line 131 of the Mach-Zehnder interferometer was set at $\Delta L=0.28\cdot\lambda c$ (≈0.43 µm) to place the interferometer optical switch 170 in the through state in the initial state in which the phase shifters were not driven. To facilitate the operation of the switch as a polarization beam switch, the present embodiment uses different design values for the optical path length differences of the optical delay lines of the Mach-Zehnder interferometers in the first interferometer optical switch 170 and the second interferometer optical switch 171 in the initial state. This will be described in a more detail later. The optical path length difference of the first and second optical waveguides that forms the optical delay line 131 of the first interferometer optical switch 170 is set at $\Delta L'=\Delta L-0.5\lambda c=-0.22\lambda c$ (−0.34 µm), and the optical path length difference of the first and second optical waveguides that forms the optical delay line 134 of the second interferometer optical switch 171 is set at $\Delta L'=\Delta L=0.28\cdot\lambda c$ (≈0.43 µm). The spacing between the two, the first and second, optical waveguides was set at 200 µm. As the phase shifters 141, 142, 143 and 144, a thin film heater was used whose width was 40 µm, and length was 5 mm.

According to the foregoing design values, the silica-based optical waveguide circuit was fabricated by using flame hydrolysis deposition, photolithography technique and reactive ion etching. It was fabricated such that the relative refractive index of the optical waveguides was 0.75% and the core cross section of the optical waveguides was 6×6 µm².

After the silica-based optical waveguide circuit was fabricated, the birefringent index of the first optical waveguide of the optical delay line 131 of the first interferometer optical switch 170 was adjusted by the birefringent index adjusting means 191 so that the optical path length difference of the TM mode became longer than the optical path length difference of the TE mode by 0.5λc. More specifically, since the optical path length differences of the TE mode and TM mode after the birefringent index adjustment were $\Delta nL_{TE}=\Delta nL$ and $\Delta nL_{TM}=\Delta nL+0.5\lambda c$, respectively, the difference was $\Delta nL_{TM}-\Delta nL_{TE}=0.5\lambda c$. Thus, under the assumption that the optical path length differences of the TE mode and TM mode in the initial state were $\Delta L'_{TE}=\Delta L'$ and $\Delta L'_{TM}=\Delta L'$, the birefringent index adjustment provided $\Delta L'_{TE}=\Delta L'+\Delta nL$ and $\Delta L'_{TM}=\Delta L'+\Delta nL+0.5\lambda c$. In the process of the birefringent index adjustment, the optical path length of the first optical waveguide became longer than that of the initial state by $\Delta nL$. Considering this, the optical path length difference of the second optical waveguide was lengthened by $\Delta nL$ by adjusting the effective refractive index of the second optical waveguide. Thus, the optical path length differences of the TE mode and TM mode were made $\Delta L'_{TE}=\Delta L'$ (=−0.22λc) and $\Delta L'_{TM}=\Delta L'+0.5\lambda c$ (=0.28λc), respectively.

Next, the birefringent index of the second optical waveguide of the optical delay line 134 of the second interferometer optical switch 171 was adjusted by the birefringent index adjusting means 194 so that the optical path length difference of the TM mode became longer than the optical path length difference of the TE mode by 0.5λc. More specifically, since the optical path length differences of the TE mode and TM mode after the birefringent index adjustment were $\Delta nL_{TE}=\Delta nL$ and $\Delta nL_{TM}=\Delta nL+0.5\lambda c$, respectively, the difference was $\Delta nL_{TM}-\Delta nL_{TE}=0.5\lambda c$. Thus, under the assumption that the optical path length differences of the TE mode and TM mode in the initial state were $\Delta L''_{TE}=\Delta L''$ and $\Delta L''_{TM}=\Delta L''$, the birefringent index adjustment provided $\Delta L''_{TE}=\Delta L''-\Delta nL$ and $\Delta L''_{TM}=\Delta L''-\Delta nL-0.5\lambda c$. Here, the signs were made negative because the path length difference is represented in terms of the relative optical path length of the first optical waveguide with respect to that of the second optical waveguide. In the process of the birefringent index adjustment, the optical path length of the second optical waveguide became longer than that of the initial state by $\Delta nL$. Considering this, the optical path length difference of the first optical waveguide was lengthened by $\Delta nL$ by adjusting the effective refractive index of the first optical waveguide. Thus, the optical path length differences of the TE mode and TM mode were made $\Delta L''_{TE}=\Delta L''$ ($=0.28\lambda c$) and $\Delta L''_{TM}=\Delta L''-0.5\lambda c$ ($=-0.22\lambda c$), respectively.

As the birefringent index adjustment means 191-194, there are many means known such as a method of using light irradiation like laser irradiation, a method of using a thin film heater, a method of mounting a stress-applying film, a method of varying the geometry of the waveguides, and a method of locally varying the material of the waveguides, and any desired means can be used.

A chip on which the interferometer optical switch was formed was diced, a heatsink (not shown) was disposed under the silicon substrate 161, single mode fibers (not shown) were connected to the input/output waveguides 101-104, and feeder leads (not shown) were connected to the thin film heaters 141, thereby forming a two-input, two-output optical switch module.

Next, the switching operation will be described in the case where light is input via the input waveguide 101 of the optical switch module fabricated, and the polarization output from the output waveguide 103 (first output port) and 104 (second output port) is switched. In the initial OFF state, the optical path length differences of the optical delay lines of the first interferometer optical switch 170 are $\Delta L'_{TE}=\Delta L'$ ($=-0.22\lambda c$) for the TE mode, and $\Delta L'_{TM}=\Delta L'+0.5\lambda c$ ($=0.28\lambda c$) for the TM mode, while the optical path length differences of the optical delay lines of the second interferometer optical switch 171 are $\Delta L''_{TE}=\Delta L''$ ($=0.28\cdot\lambda c$) for the TE mode, and $\Delta L''_{TM}=\Delta L''-0.5\lambda c$ ($=-0.22\lambda c$) for the TM mode.

For the TE mode in the OFF state, the first interferometer optical switch 170 is in the cross state, and the second interferometer optical switch 171 is in the bar state. FIG. 32A illustrates the wavelength dependence of the transmittance of the TE mode in the OFF state of the interferometer optical switch of the present embodiment. The TE mode input via the input waveguide 101 is completely transmitted through the cross port of the interferometer optical switch 170, and is output from the output waveguide 104 (second output port). On the other hand, since it is cut off by the through port of the interferometer optical switch 170 and the cross port of the interferometer optical switch 171, the TE mode is not output from the output waveguide 103 (first output port).

For the TM mode in the OFF state, the first interferometer optical switch 170 is in the bar state, and the second interferometer optical switch 171 is in the cross state. FIG. 32B illustrates the wavelength dependence of the transmittance of the TM mode in the OFF state. The TM mode input via the input waveguide 101 is transmitted through the through port of the interferometer optical switch 170 and the cross port of the interferometer optical switch 171, and is output from the output waveguide 103 (first output port). On the other hand, since it is cut off by the cross port of the interferometer optical switch 170, the TM mode is not output from the output waveguide 104 (second output port).

Next, by providing electric power, the thin film heaters 141 and 143 are brought into the ON state. The optical path length difference of the optical delay line 131 of the first interferometer optical switch 170 is $\Delta L'_{TE}=\Delta L'+0.5\lambda c$ ($=0.28\lambda c$) for the TE mode, and $\Delta L'_{TM}=\Delta L'+1.0\lambda c$ ($=0.78\lambda c$) for the TM mode, while the optical path length difference of the optical delay line 134 of the second interferometer optical switch 171 is $\Delta L''_{TE}=\Delta L''+0.5\lambda c$ ($=0.78\cdot\lambda c$) for the TE mode, and $\Delta L''_{TM}=\Delta L''$ ($=0.28\lambda c$) for the TM mode.

Figure 33A:
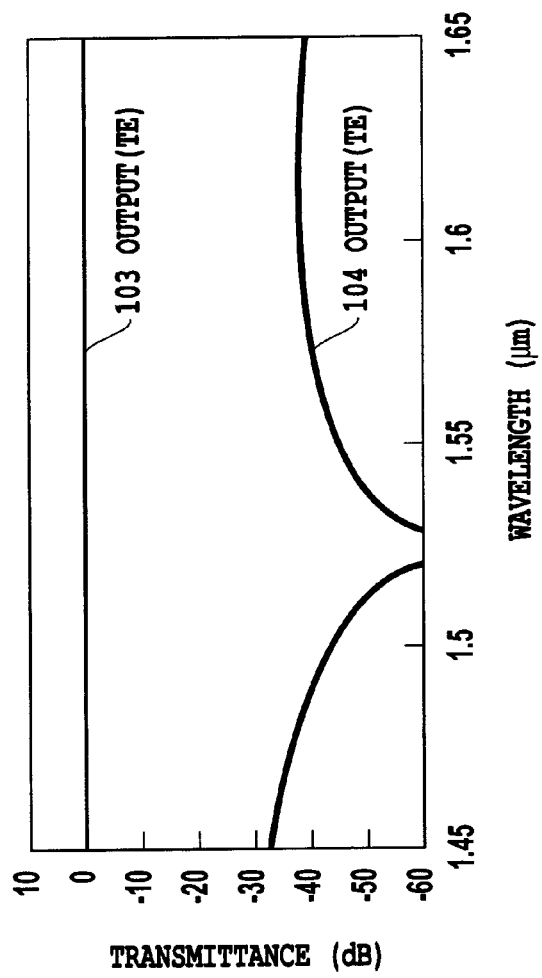
FIG. 33A is a graph illustrating the wavelength dependence of the transmittance of the TE mode in the ON state of the interferometer optical switch of the ninth embodiment in accordance with the present invention.

For the TE mode in the ON state, the first interferometer optical switch 170 is in the bar state, and the second interferometer optical switch 171 is in the cross state. FIG. 33A illustrates the wavelength dependence of the transmittance of the TE mode in the ON state of the interferometer optical switch of the present embodiment. The TE mode input via the input waveguide 101 is transmitted through the through port of the interferometer optical switch 170 and the cross port of the interferometer optical switch 171, and is output from the output waveguide 103 (first output port). On the other hand, since it is cut off by the cross port of the interferometer optical switch 170, the TE mode is not output from the output waveguide 104 (second output port).

Figure 33B:
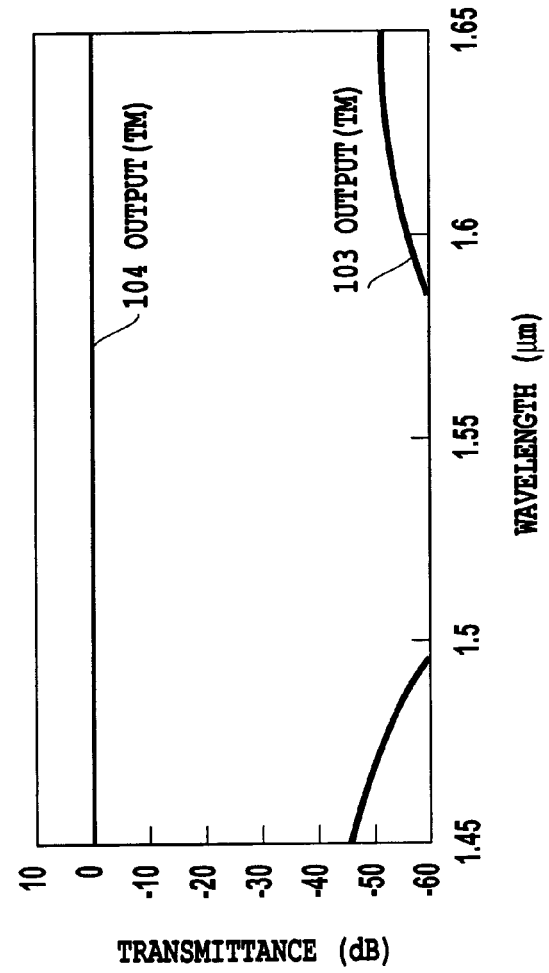
FIG. 33B is a graph illustrating the wavelength dependence of the transmittance of the TM mode in the ON state of the interferometer optical switch of the ninth embodiment in accordance with the present invention.

For the TM mode in the ON state, the first interferometer optical switch 170 is in the cross state, and the second interferometer optical switch 171 is in the bar state. FIG. 33B illustrates the wavelength dependence of the transmittance of the TM mode in the ON state. The TM mode input via the input waveguide 101 is completely transmitted through the cross port of the interferometer optical switch 170, and is output from the output waveguide 104 (second output port). On the other hand, since it is cut off by the through port of the interferometer optical switch 170 and the cross port of the interferometer optical switch 171, the TM mode is not output from the output waveguide 103 (first output port).

As described above, the present embodiment is an example that carries out the birefringent index adjustment of the interferometer optical switch having equipped with phase generating couplers, the phase differences of the outputs of which have wavelength dependence. As described in the present embodiment, the switch can be operated as polarization beam switch by setting the difference of the optical path length difference between the TE mode and TM mode of the Mach-Zender interferometer delay line at a half wavelength. It is obvious that the present embodiment can take other forms. In addition, the birefringent index adjustment can be used to implement an interferometer optical switch with small polarization dependence by setting the optical path length difference of the TE mode and TM mode at a same value.

OTHER EMBODIMENTS

The interferometer optical switches described in the individual embodiments in accordance with the present invention can be used as an optical switch by itself, or can be used as components of a tap switch, a gate switch, a double gate switch or a 1×2 switch by combining a plurality of these optical switches. In addition, by using at least one interferometer optical switch in accordance with the present invention as a basic component, it is possible to configure an N×N matrix switch (see FIG. 34A), a 1×N tree switch (see FIG. 34B), a 1×N tap switch, a DC (Delivery and-Coupling) switch composed of M 1×N switches and N M×1 couplers, or an M×N large scale optical switch such as an ROADM (Reconfigurable OADM) switch. Furthermore, they can be combined with AWG to configure an optical add/drop multiplexing (OADM) circuit, for example, rather than operating them only as an optical switch.

Figure 34A:
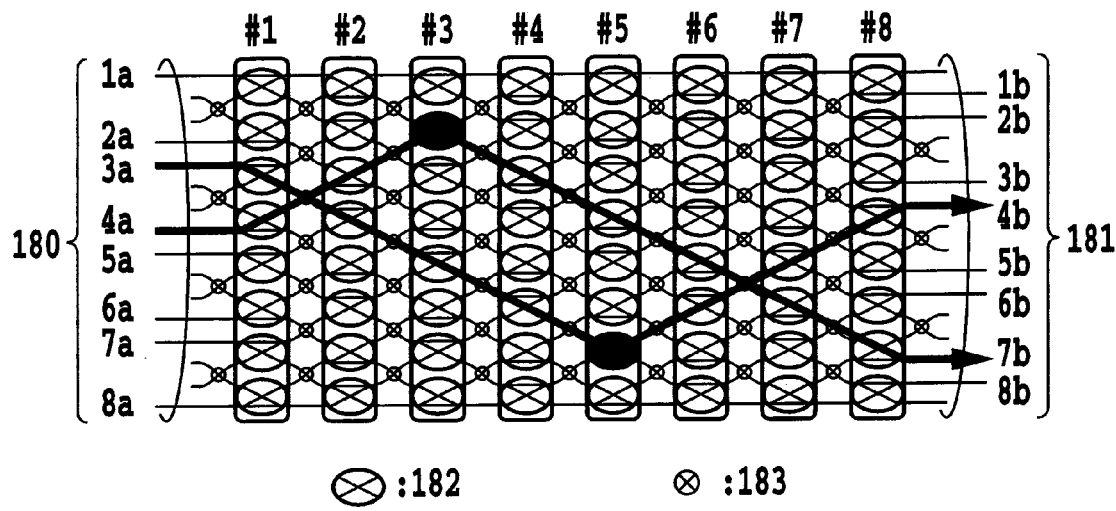
FIG. 34A is a schematic diagram showing a configuration of an N×N switch using the interferometer optical switch in accordance with the present invention.
Figure 34B:
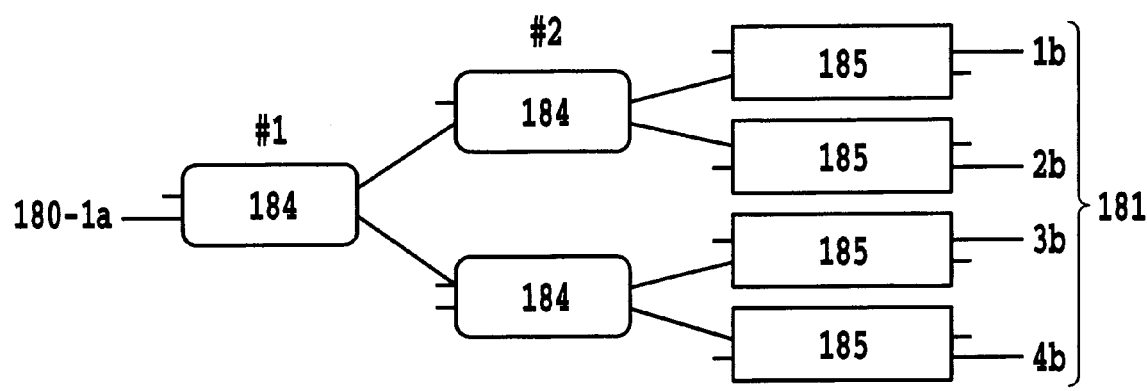
FIG. 34B is a schematic diagram showing a configuration of a 1×N switch using the interferometer optical switch in accordance with the present invention.

In FIG. 34A and FIG. 34B, reference numerals 180-1a-180-8a each designate an input waveguide, and 181-1b-181-8b each designate an output waveguide, and the reference numeral 182 designates a basic component of the optical switch, 183 designates a cross of the basic component of the optical switch, 184 designates a 1×2 switch, and 185 designates a gate switch.

Although the individual embodiments show applications to the interferometer optical switches or variable optical attenuators, including the polarization beam switch, polarization beam splitter and polarization beam coupler, the present invention is applicable to any desired circuits. Furthermore, the interferometer optical switch and variable optical attenuator in accordance with the present invention can be combined to be functioned as a single optical circuit. In addition, although the individual embodiments in accordance with the present invention show examples applied to the Mach-Zehnder interferometer having only one optical delay line, this is not essential. For example, as for a configuration having two or more optical delay lines, a variety of wavelength insensitive optical waveguide circuits can be obtained by applying the same principle. For example, the principle of the present invention is applicable to a variety of optical waveguide circuits such as lattice-form filters, multiple beam interference filters, transversal-form filters, Michelson interferometer filters, Fabry-Perot interferometer filters, and ring resonator filters. Here, the optical path length difference described in the individual embodiments refers to the optical path difference between the optical waveguides constituting the optical delay line. The optical path difference considers the refractive index or birefringent index of the optical waveguides with wavelength dependence. In this way, a variety of wavelength insensitive optical waveguide circuits can be implemented by using the phase difference of the output of the optical multi/demultiplexing device, and by making wavelength insensitive the phase difference caused by the path length difference of the optical delay line. It is obvious that the present invention can eliminate not only the wavelength dependence, but also the frequency dependence.

Figure 35A:
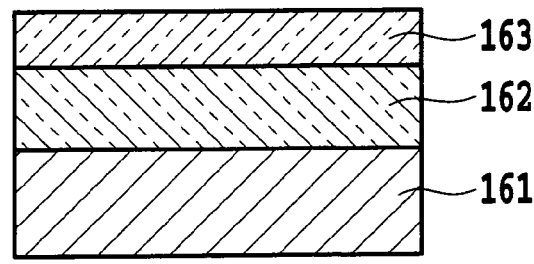
FIGS. 35A-35E are schematic diagrams illustrating fabrication process of an optical waveguide circuit.
Figure 35B:
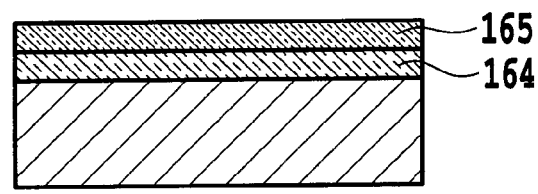
Figure 35C:
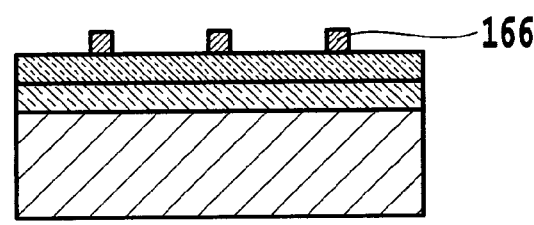
Figure 35D:
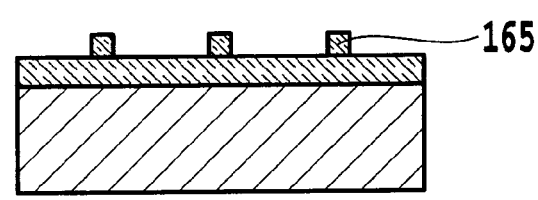
Figure 35E:
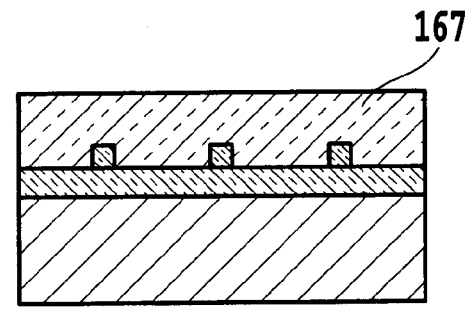

The foregoing embodiments each fabricated the interferometer optical switch and variable optical attenuator through the process as illustrated in FIGS. 35A-35E using silica-based optical waveguides formed on the silicon substrate. More specifically, on a silicon substrate 161, an undercladding glass soot 162 mainly composed of $SiO_2$ and a core glass soot 163 composed of $SiO_2$ doped with $GeO_2$ were deposited by flame hydrolysis deposition (FIG. 35A). Subsequently, they were made to increase the transparency of glass at a high temperature beyond degrees 1000 Celsius. During the process, the glass deposition was carried out so that the undercladding glass layer 164 and the core glass 165 became a designed thickness (FIG. 35B). Subsequently, an etching mask 166 was formed on the core glass 165 using photolithography technique (FIG. 35C), followed by patterning the core glass 165 by reactive ion etching (FIG. 35D). After removing the etching mask 166, an overcladding glass 167 was formed by flame hydrolysis deposition, again. To the overcladding glass 167, dopants such as $B_2O_3$ or $P_2O_5$ were added, and the glass transition temperature was lowered so that the overcladding glass 167 penetrated into the narrow gaps between the core glass 165 and core glass 165 (FIG. 35E). Furthermore, on the surface of the overcladding glass 167, the thin film heaters (not shown) and electric wiring (not shown) were patterned.

Figure 36:
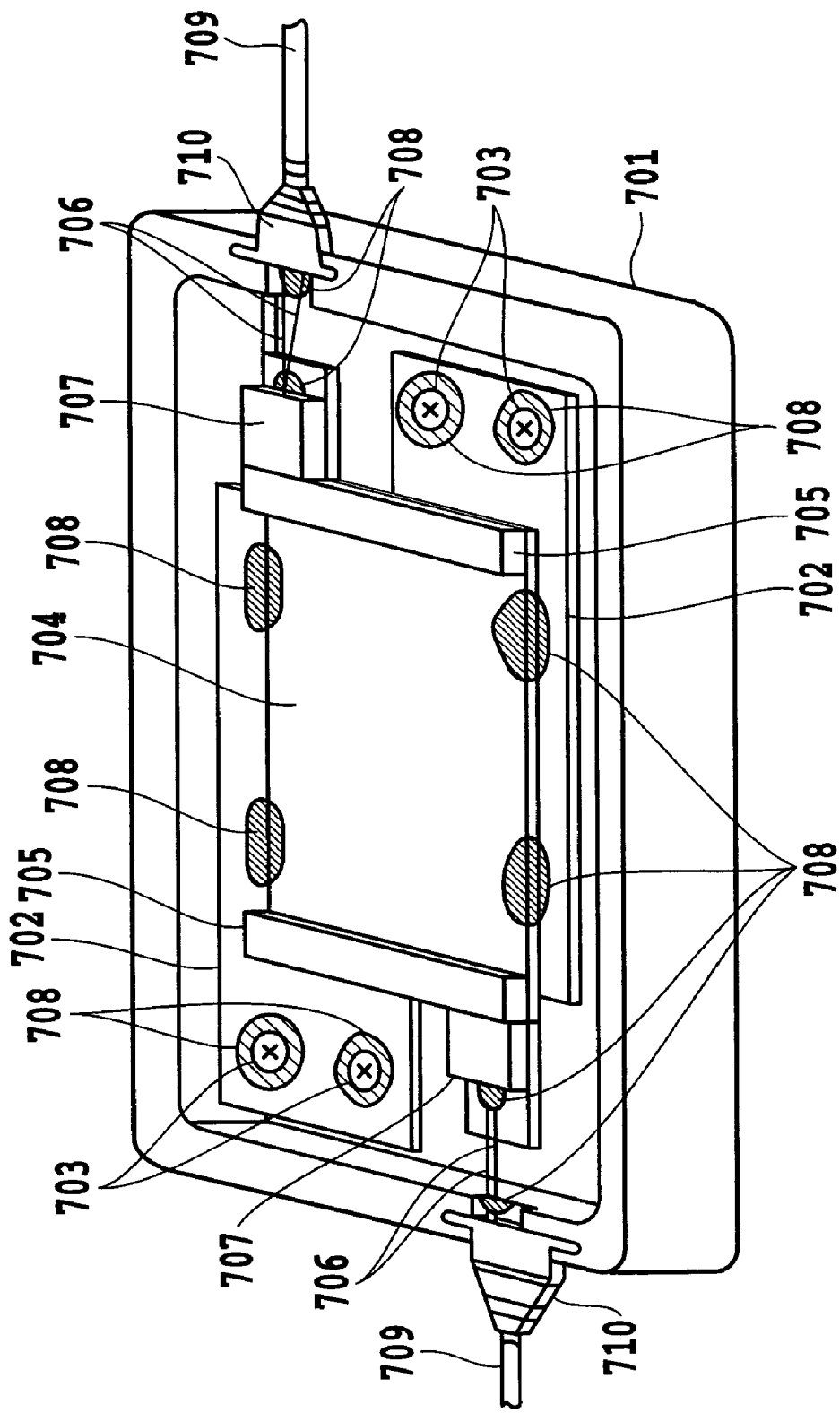
FIG. 36 is a schematic diagram of an optical switch module using the interferometer optical switch in accordance with the present invention.

The optical modules described in the individual embodiments were constructed as follows (see FIG. 36). Specifically, as for the optical module, in a high thermal conductivity module 701, a Peltier holding plate 702 was fixed with mounting screws 703, and a Peltier element and a temperature sensor (thermocouple) (not shown) were disposed close to each other in a concave formed by digging the Peltier holding plate 702. Directly above the Peltier element and temperature sensor, a chip 704 including the interferometer optical switch or variable optical attenuator described in the individual embodiments was disposed. At edges of the chip 704, glass plates 705 were fastened with an adhesive in such a manner that they make optical coupling with fiber blocks 707 holding fibers 706. The fibers 706 were joined to the concaves at edges of the module 701 with adiabatic elastic adhesive 708, and were further held in such a manner that fiber boots 710 having fiber cords 709 were buried in the module 701. The chip 704 is joined to the Peltier holding plate with the adiabatic elastic adhesive 708. Finally, a cover was fit by screws to shield them, thereby assembling the optical module in accordance with the present invention. Here, the cover and the screws are not shown, and it is only an example of a module. In the individual embodiments in accordance with the present invention, although the input waveguide and output waveguide are drawn out from the different edges of the chip, it is obvious that such a circuit layout is also possible in which they are placed on the same edge. In this case, only a single fiber block is enough to connect the input waveguide and output waveguide to the fibers.

The circuit in accordance with the present invention can be fabricated as separate independent chips. In this case, they can be integrated into a single chip by directly interconnecting the chips, or they can be arranged into an optical module by optically coupling the plurality of chips. In addition, it is also possible to fabricate separate optical modules for individual chips, followed by coupling the optical modules through fibers. Furthermore, an optical module can also be fabricated in which two or more chips are held on the Peltier holding plate in a single module.

As for the form of the interferometer optical switch or variable optical attenuator in accordance with the present invention, it does not depend on the types, geometry, materials, refractive index or fabrication method of the optical waveguides. For example, as for the material of the waveguides, it may be polyimide, silicon, semiconductor, $LiNbO_2$ or the like, and the substrate material may be quartz. In addition, the present invention is applicable even when the fabrication method is a spin coating method, a sol-gel method, a sputtering method, a CVD method, an ion diffusion method, or ion beam direct patterning method. Furthermore, although the individual embodiments in accordance with the present invention use square optical waveguides, any desired geometry such as a rectangle, a polygon, a circle can be used. For example, the core width of some part of the optical waveguide can be changed so that its refractive index difference is different from that of the remaining optical waveguide. In addition, the optical waveguide can be provided with a stress to alter the value of the refractive index. Furthermore, although light was transmitted through silica-based optical waveguides in the embodiments described above, light can travel through different materials. For example, the optical waveguide can contain a material such as a silicon resin, or a polyimide wave plate. Besides, a variety of temperature compensation methods or polarization dependence reduction methods can be applied.

In addition by using a light irradiation method such as laser irradiation, or a local heat treatment method with a thin film heater, it is possible to locally vary the refractive index of the optical waveguides in order to adjust the optical path length difference or the coupling characteristics or the phase characteristics of the optical multi/demultiplexing device. Although the thermooptic effect activated by the thin film heater is used for the switching operation, this is not essential. For example, a light irradiation can be used, or the electro-optic effect, or magnetooptic effect can also be used. It is obvious that the geometry of that region is arbitrary.

Furthermore, the interferometer optical switch or variable optical attenuator in accordance with the present invention is not limited to the planar optical waveguides. For example, the optical waveguides may be configured by using stacked optical waveguides or optical fibers, or by combining a plurality of types of optical waveguides such as planar optical waveguides and optical fibers. In addition, a grating can be formed on the optical waveguides. Moreover, optical waveguides can be split or segmented. It is obvious that the interferometer optical switch and variable optical attenuator in accordance with the present invention is not limited to the optical waveguides, but an interference circuit can be constructed with a spatial optical system that propagates light through space. For example, the spatial optical system can be configured by a semi-transparent mirror, a total reflection mirror and a multilayer. By thus using the spatial optical system, same advantages can be achieved as in the case where the circuit is configured with optical waveguides. Furthermore, the interferometer optical switch and variable optical attenuator of the individual embodiments described above are one of the configurations in accordance with the present invention, and the present invention is not limited to these configurations.

The foregoing embodiments use an optical multi/demultiplexing device composed of N+1 optical couplers and N optical delay lines to configure a phase generating coupler, but such a configuration is one of the examples for implementing a phase generating coupler. For example, it is possible to use other filter architectures for optical multi/demultiplexing devices such as a multiple beam interference filter, a transversal-form filter, a Michelson interferometer filter, a Fabry-Perot interferometer filter and a ring resonator filter. Furthermore, as the optical coupler constituting the phase generating coupler, or as the optical multi/demultiplexing device, it is possible to use any desired types such as a multimode interferometer, a variable coupler, an X branching coupler and a Y branching coupler besides the directional coupler described in the individual embodiments in accordance with the present invention, and to use their combinations. Moreover, as for the values and calculation methods of the power coupling ratios of the optical multi/demultiplexing devices, or the values of the path length difference of the optical delay line, they are also one of the examples. It is desirable to design the circuit variables according to the applications. In addition, in the case where the phase generating couplers have a plurality of configuration methods and optimum values, the best form can be selected considering the size, fabrication tolerance, excess loss and the like.

Finally, although the present invention has been described in detail with respect to preferred embodiments and their variations, the embodiments in accordance with the present invention are not limited to those examples. A variety of variations such as replacement, modifications, additions, increase or decrease in the number, changes in the geometry of the components are all included in the embodiments in accordance with the present invention as long as they fall within the scope of the claims.

INDUSTRIAL APPLICABILITY

With the arrival of a multimedia era, implementation of networks that can handle enormous amount of information effectively has become a great problem. To construct networks having a flexible and effective configuration from now on including the replacement of existing copper cables with optical fiber in the access systems interconnecting individual homes with networks via optical fibers, it is essential to adopt optical wavelength division multiplexing (WDM) technique. The optical components have an extensive band of a few terahertz originally, and power networks utilize only very small part of the band. If the wavelength division multiplexing can make the band available by dividing it, networks will be implemented which can increase the capacity and handle diverse information essential for multimedia communication in high volume and with ease.

Recently, the optical cross connect systems and optical add/drop multiplexing systems using the optical switches have been a key device of the WDM technique, and a large demand for them can be expected. The interferometer optical switch and variable optical attenuator in accordance with the present invention are applicable not only in the optical systems, but also as an optical switch element.

The invention claimed is:

1. An interferometer optical switch comprising an optical waveguide circuit including:
    a first optical multi/demultiplexing device;
    an optical delay line including two optical waveguides connected to said first optical multi/demultiplexing device;
    a second optical multi/demultiplexing device connected to said optical delay line;
    one or more input waveguides connected to said first optical multi/demultiplexing device;
    one or more output waveguides connected to said second optical multi/demultiplexing device; and
    a phase shifter installed in said optical delay line, and wherein
    at least one of said first optical multi/demultiplexing device and said second optical multi/demultiplexing device is a phase generating coupler which produces a wavelength-dependent phase difference;
    characterized in that assuming that $\lambda$ is the wavelength, $2\pi\phi_1(\lambda)$ is the phase produced by the first optical multi/demultiplexing device, $2\pi\phi\Delta_L(\lambda)$ is the phase difference of the optical delay line with an optical path length difference of $\Delta L$, and $2\pi\phi_2(\lambda)$ is the phase produced by the second optical multi/demultiplexing device, the sum of the phase difference $2\pi\{\phi_1(\lambda)+\phi\Delta_L(\lambda)+\phi_2(\lambda)\}$ is set at a constant value regardless of wavelength.

2. The interferometer optical switch as claimed in claim 1, wherein the sum of the phase difference $\phi_1(\lambda)$ of the output of said first optical multi/demultiplexing device and the phase difference $\phi_2(\lambda)$ of the output of said second optical multi/demultiplexing device equals $\Delta L/\lambda+m/2$ (m is an integer).

3. The interferometer optical switch as claimed in claim 1, wherein the sum $2\pi\{\phi_1(\lambda)+\phi\Delta_L(\lambda)+\phi_2(\lambda)\}$ of the three phase differences is set at $(2m'+1)\cdot\pi$ (m' is an integer), and the power coupling ratio of said first optical multi/demultiplexing device and the power coupling ratio of said second optical multi/demultiplexing device are made equal throughout an entire wavelength region.

4. The interferometer optical switch as claimed in claim 1, wherein the sum $2\pi\{\phi_1(\lambda)+\phi\Delta_L(\lambda)+\phi_2(\lambda)\}$ of the three phase differences is set at $2m'\cdot\pi$ (m' is an integer), and the sum of the power coupling ratio of said first optical multi/demultiplexing device and the power coupling ratio of said second optical multi/demultiplexing device is made unity.

5. The interferometer optical switch as claimed in claim 1, wherein the sum of the phase difference $2\pi\{\phi_1(\lambda)+\phi\Delta_L(\lambda)+\phi_2(\lambda)\}$ is set such that the output intensity of said optical waveguide circuit becomes uniform with respect to wavelength.

6. The interferometer optical switch as claimed in claim 1, wherein said phase generating coupler is configured by connecting optical couplers and optical delay lines.

7. The interferometer optical switch as claimed in claim 6, wherein the sum of the phase difference $\phi_1(\lambda)$ of the output of said first optical multi/demultiplexing device and the phase difference $\phi_2(\lambda)$ of the output of said second optical multi/demultiplexing device equals $\Delta L/\lambda + m/2$ (m is an integer).

8. The interferometer optical switch as claimed in claim 3, wherein the sum $2\pi\{\phi_1(\lambda)+\phi\Delta_L(\lambda)+\phi_2(\lambda)\}$ of the three phase differences is set at $(2m'+1)\cdot\pi$ (m' is an integer), and the power coupling ratio of said first optical multi/demultiplexing device and the power coupling ratio of said second optical multi/demultiplexing device are made equal.

9. The interferometer optical switch as claimed in claim 6, wherein the sum of the phase difference $2\pi\{\phi_1(\lambda)+\phi\Delta_L(\lambda)+\phi_2(\lambda)\}$ is set such that the output intensity of said optical waveguide circuit becomes uniform with respect to wavelength.

10. The interferometer optical switch as claimed in claim 6, wherein said phase generating coupler comprises N+1 optical couplers (N is a natural number), and N optical delay lines that connects adjacent optical couplers of said N+1 optical couplers.

11. The interferometer optical switch as claimed in claim 10, wherein the sum of the phase difference $\phi_1(\lambda)$ of the output of said first optical multi/demultiplexing device and the phase difference $\phi_2(\lambda)$ of the output of said second optical multi/demultiplexing device equals $\Delta L/\lambda + m/2$ (m is an integer).

12. The interferometer optical switch as claimed in claim 10, wherein the sum $2\pi\{\phi_1(\lambda)+\phi\Delta_L(\lambda)+\phi_2(\lambda)\}$ of the three phase differences is set at $(2m'+1)\cdot\pi$ (m' is an integer), and the power coupling ratio of said first optical multi/demultiplexing device and the power coupling ratio of said second optical multi/demultiplexing device are made equal.

13. The interferometer optical switch as claimed in claim 10, wherein the sum $2\pi\{\phi_1(\lambda)+\phi\Delta_L(\lambda)+\phi_2(\lambda)\}$ of the three phase differences is set at $2m'\cdot\pi$ (m' is an integer), and the sum of the power coupling ratio of said first optical multi/demultiplexing device and the power coupling ratio of said second optical multi/demultiplexing device is made unity.

14. The interferometer optical switch as claimed in claim 10, wherein the sum of the phase difference $2\pi\{\phi_1(\lambda)+\phi\Delta_L(\lambda)+\phi_2(\lambda)\}$ is set such that the output intensity of said optical waveguide circuit becomes uniform with respect to wavelength.

15. The interferometer optical switch as claimed in claim 6, wherein
one of said first optical multi/demultiplexing device and said second optical multi/demultiplexing device is an optical coupler with a phase difference $2\pi\phi_c$ (constant), and the other is a phase generating coupler that is composed of two optical couplers and an optical delay line placed between said two optical couplers, and has a phase difference $2\pi\phi(\lambda)$, and wherein assuming that $\Delta L$ is the optical path length difference of the optical delay line, and m is an integer, then the power coupling ratios of the two optical couplers constituting said phase generating coupler, and the optical path length difference of the optical delay line are set to satisfy $\phi(\lambda)=\Delta L/\lambda + m/2 - \phi_c$.

16. The interferometer optical switch as claimed in claim 15, wherein
assuming that $\lambda$ is the wavelength, $2\pi\phi_1(\lambda)$ is the phase produced by the first optical multi/demultiplexing device, $2\pi\phi_L(\lambda)$ is the phase difference of the optical delay line with an optical path length difference of $\Delta L$, and $2\pi\phi_2(\lambda)$ is the phase produced by the second optical multi/demultiplexing device, the sum $2\pi\{\phi_1(\lambda)+\phi\Delta_L(\lambda)+\phi_2(\lambda)\}$ of the three phase differences is set at $(2m'+1)\cdot\pi$ (m' is an integer), and the power coupling ratio of said first optical multi/demultiplexing device and the power coupling ratio of said second optical multi/demultiplexing device are made equal throughout an entire wavelength region.

17. The interferometer optical switch as claimed in claim 15, wherein
assuming that $\lambda$ is the wavelength, $2\pi\phi_1(\lambda)$ is the phase produced by the first optical multi/demultiplexing device, $2\pi\phi\Delta_L(\lambda)$ is the phase difference of the optical delay line with an optical path length difference of $\Delta L$, and $2\pi\phi_2(\lambda)$ is the phase produced by the second optical multi/demultiplexing device, the sum $2\pi\{\phi_1(\lambda)+\phi\Delta_L(\lambda)+\phi_2(\lambda)\}$ of the three phase differences is set at $2m'\cdot\pi$ (m' is an integer), and the sum of the power coupling ratio of said first optical multi/demultiplexing device and the power coupling ratio of said second optical multi/demultiplexing device is made unity.

18. The interferometer optical switch as claimed in claim 15, wherein the sum of the phase difference $2\pi\{\phi_1(\lambda)+\phi\Delta_L(\lambda)+\phi_2(\lambda)\}$ is set such that the output intensity of said optical waveguide circuit becomes uniform with respect to wavelength.

19. The interferometer optical switch as claimed in claim 6, wherein
said first optical multi/demultiplexing device and said second optical multi/demultiplexing device are both a phase generating coupler comprising two optical couplers and a single optical delay line placed between said two optical couplers, and wherein
power coupling ratios of the two optical couplers and an optical path length difference of the optical delay line that constitutes the first and second optical multi/demultiplexing device are set such that the sum of the phase difference $2\pi\phi_1(\lambda)$ of the output of said first optical multi/demultiplexing device and the phase difference $2\pi\phi_2(\lambda)$ of the output of said second optical multi/demultiplexing device satisfies $\phi_1(\lambda)+\phi_2(\lambda)=\Delta L/\lambda m2$ where $\Delta L$ is the optical path length difference of said optical delay line, and m is an integer.

20. The interferometer optical switch as claimed in claim 19, wherein
assuming that $\lambda$ is the wavelength, $2\pi\phi_1(\lambda)$ is the phase produced by the first optical multi/demultiplexing device, $2\pi\phi\Delta_L(\lambda)$ is the phase difference of the optical delay line with an optical path length difference of $\Delta L$, and $2\pi\phi_2(\lambda)$ is the phase produced by the second optical multi/demultiplexing device, the sum $2\pi\{\phi_1(\lambda)+\phi\Delta_L(\lambda)+\phi_2(\lambda)\}$ of the three phase differences is set at $(2m'+1)\cdot\pi$ (m' is an integer), and the power coupling ratio of said first optical multi/demultiplexing device and the power coupling ratio of said second optical multi/demultiplexing device are made equal throughout an entire wavelength region.

21. The interferometer optical switch as claimed in claim 19, wherein assuming that λ is the wavelength, $2\pi\phi_1(\lambda)$ is the phase produced by the first optical multi/demultiplexing device, $2\pi\phi\Delta_L(\lambda)$ is the phase difference of the optical delay line with an optical path length difference of ΔL, and $2\pi\phi_2(\lambda)$ is the phase produced by the second optical multi/demultiplexing device, the sum $2\pi\{\phi_1(\lambda)+\phi\Delta_L(\lambda)\}$ of the three phase differences is set at 2m'·π (m' is an integer), and the sum of the power coupling ratio of said first optical multi/demultiplexing device and the power coupling ratio of said second optical multi/demultiplexing device is made unity.

22. The interferometer optical switch as claimed in claim 19, the sum of the phase difference $2\pi\{\phi_1(\lambda)+\phi\Delta_L(\lambda)+\phi_2(\lambda)\}$ is set such that the output intensity of said optical waveguide circuit becomes uniform with respect to wavelength.

23. The interferometer optical switch as claimed in claim 6, wherein said first optical multi/demultiplexing device and said second optical multi/demultiplexing device are both a phase generating coupler comprising N+1 optical couplers (N is a natural number), and N optical delay lines each of which is composed of a first and second optical waveguides, and which connects adjacent optical couplers of the N+1 optical couplers, and wherein the sum of the optical path length satisfies either ($\Sigma l_{1,1} > \Sigma l_{2,1}$, and $\Sigma l_{1,2} > \Sigma l_{2,2}$), or ($\Sigma l_{2,1} > \Sigma l_{1,1}$ and $\Sigma l_{2,2} > \Sigma l_{1,2}$), where $\Sigma l_{1,1}$ is the sum of optical path lengths of the first optical waveguide constituting the N optical delay lines of said first optical multi/demultiplexing device, $\Sigma l_{2,1}$ is the sum of optical path of the second optical waveguide, $\Sigma l_{1,2}$ is the sum of optical path lengths of the first optical waveguide constituting the N optical delay lines of said second optical multi/demultiplexing device, and $\Sigma l_{2,2}$ is the sum of optical path lengths of the second optical waveguides constituting the N optical delay lines of said second optical multi/demultiplexing device.

24. The interferometer optical switch as claimed in claim 23, wherein the sum of the phase difference $\phi_1(\lambda)$ of the output of said first optical multi/demultiplexing device and the phase difference $\phi_2(\lambda)$ of the output of said second optical multi/demultiplexing device equals ΔL/λ+m/2 (m is an integer).

25. The interferometer optical switch as claimed in claim 23, wherein the sum $2\pi\{\phi_1(\lambda)+\phi\Delta_L(\lambda)+\phi_2(\lambda)\}$ of the three phase differences is set at (2m'+1)·π(m' is an integer), and the power coupling ratio of said first optical multi/demultiplexing device and the power coupling ratio of said second optical multi/demultiplexing device are made equal.

26. The interferometer optical switch as claimed in claim 23, wherein the sum $2\pi\{\phi_1(\lambda)+\phi\Delta_L(\lambda)+\phi_2(\lambda)\}$ of the three phase differences is set at 2m'·π (m' is an integer), and the sum of the power coupling ratio of said first optical multiplexing device and the power coupling ratio of said second optical multi/demultiplexing device is made unity.

27. The interferometer optical switch as claimed in claim 23, the sum of the phase difference $2\pi\{\phi_1(\lambda)+\phi\Delta_L(\lambda)+\phi_2(\lambda)\}$ is set such that the output intensity of said optical waveguide circuit becomes uniform with respect to wavelength.

28. The interferometer optical switch as claimed in claim 23, wherein the power coupling ratios of the N+1 optical couplers of said first optical multi/demultiplexing device are made equal to the power coupling ratios of the N+1 optical couplers of said second optical multi/demultiplexing device.

29. The interferometer optical switch as claimed in claim 28, wherein the sum of the phase difference $\phi_1(\lambda)$ of the output of said first optical multi/demultiplexing device and the phase difference $\phi_2(\lambda)$ of the output of said second optical multi/demultiplexing device equals ΔL/λ+m/2 (m is an integer), wherein assuming that λ is the wavelength, $2\pi\phi_1(\lambda)$ is the phase produced by the first optical multi/demultiplexing device, $2\pi\phi\Delta_L(\lambda)$ is the phase difference of the optical delay line with an optical path length difference of ΔL, and $2\pi\phi_2(\lambda)$ is the phase produced by the second optical multi/demultiplexing device, the sum of the phase difference $2\pi\{\phi_1(\lambda)+\phi\Delta_L(\lambda)+\phi_2(\lambda)\}$ becomes wavelength insensitive, and wherein the sum $2\pi\{\phi_1(\lambda)+\phi\Delta_L(\lambda)+\phi_2(\lambda)\}$ of the three phase differences is set at (2m'+1)·π (m' is an integer), and the power coupling ratio of said first optical multi/demultiplexing device and the power coupling ratio of said second optical multi/demultiplexing device are made equal throughout an entire wavelength region.

30. The interferometer optical switch as claimed in claim 28, wherein the sum of the phase difference $\phi_1(\lambda)$ of the output of said first optical multi/demultiplexing device and the phase difference $\phi_2(\lambda)$ of the output of said second optical multi/demultiplexing device equals ΔL/λ+m/2 (m is an integer); wherein assuming that λ is the wavelength, $2\pi\phi_1(\lambda)$ is the phase produced by the first optical multi/demultiplexing device, $2\pi\phi\Delta_L(\lambda)$ is the phase difference of the optical delay line with an optical path length difference of ΔL, and $2\pi\phi_2(\lambda)$ is the phase produced by the second optical multi/demultiplexing device, the sum of the phase difference $2\pi\{\phi_1(\lambda)+\phi\Delta_L(\lambda)+\phi_2(\lambda)\}$ becomes wavelength insensitive, and wherein the sum $2\pi\{\phi_1(\lambda)+\phi\Delta_L(\lambda)+\phi_2(\lambda)\}$ of the three phase differences is set at 2m'·π (m' is an integer), and the sum of the power coupling ratio of said first optical multi/demultiplexing device and the power coupling ratio of said second optical multi/demultiplexing device is made unity.

31. The interferometer optical switch as claimed in claim 28, wherein assuming that optical wavelength is λ, a phase difference between light output from said first optical multi/demultiplexing device is $2\pi\phi_1(\lambda)$, a phase difference caused by an optical path length difference ΔL of said optical delay line is $2\pi\phi\Delta_L(\lambda)$, and a phase difference between light output from said second optical multi/demultiplexing device is $2\pi\phi_2(\lambda)$, then the sum $2\pi\{\phi_1(\lambda)+\phi\Delta_L(\lambda)+\phi_2(\lambda)\}$ of the three phase differences is set such that output intensity of said optical waveguide circuit becomes constant for the wavelength λ.

32. The interferometer optical switch as claimed in claim 6, wherein said first optical multi/demultiplexing device and said second optical multi/demultiplexing device each consist of a phase generating coupler including N+1 optical couplers (N is a natural number), and N optical delay lines sandwiched between adjacent said optical couplers of said N+1 optical couplers, and wherein the power coupling ratios of the N+1 optical couplers of said first optical multi/demultiplexing device are made equal to the power coupling ratios of the N+1 optical couplers of said second optical multi/ demultiplexing device.

33. The interferometer optical switch as claimed in claim 32, wherein the sum of the phase difference $\phi_1(\lambda)$ of the output of said first optical multi/demultiplexing device and the phase difference $\phi_2(\lambda)$ of the output of said second optical multi/demultiplexing device equals ΔL/λ+m/2 (m is an integer).

34. The interferometer optical switch as claimed in claim 32, wherein the sum $2\pi\{\phi_1(\lambda)+\phi\Delta_L(\lambda)+\phi_2(\lambda)\}$ of the three phase differences is set at $(2m'+1)\cdot\pi$ (m' is an integer), and the power coupling ratio of said first optical multi/demultiplexing device and the power coupling ratio of said second optical multi/demultiplexing device are made equal.

35. The interferometer optical switch as claimed in claim 32, wherein the sum $2\pi\{\phi_1(\lambda)+\phi\Delta_L(\lambda)+\phi_2(\lambda)\}$ of the three phase differences is set at $2m'\cdot\pi$ (m' is an integer), and the sum of the power coupling ratio of said first optical multi/demultiplexing device and the power coupling ratio of said second optical multi/demultiplexing device is made unity.

36. The interferometer optical switch as claimed in claim 32, wherein the sum of the phase difference $2\pi\{\phi_1(\lambda)+\phi\Delta_L(\lambda)+\phi_2(\lambda)\}$ is set such that the output intensity of said optical waveguide circuit becomes uniform with respect to wavelength.

37. A variable optical attenuator that uses the interferometer optical switch as defined in claim 1 wherein, the output intensity is varied.

38. The variable optical attenuator as claimed in claim 37, wherein assuming that $\lambda$ is the wavelength, $2\pi\phi_1(\lambda)$ is the phase produced by the first optical multi/demultiplexing device, $2\pi\phi\Delta_L(\lambda)$ is the phase difference of the optical delay line with an optical path length difference of $\Delta L$, and $2\pi\phi_2(\lambda)$ is the phase produced by the second optical multi/demultiplexing device, the phase produced by the first and second optical multi/demultiplexing device and the optical path length difference $\Delta L$ is set such that the sum of the phase difference $2\pi\{\phi_1(\lambda)+\phi\Delta_L(\lambda)+\phi_2(\lambda)\}$ becomes wavelength insensitive.

39. The variable optical attenuator as claimed in claim 38, wherein the sum of the phase difference $\phi_1(\lambda)$ of the output of said first optical multi/demultiplexing device and the phase difference $\phi_2(\lambda)$ of the output of said second optical multi/demultiplexing device equals $\Delta L/\lambda + m/2$ (m is an integer).

40. The variable optical attenuator as claimed in claim 38, wherein the sum $2\pi\{\phi_1(\lambda)+\phi\Delta_L(\lambda)+\phi_2(\lambda)\}$ of the three phase differences is set at $(2m'+1)\cdot\pi$ (m' is an integer), and the power coupling ratio of said first optical multi/demultiplexing device and the power coupling ratio of said second optical multi/demultiplexing device are made equal throughout an entire wavelength region.

41. The variable optical attenuator as claimed in claim 38, wherein the sum $2\pi\{\phi_1(\lambda)+\phi\Delta_L(\lambda)+\phi_2(\lambda)\}$ of the three phase differences is set at $2m'\cdot\pi$ (m' is an integer), and the sum of the power coupling ratio of said first optical multi/demultiplexing device and the power coupling ratio of said second optical multi/demultiplexing device is made unity.

42. The variable optical attenuator as claimed in claim 37, wherein assuming that $\lambda$ is the wavelength, $2\pi\phi_1(\lambda)$ is the phase produced by the first optical multi/demultiplexing device, $2\pi\phi\Delta_L(\lambda)$ is the phase difference of the optical delay line with an optical path length difference of $\Delta L$, and $2\pi\phi_2(\lambda)$ is the phase produced by the second optical multi/demultiplexing device, the sum of the phase difference $2\pi\{\phi_1(\lambda)+\phi\Delta_L(\lambda)+\phi_2(\lambda)\}$ is set such that the output intensity of said optical waveguide circuit becomes uniform with respect to wavelength.

43. The variable optical attenuator as claimed in claim 37, wherein said phase generating coupler is configured by connecting optical couplers and optical delay lines.

44. The variable optical attenuator as claimed in claim 43, wherein assuming that $\lambda$ is the wavelength, $2\pi\phi_1(\lambda)$ is the phase produced by the first optical multi/demultiplexing device, $2\pi\phi\Delta_L(\lambda)$ is the phase difference of the optical delay line with an optical path length difference of $\Delta L$, and $2\pi\phi_2(\lambda)$ is the phase produced by the second optical multi/demultiplexing device, the phase produced by the first and second optical multi/demultiplexing device and the optical path length difference $\Delta L$ is set such that the sum of the phase difference $2\pi\{\phi_1(\lambda)+\phi\Delta_L(\lambda)+\phi_2(\lambda)\}$ becomes wavelength insensitive.

45. The variable optical attenuator as claimed in claim 44, wherein the sum of the phase difference $\phi_1(\lambda)$ of the output of said first optical multi/demultiplexing device and the phase difference $\phi_2(\lambda)$ of the output of said second optical multi/demultiplexing device equals $\Delta L/\lambda + m/2$ (m is an integer).

46. The variable optical attenuator as claimed in claim 44, wherein the sum $2\pi\{\phi_1(\lambda)+\phi\Delta_L(\lambda)+\phi_2(\lambda)\}$ of the three phase differences is set at $(2m'+1)\cdot\pi$ (m' is an integer), and the power coupling ratio of said first optical multi/demultiplexing device and the power coupling ratio of said second optical multi/demultiplexing device are made equal.

47. The variable optical attenuator as claimed in claim 44, wherein the sum $2\pi\{\phi_1(\lambda)+\phi\Delta_L(\lambda)+\phi_2(\lambda)\}$ of the three phase differences is set at $2m'\cdot\pi$ (m' is an integer), and the sum of the power coupling ratio of said first optical multi/demultiplexing device and the power coupling ratio of said second optical multi/demultiplexing device is made unity.

48. The variable optical attenuator as claimed in claim 43, wherein assuming that $\lambda$ is the wavelength, $2\pi\phi_1(\lambda)$ is the phase produced by the first optical multi/demultiplexing device, $2\pi\phi\Delta_L(\lambda)$ is the phase difference of the optical delay line with an optical path length difference of $\Delta L$, and $2\pi\phi_2(\lambda)$ is the phase produced by the second optical multi/demultiplexing device, the sum of the phase difference $2\pi\{\phi_1(\lambda+\phi\Delta_L(\lambda)+\phi_2(\lambda)\}$ is set such that the output intensity of said optical waveguide circuit becomes uniform with respect to wavelength.

49. The variable optical attenuator as claimed in claim 43, wherein said phase generating coupler comprises N+1 optical couplers (N is a natural number), and N optical delay lines that connects adjacent optical couplers of said N+1 optical couplers.

50. The variable optical attenuator as claimed in claim 49, wherein assuming that $\lambda$ is the wavelength, $2\pi\phi_2(\lambda)$ is the phase produced by the first optical multi/demultiplexing device, $2\pi\phi\Delta_L(\lambda)$ is the phase difference of the optical delay line with an optical path length difference of $\Delta L$, and $2\pi\phi_2(\lambda)$ is the phase produced by the second optical multi/demultiplexing device, the phase produced by the first and second optical multi/demultiplexing device and the optical path length difference $\Delta L$ is set such that the sum of the phase difference $2\pi\{\phi_1(\lambda)+\phi\Delta_L(\lambda)+\phi_2(\lambda)\}$ becomes wavelength insensitive.

51. The variable optical attenuator as claimed in claim 50, wherein the sum of the phase difference $\phi_1(\lambda)$ of the output of said first optical multi/demultiplexing device and the phase difference $\phi_2(\lambda)$ of the output of said second optical multi/demultiplexing device equals $\Delta L/\lambda +$ (m is an integer).

52. The variable optical attenuator as claimed in claim 50, wherein the sum $2\pi\{\phi_1(\lambda)+\phi\Delta_L(\lambda)+\phi_2(\lambda)\}$ of the three phase differences is set at $(2m'+1)\cdot\pi$ (m' is an integer), and the power coupling ratio of said first optical multi/demultiplexing device and the power coupling ratio of said second optical multi/demultiplexing device are made equal.

53. The variable optical attenuator as claimed in claim 50, wherein the sum $2\pi\{\phi_1(\lambda)+\phi\Delta_L(\lambda)+\phi_2(\lambda)\}$ of the three phase differences is set at $2m'\cdot\pi$ (m' is an integer), and the sum of the power coupling ratio of said first optical multi/demultiplexing device and the power coupling ratio of said second optical multi/demultiplexing device is made unity.

54. The variable optical attenuator as claimed in claim 49, wherein assuming that $\lambda$ is the wavelength, $2\pi\phi_1(\lambda)$ is the phase produced by the first optical multi/demultiplexing device, $2\pi\phi\Delta_L(\lambda)$ is the phase difference of the optical delay line with an optical path length difference of $\Delta L$, and $2\pi\phi_2(\lambda)$ is the phase produced by the second optical multi/demultiplexing device, the sum of the phase difference $2\pi\{\phi_1(\lambda)+\phi\Delta_L(\lambda)+\phi_2(\lambda)\}$ is set such that the output intensity of said optical waveguide circuit becomes uniform with respect to wavelength.

55. The variable optical attenuator as claimed in claim 43, wherein one of said first optical multi/demultiplexing device and said second optical multi/demultiplexing device is an optical coupler with a phase difference $2\pi\phi_c$ (constant), and the other is a phase generating coupler that is composed of two optical couplers and an optical delay line placed between said two optical couplers, and has a phase difference $2\pi\phi(\lambda)$, and wherein assuming that $\Delta L$ is the optical path length difference of the optical delay line, and m is an integer, then the power coupling ratios of the two optical couplers constituting said phase generating coupler, and the optical path length difference of the optical delay line are set to satisfy $\phi(\lambda)=\Delta L/\lambda+m/2-\phi_c$.

56. The variable optical attenuator as claimed in claim 55, wherein assuming that $\lambda$ is the wavelength, $2\pi\phi_2(\lambda)$ is the phase produced by the first optical multi/demultiplexing device, $2\pi\phi\Delta_L(\lambda)$ is the phase difference of the optical delay line with an optical path length difference of $\Delta L$, and $2\pi\phi_2(\lambda)$ is the phase produced by the second optical multi/demultiplexing device and the optical path length difference $\Delta L$ is set such that the sum of the phase difference $2\pi\{\phi_1(\lambda)+\phi\Delta_L(\lambda)+\phi_2(\lambda)\}$ becomes wavelength insensitive, and wherein the sum $2\pi\{\phi_1(\lambda)+\phi\Delta_L(\lambda)+\phi_2(\lambda)\}$ of the three phase differences is set at $(2m'+1)\cdot\pi$(m' is an integer), and the power coupling ratio of said first optical multi/demultiplexing device and the power coupling ratio of said second optical multi/demultiplexing device are made equal throughout an entire wavelength region.

57. The variable optical attenuator as claimed in claim 55, wherein assuming that $\lambda$ is the wavelength, $2\pi\phi_1(\lambda)$ is the phase produced by the first optical multi/demultiplexing device, $2\pi\phi\Delta_L(\lambda)$ is the phase difference of the optical delay line with an optical path length difference of $\Delta L$, and $2\pi\phi_2(\lambda)$ is the phase produced by the second optical multi/demultiplexing device and the optical path length difference $\Delta L$ is set such that the sum of the phase difference $2\pi\{\phi_1(\lambda)+\phi\Delta_L(\lambda)+\phi_2(\lambda)\}$ becomes wavelength insensitive, and wherein the sum $2\pi\{\phi_1(\lambda)+\phi\Delta_L(\lambda)+\phi_2(\lambda)\}$ of the three phase differences is set at $2m'\cdot\pi$ (m' is an integer), and the sum of the power coupling ratio of said first optical multi/demultiplexing device and the power coupling ratio of said second optical multi/demultiplexing device is made unity.

58. The variable optical attenuator as claimed in claim 55, wherein assuming that $\lambda$ is the wavelength, $2\pi\phi_1(\lambda)$ is the phase produced by the first optical multi/demultiplexing device, $2\pi\phi\Delta_L(\lambda)$ is the phase difference of the optical delay line with an optical path length difference of $\Delta L$, and $2\pi\phi_2(\lambda)$ is the phase produced by the second optical multi/demultiplexing device, the sum of the phase difference $2\pi\{\phi_1(\lambda)+\phi\Delta_L(\lambda)+\phi_2(\lambda)\}$ is set such that the output intensity of said optical waveguide circuit becomes uniform with respect to wavelength.

59. The variable optical attenuator as claimed in claim 43, wherein said first optical multi/demultiplexing device and said second optical multi/demultiplexing device are both a phase generating coupler comprising two optical couplers and a single optical delay line placed between said two optical couplers, and wherein power coupling ratios of the two optical couplers and an optical path length difference of the optical delay line that constitutes the first and second optical multi/demultiplexing device are set such that the sum of the phase difference $2\pi\phi_1(\lambda)$ of the output of said first optical multi/demultiplexing device and the phase difference $2\pi\phi_2(\lambda)$ of the output of said second optical multi/demultiplexing device satisfies $\phi_1(\lambda)+\phi_2(\lambda)=\Delta L/\lambda+m/2$ where $\Delta L$ is the optical path length difference of said optical delay line, and m is an integer.

60. The variable optical attenuator as claimed in claim 59, wherein assuming that $\lambda$ is the wavelength, $2\pi\phi_1(\lambda)$ is the phase produced by the first optical multi/demultiplexing device, $2\pi\phi\Delta_L(\lambda)$ is the phase difference of the optical delay line with an optical path length difference of $\Delta L$, and $2\pi\phi_2(\lambda)$ is the phase produced by the second optical multi/demultiplexing device and the optical path length difference $\Delta L$ is set such that the sum of the phase difference $2\pi\{\phi_1(\lambda)+\phi\Delta_L(\lambda)+\phi_2(\lambda)\}$ becomes wavelength insensitive, and wherein the sum $2\pi\{\phi_1(\lambda)+\phi\Delta_L(\lambda)+\phi_2(\lambda)\}$ of the three phase differences is set at $(2m'+1)\cdot\pi$(m' is an integer), and the power coupling ratio of said first optical multi/demultiplexing device and the power coupling ratio of said second optical multi/demultiplexing device are made equal throughout an entire wavelength region.

61. The variable optical attenuator as claimed in claim 59, wherein assuming that $\lambda$ is the wavelength, $2\pi\phi_1(\lambda)$ is the phase produced by the first optical multi/demultiplexing device, $2\pi\phi\Delta_L(\lambda)$ is the phase difference of the optical delay line with an optical path length difference of $\Delta L$, and $2\pi\phi_2(\lambda)$ is the phase produced by the second optical multi/demultiplexing device and the optical path length difference $\Delta L$ is set such that the sum of the phase difference $2\pi\{\phi_1(\lambda)+\phi\Delta_L(\lambda)+\phi_2(\lambda)\}$ becomes wavelength insensitive, the sum $2\pi\{\phi_1(\lambda)+\phi\Delta_L(\lambda)+\phi_2(\lambda)\}$ of the three phase differences is set at $2m'\cdot\pi$(m' is an integer), and the sum of the power coupling ratio of said first optical multi/demultiplexing device and the power coupling ratio of said second optical multi/demultiplexing device is made unity.

62. The variable optical attenuator as claimed in claim 59, wherein assuming that $\lambda$ is the wavelength, $2\pi\phi_1(\lambda)$ is the phase produced by the first optical multi/demultiplexing device, $2\pi\phi\Delta_L(\lambda)$ is the phase difference of the optical delay line with an optical path length difference of $\Delta L$, and $2\pi\phi_2(\lambda)$ is the phase produced by the second optical multi/demultiplexing device, the sum of the phase difference $2\pi\{\phi_1(\lambda)+\phi\Delta_L(\lambda)+\phi_2(\lambda)\}$ is set such that the output intensity of said optical waveguide circuit becomes uniform with respect to wavelength.

63. The variable optical attenuator as claimed in claim 43, wherein
said first optical multi/demultiplexing device and said second optical multi/demultiplexing device are both a phase generating coupler comprising N+1 optical couplers (N is a natural number), and N optical delay lines each of which is composed of a first and second optical waveguides, and which connects adjacent optical couplers of the N+1 optical couplers, and wherein
the sum of the optical path length satisfies either ($\Sigma l_{1,1} > \Sigma l_{2,1}$ and $\Sigma l_{1,2} > \Sigma l_{2,2}$), or $\Sigma l_{2,1} > \Sigma l_{1,1}$ and $\Sigma l_{2,2} > \Sigma l_{1,2}$), where $\Sigma l_{1,1}$ is the sum of optical path lengths of the first optical waveguide constituting the N optical delay lines of said first optical multi/demultiplexing device, $\Sigma l_{2,1}$ is the sum of optical path lengths of the second optical waveguide, $\Sigma l_{1,2}$ is the sum of optical path lengths of the first optical waveguide constituting the N optical delay lines of said second optical multi/demultiplexing device, and $\Sigma l_{2,2}$ is the sum of optical path lengths of the second optical waveguides constituting the N optical delay lines of said second optical multi/demultiplexing device.

64. The variable optical attenuator as claimed in claim 63, wherein assuming that $\lambda$ is the wavelength, $2\pi\phi_1(\lambda)$ is the phase produced by the first optical multi/demultiplexing device, $2\pi\phi\Delta_L(\lambda)$ is the phase difference of the optical delay line with an optical path length difference of $\Delta L$, and $2\pi\phi_2(\lambda)$ is the phase produced by the second optical multi/demultiplexing device, the phase produced by the first and second optical multi/demultiplexing device and the optical path length difference $\Delta L$ is set such that the sum of the phase difference $2\pi\{\phi_1(\lambda)+\phi\Delta_L(\lambda)+\phi_2(\lambda)\}$ becomes wavelength insensitive.

65. The variable optical attenuator as claimed in claim 64, wherein the sum of the phase difference $\phi_1(\lambda)$ of the output of said first optical multi/demultiplexing device and the phase difference $\phi_2(\lambda)$ of the output of said second optical multi/demultiplexing device equals $\Delta L/\lambda + m/2$ (m is an integer).

66. The variable optical attenuator as claimed in claim 64, wherein the sum $2\pi\{\phi_1(\lambda)+\phi\Delta_L(\lambda)+\phi_2(\lambda)\}$ of the three phase differences is set at $(2m'+1)\cdot\pi$ (m' is an integer), and the power coupling ratio of said first optical multi/demultiplexing device and the power coupling ratio of said second optical multi/demultiplexing device are made equal.

67. The variable optical attenuator as claimed in claim 64, wherein the sum $2\pi\{\phi_1(\lambda)+\phi\Delta_L(\lambda)+\phi_2(\lambda)\}$ of the three phase differences is set at $2m'\pi$ (m' is an integer), and the sum of the power coupling ratio of said first optical multi/demultiplexing device and the power coupling ratio of said second optical multi/demultiplexing device is made unity.

68. The variable optical attenuator as claimed in claim 63, wherein assuming that $\lambda$ is the wavelength, $2\pi\phi_1(\lambda)$ is the phase produced by the first optical multi/demultiplexing device, $2\pi\phi\Delta_L(\lambda)$ is the phase difference of the optical delay line with an optical path length difference of $\Delta L$, and $2\pi\phi_2(\lambda)$ is the phase produced by the second optical multi/demultiplexing device, the sum of the phase difference $2\pi\{\phi_1(\lambda)+\phi\Delta_L(\lambda)+\phi_2(\lambda)\}$ is set such that the output intensity of said optical waveguide circuit becomes uniform with respect to wavelength.

69. The variable optical attenuator as claimed in claim 63, wherein the power coupling ratios of the N+1 optical couplers of said first optical multi/demultiplexing device are made equal to the power coupling ratios of the N+1 optical couplers of said second optical multi/demultiplexing device.

70. The variable optical attenuator as claimed in claim 69, wherein
the sum of the phase difference $\phi_1(\lambda)$ of the output of said first optical multi/demultiplexing device and the phase difference $\phi_2(\lambda)$ of the output of said second optical multi/demultiplexing device equals $\Delta L\lambda + m/2$ (m is an integer), wherein
assuming that $\lambda$ is the wavelength, $2\pi\phi_1(\lambda)$ is the phase produced by the first optical multi/demultiplexing device, $2\pi\phi\Delta_L(\lambda)$ is the phase difference of the optical delay line with an optical path length difference of $\Delta L$, and $2\pi\phi_2(\lambda)$ is the phase produced by the second optical multi/demultiplexing device and the optical path length difference $\Delta L$ is set such that the sum of the phase difference $2\pi\{\phi_1(\lambda)+\phi\Delta_L(\lambda)+\phi_2(\lambda)\}$ becomes wavelength insensitive, and wherein the sum $2\pi\{\phi_1(\lambda)+\phi\Delta_L(\lambda)+\phi_2(\lambda)\}$ of the three phase differences is set at $(2m'+1)\cdot\pi$ (m' is an integer), and the power coupling ratio of said first optical multi/demultiplexing device and the power coupling ratio of said second optical multi/demultiplexing device are made equal throughout an entire wavelength region.

71. The variable optical attenuator as claimed in claim 69, wherein
the sum of the phase difference $\phi_1(\lambda)$ of the output of said first optical multi/demultiplexing device and the phase difference $\phi_2(\lambda)$ of the output of said second optical multi/demultiplexing device equals $\Delta L\lambda + m/2$ (m is an integer); wherein
assuming that $\lambda$ is the wavelength, $2\pi\phi_1(\lambda)$ is the phase produced by the first optical multi/demultiplexing device, $2\pi\phi\Delta_L(\lambda)$ is the phase difference of the optical delay line with an optical path length difference of $\Delta L$, and $2\pi\phi_2(\lambda)$ is the phase produced by the second optical multi/demultiplexing device and the optical path length difference $\Delta L$ is set such that the sum of the phase difference $2\pi\{\phi_1(\lambda)+\phi\Delta_L(\lambda)+\phi_2(\lambda)\}$ becomes wavelength insensitive, and wherein
the sum $2\pi\{\phi_1(\lambda)+\phi\Delta_L(\lambda)+\phi_2(\lambda)\}$ of the three phase differences is set at $2m'\cdot\pi$ (m' is an integer), and the sum of the power coupling ratio of said first optical multi/demultiplexing device and the power coupling ratio of said second optical multi/demultiplexing device is made unity.

72. The variable optical attenuator as claimed in claim 69, wherein assuming that optical wavelength is $\lambda$, a phase difference between light output from said first optical multi/demultiplexing device is $2\pi\phi_1(\lambda)$, a phase difference caused by an optical path length difference $\Delta L$ of said optical delay line is $2\pi\phi_L(\lambda)$, and a phase difference between light output from said second optical multi/demultiplexing device is $2\pi\phi_2(\lambda)$, then the sum $2\pi\{\phi_1(\lambda)+\phi\Delta_L(\lambda)+\phi_2(\lambda)\}$ of the three phase differences is set such that output intensity of said optical waveguide circuit becomes constant for the wavelength $\lambda$.

73. The variable optical attenuator as claimed in claim 43, wherein
said first optical multi/demultiplexing device and said second optical multi/demultiplexing device each consist of a phase generating coupler including N+1 optical couplers (N is a natural number), and N optical delay lines sandwiched between adjacent said optical couplers of said N+1 optical couplers, and wherein
the power coupling ratios of the N+1 optical couplers of said first optical multi/demultiplexing device are made equal to the power coupling ratios of the N+1 optical couplers of said second optical multi/demultiplexing device.

74. The variable optical attenuator as claimed in claim 73, wherein assuming that $\lambda$ is the wavelength, $2\pi\phi_1(\lambda)$ is the phase produced by the first optical multi/demultiplexing device, $2\pi\phi\Delta_L(\lambda)$ is the phase difference of the optical delay line with an optical path length difference of $\Delta L$, and $2\pi\phi_2(\lambda)$ is the phase produced by the second optical multi/demultiplexing device, the phase produced by the first and second optical multi/demultiplexing device and the optical path length difference $\Delta L$ is set such that the sum of the phase difference $2\pi\{\phi_1(\lambda)+\phi\Delta_L(\lambda)+\phi_2(\lambda)\}$ becomes wavelength insensitive.

75. The variable optical attenuator as claimed in claim 74, wherein the sum of the phase difference $\phi_1(\lambda)$ of the output of said first optical multi/demultiplexing device and the phase difference $\phi_2(\lambda)$ of the output of said second optical multi/demultiplexing device equals $\Delta L\lambda+m/2$(m is an integer).

76. The variable optical attenuator as claimed in claim 74, wherein the sum $2\pi\{\phi_1(\lambda)+\phi\Delta_L(\lambda)+\phi_2(\lambda)\}$ of the three phase differences is set at $(2m'+1)\cdot\pi$ (m' is an integer), and the power coupling ratio of said first optical multi/demultiplexing device and the power coupling ratio of said second optical multi/demultiplexing device are made equal.

77. The variable optical attenuator as claimed in claim 74, wherein the sum $2\pi\{\phi_1(\lambda)+\phi\Delta_L(\lambda)+\phi_2(\lambda)\}$ of the three phase differences is set at $2m'\cdot\pi$ (m' is an integer), and the sum of the power coupling ratio of said first optical multi/demultiplexing device and the power coupling ratio of said second optical multi/demultiplexing device is made unity.

78. The variable optical attenuator as claimed in claim 73, wherein assuming that $\lambda$ is the wavelength, $2\pi\phi_1(\lambda)$ is the phase produced by the first optical multi/demultiplexing device, $2\pi\phi\Delta_L(\lambda)$ is the phase difference of the optical delay line with an optical path length difference of $\Delta L$, and $2\pi\phi_2(\lambda)$ is the phase produced by the second optical multi/demultiplexing device, the sum of the phase difference $2\pi\{\phi_1(\lambda)+\phi\Delta_L(\lambda)+\phi_2(\lambda)\}$ is set such that the output intensity of said optical waveguide circuit becomes uniform with respect to wavelength.

79. An interferometer optical switch comprising a plurality of interferometer optical switches as defined in claim 1 connected in cascade.

80. A variable optical attenuator comprising a plurality of variable optical attenuators as defined in claim 37 connected in cascade.

81. An interferometer optical switch comprising an optical circuit having a plurality of interferometer optical switches as defined in claim 1 connected in cascade, wherein
   a first interferometer optical switch having two output waveguides;
   one of the said output waveguides is connected to the input waveguide of a second interferometer optical switch;
   the other output waveguide of said first interferometer optical switch is used as the second output port of said optical circuit;
   the input waveguide of said first interferometer optical switch is used as the input port of said optical circuit; and
   the output waveguide of said second interferometer optical switch is used as the first output port of said optical circuit.

82. A variable optical attenuator comprising an optical circuit having a plurality of variable optical attenuators as defined in claim 37 connected in cascade, wherein
   a first interferometer optical switch having two output waveguides;
   one of the said output waveguides is connected to the input waveguide of a second interferometer optical switch;
   the other output waveguide of said first interferometer optical switch is used as the second output port of said optical circuit;
   the input waveguide of said first interferometer optical switch is used as the input port of said optical circuit; and
   the output waveguide of said second interferometer optical switch is used as the first output port of said optical circuit.

83. An interferometer optical switch comprising an optical circuit having a plurality of interferometer optical switches as defined in claim 1 connected in cascade, wherein
   a first interferometer optical switch having two output waveguides;
   one of the said output waveguides is connected to the input waveguide of a second interferometer optical switch;
   the other output waveguide of said first interferometer optical switch is connected to the input waveguide of a third interferometer optical switch;
   the input waveguide of said first interferometer optical switch is used as the input port of said optical circuit;
   the output waveguide of said second interferometer optical switch is used as the first output port of said optical circuit; and
   the output waveguide of said third interferometer optical switch is used as the second output port of said optical circuit.

84. A variable optical attenuator comprising an optical circuit having a plurality of optical variable attenuates as defined in claim 37 connected in cascade, wherein
   a first interferometer optical switch having two output waveguides;
   one of the said output waveguides is connected to the input waveguide of a second interferometer optical switch;
   the other output waveguide of said first interferometer optical switch is connected to the input waveguide of a third interferometer optical switch; the input waveguide of said first interferometer optical switch is used as the input port of said optical circuit;
   the output waveguide of said second interferometer optical switch is used as the first output port of said optical circuit; and
   the output waveguide of said third interferometer optical switch is used as the second output port of said optical circuit.

85. An interferometer optical switch using at least one interferometer optical switch as defined in claim 1 to configure an optical switch with M inputs (M: natural number) and N outputs (N: natural number).

86. A variable optical attenuator using at least one variable optical attenuator as defined in claim 37 to configure an optical switch with M inputs (M: natural number) and N outputs (N: natural number).

87. The interferometer optical switch as claimed in claim 1, wherein said optical coupler consists of a directional coupler including two optical waveguides placed side by side in close proximity.

88. The variable optical attenuator as claimed in claim 37, wherein said optical coupler consists of a directional coupler including two optical waveguides placed side by side in close proximity.

89. The interferometer optical switch as claimed in claim 1, wherein said phase shifter consists of a thin film heater formed on the optical waveguide.

90. The variable optical attenuator as claimed in claim 37, wherein said phase shifter consists of a thin film heater formed on the optical waveguide.

91. The interferometer optical switch as claimed in claim 1, wherein said phase shifter consists of a thin film heater formed near an adiabatic groove on the optical waveguide.

92. The variable optical attenuator as claimed in claim 37, wherein said phase shifter consists of a thin film heater formed on the optical waveguide, and an adiabatic groove is formed near said thin film heater.

93. The interferometer optical switch as claimed in claim 1, wherein said optical waveguide circuit is made of a silica-based glass optical waveguide.

94. The variable optical attenuator as claimed in claim 37, wherein said optical waveguide circuit is made of a silica-based glass optical waveguide.

95. The interferometer optical switch as claimed in claim 1, wherein said interferometer optical switch undergoes adjustment of a birefringent index.

96. The variable optical attenuator as claimed in claim 37, wherein said variable optical attenuator has birefringent index adjustment means on its optical waveguide, or undergoes adjustment of a birefringent index.

97. An optical module comprising a module including within it an interferometer optical switch as defined in claim 1, and optical fibers that are held by said module for inputting and outputting a signal to and from said interferometer optical switch.

98. An optical module comprising a module including within it a variable optical attenuator as defined in claim 37, and optical fibers that are held by said module for inputting and outputting a signal to and from said variable attenuator.

* * * * *